(12) United States Patent
Kitayama et al.

(10) Patent No.: US 8,872,744 B2
(45) Date of Patent: Oct. 28, 2014

(54) DISPLAY APPARATUS, LIQUID CRYSTAL DISPLAY APPARATUS, DRIVE METHOD FOR DISPLAY APPARATUS, AND TELEVISION RECEIVER

(75) Inventors: Masae Kitayama, Osaka (JP); Fumikazu Shimoshikiryoh, Osaka (JP); Kentaroh Irie, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 13/263,424

(22) PCT Filed: Feb. 9, 2010

(86) PCT No.: PCT/JP2010/000769
§ 371 (c)(1),
(2), (4) Date: Oct. 7, 2011

(87) PCT Pub. No.: WO2010/119597
PCT Pub. Date: Oct. 21, 2010

(65) Prior Publication Data
US 2012/0038834 A1    Feb. 16, 2012

(30) Foreign Application Priority Data

Apr. 13, 2009    (JP) .................. 2009-097493

(51) Int. Cl.
*G09G 3/36*    (2006.01)
*G02F 1/1362*    (2006.01)
*G09G 5/00*    (2006.01)

(52) U.S. Cl.
CPC .............. *G09G 3/3614* (2013.01); *G09G 5/006* (2013.01); *G09G 2300/0426* (2013.01); *G02F 1/136286* (2013.01); *G09G 3/3659* (2013.01); *G09G 2300/0447* (2013.01); *G09G 2300/0876* (2013.01); *G09G 2310/0205* (2013.01); *G09G 2310/067* (2013.01); *G09G 2320/0233* (2013.01); *G09G 2320/0223* (2013.01); *G09G 2330/08* (2013.01); *G09G 2320/0219* (2013.01)
USPC ................. 345/96; 345/87; 345/94; 345/100; 345/209

(58) Field of Classification Search
USPC .................................................. 345/87–104
See application file for complete search history.

(56) References Cited

U.S. PATENT DOCUMENTS

| | | | |
|---|---|---|---|
| 6,081,250 | A | 6/2000 | Shimada et al. |
| 2001/0019322 | A1 | 9/2001 | Nakayama et al. |

(Continued)

FOREIGN PATENT DOCUMENTS

| | | |
|---|---|---|
| JP | 2-214818 A | 8/1990 |
| JP | 5-210089 A | 8/1993 |

(Continued)

*Primary Examiner* — Joe H Cheng
*Assistant Examiner* — Lisa Landis
(74) *Attorney, Agent, or Firm* — Harness, Dickey & Pierce

(57) ABSTRACT

In at least one embodiment a ripple, generated in an electric potential of data signal lines even in long-term reversal driving, is reduced and display quality is improved. In at least one example embodiment, the liquid crystal display apparatus of the present invention includes scanning signal lines and data signal lines, in which one scanning pulse is outputted to select one scanning signal line, each of the data signal lines receives data signals whose polarities are reversed per one vertical scanning period while in one horizontal scanning period, one of two data signal lines receives a data signal having a polarity and the other of the two data signal lines receives another data signal having another polarity, the two data signal lines being arranged adjacent to each other, scanning pulses are successively outputted in sets of two, and at a timing in which two scanning pulses fall, two scanning pulses rise.

17 Claims, 35 Drawing Sheets

(56) References Cited

U.S. PATENT DOCUMENTS

| | | | |
|---|---|---|---|
| 2003/0151584 A1* | 8/2003 | Song et al. | 345/100 |
| 2004/0027323 A1* | 2/2004 | Tanaka et al. | 345/98 |
| 2004/0212753 A1* | 10/2004 | Wu | 349/54 |
| 2006/0044292 A1* | 3/2006 | Shen et al. | 345/204 |
| 2006/0192744 A1* | 8/2006 | Yamazaki | 345/100 |
| 2006/0208984 A1* | 9/2006 | Kim et al. | 345/90 |
| 2006/0215066 A1 | 9/2006 | Ueda et al. | |
| 2008/0001882 A1 | 1/2008 | Lee | |
| 2008/0106541 A1 | 5/2008 | Yamazaki | |
| 2009/0015572 A1 | 1/2009 | Matsui | |
| 2009/0195487 A1 | 8/2009 | Shimoshikiryoh et al. | |
| 2009/0268110 A1 | 10/2009 | Kitayama et al. | |
| 2010/0002021 A1* | 1/2010 | Hashimoto et al. | 345/690 |
| 2010/0188437 A1 | 7/2010 | Itoh et al. | |

FOREIGN PATENT DOCUMENTS

| | | |
|---|---|---|
| JP | 10-253987 A | 9/1998 |
| JP | 2000147462 A | 5/2000 |
| JP | 2001249319 A | 9/2001 |
| JP | 2002014319 A | 1/2002 |
| JP | 2006-133577 A | 5/2006 |
| JP | 2008009368 A | 1/2008 |
| JP | 2008083320 A | 4/2008 |
| JP | 2008116694 A | 5/2008 |
| JP | 2008-151986 | 7/2008 |
| JP | 2009015247 A | 1/2009 |
| WO | WO-2008023601 A1 | 2/2008 |
| WO | WO-2008153003 A1 | 12/2008 |

* cited by examiner

F I G. 2 5
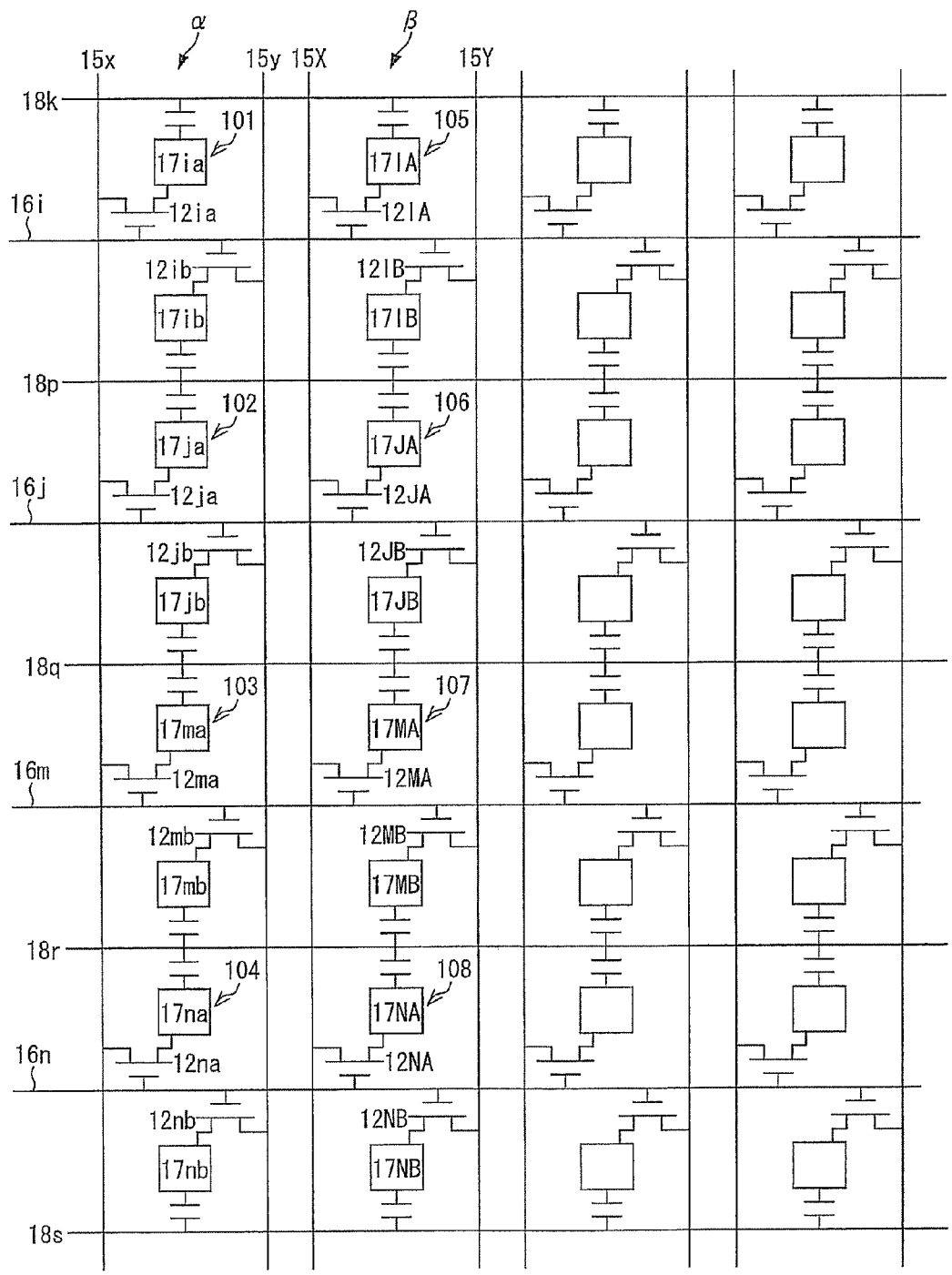

DISPLAY APPARATUS, LIQUID CRYSTAL DISPLAY APPARATUS, DRIVE METHOD FOR DISPLAY APPARATUS, AND TELEVISION RECEIVER

TECHNICAL FIELD

The present invention relates to a liquid crystal display apparatus in which data signals whose polarities are reversed per set period are supplied to data signal lines.

BACKGROUND ART

With liquid crystal display apparatuses, source signals (shape of potential of data signal lines) round due to generation of parasitic resistance, parasitic capacitors and the like in the data signal lines. Particularly, when driving a large-sized liquid crystal panel, in a case where two temporally adjacent gate pulses are provided successively without having an interval therebetween, a rounded part of a source signal that corresponds to a preceding stage is written into a beginning of a horizontal scanning period. In view of this, Patent Literature 1 discloses a method of providing a set interval between one and another of two temporally adjacent gate pulses (see FIG. 35).

A general data signal line drive method is a method which supplies data signals whose polarities are reversed per horizontal scanning period (1H) (1H reversal driving). However with this method, as a size of the liquid crystal panel increases and as speed is increased for high-speed driving, the rounding of the data signal increases in degree. As a result, problems arise such as that a pixel charging rate decreases and that electricity consumption increases. Accordingly, alternative drive methods are starting to be employed, such as (i) a method which supplies, to data signal lines, data signals in which their polarities are reversed per vertical scanning period or per a plurality of vertical scanning periods, while in one horizontal scanning period, supplies a data signal having a polarity to one of two data signal lines and outputting another data signal having another polarity to the other of the two data signal lines, which two data signal lines are arranged adjacent to each other (1V reversal driving or nV reversal driving), or (ii) a method which supplies, to data signal lines, data signals in which their polarities are reversed per plurality of horizontal scanning periods, while in one horizontal scanning period, supplies a data signal having a polarity to one of two data signal lines and outputting another data signal having another polarity to the other of the two data signal lines, which two data signal lines are arranged adjacent to each other (nH reversal driving). In the following description, the 1V reversal driving, the nV reversal driving, and the nH reversal driving are together referred to as long-term (LT) reversal driving.

CITATION LIST

Patent Literature

Patent Literature 1
Japanese Patent Application Publication, Tokukai, No. 2008-009368 A (Publication Date: Jan. 17, 2008)

SUMMARY OF INVENTION

Technical Problem

The inventors of the present invention found that the following problem occurs in the LT reversal driving if a set interval is provided between one and the other of two temporally adjacent gate pulses as illustrated in FIG. 35.

Namely, a ripple (wavelike variation) generates in an electric potential of the data signal line at a time of rise (at a start of a scanning period) and fall (at a termination of the scanning period) of the gate pulse, caused by the parasitic capacitor generated at an intersection of the data signal line and the scanning signal line. Further, as the distance increases from the supply source of the data signal (as the parasitic resistance of the data signal lines increases), the ripple increases in size, as illustrated in FIG. 36. This causes the display quality to decrease, for example causes a color change in a lower part of the screen, which part is away from the source driver. It is considered that this is caused due to the LT reversal driving (i) supplying data signals of a single polarity for a long period of time to the same data signal lines, and (ii) actualizing a parasitic capacitor between the data signal lines conjointly with the high definition of the liquid crystal panel, since an electric potential of any one of the data signal lines and a data signal line disposed adjacent to that any one of the data signal lines on one of its sides always are of reversed polarities. Moreover, such a deterioration in display quality is remarkable in a case where two scanning signal lines are selected simultaneously.

An object of the present invention is to improve display quality of a liquid crystal display apparatus that carries out LT reverse driving.

Solution to Problem

A display apparatus of the present invention is a display apparatus including: scanning signal lines; and data signal lines, wherein: each of the data signal lines receives data signals whose polarities are reversed per one vertical scanning period, per plurality of vertical scanning periods, or per plurality of horizontal scanning periods, in one horizontal scanning period, one of two data signal lines receives a data signal having a polarity and the other of the two data signal lines receives another data signal having another polarity, the two data signal lines being arranged adjacent to each other, the scanning signal lines are made sequentially active in sets of N line(s) (N is an integer of not less than 1), and at a timing in which a set of N line(s) of the scanning signal line(s) is deactivated from an active state, another set of N line(s) of the scanning signal line(s) is activated from an inactive state.

According to the configuration, at a timing at which a set of N line(s) of the scanning signal line(s) is deactivated, another set of N line(s) of the scanning signal line(s) is activated; hence, an effect (e.g., fall of electric potential) received by the data signal lines due to the deactivation of the set of N line(s) of scanning signal line(s) (e.g., fall of N scanning pulses) is basically canceled by the effect (e.g., rise of electric potential) received by the data signal lines due to activating the set of N line(s) of scanning signal line(s) (e.g., rise of N scanning pulses). This allows for reducing the ripple (wavelike variation) generating in the electric potential of the data signal lines also in the LT reversal driving, which allows for preventing a phenomenon that the size of the ripple increases as the supply source of the data signal becomes more distant (see FIG. 36), thereby improving display quality.

Advantageous Effects of Invention

As described above, according to the present display apparatus, it is possible to reduce the ripple (wavelike variation) generated in the electric potential of the data signal line in the LT reversal driving, which allows for preventing a phenom-

BRIEF DESCRIPTION OF DRAWINGS

FIG. 25 is an equivalent circuit diagram illustrating a configuration of a liquid crystal panel according to Embodiment 5.

DESCRIPTION OF EMBODIMENTS

The present embodiment is as described below, with reference to FIGS. 1 to 34. For convenience in description, a row direction hereafter denotes an extending direction of scanning signal lines. However, it is needless to say that the scanning signal lines may be extended in a sideways direction or an up-down direction in a used (viewed) state of a liquid crystal display apparatus including the present liquid crystal panel (or an active matrix substrate used in the present liquid crystal panel). Note that alignment control structures have been omitted from the drawings which illustrate the liquid crystal panel, as appropriate.

Embodiment 1

Figure 2:
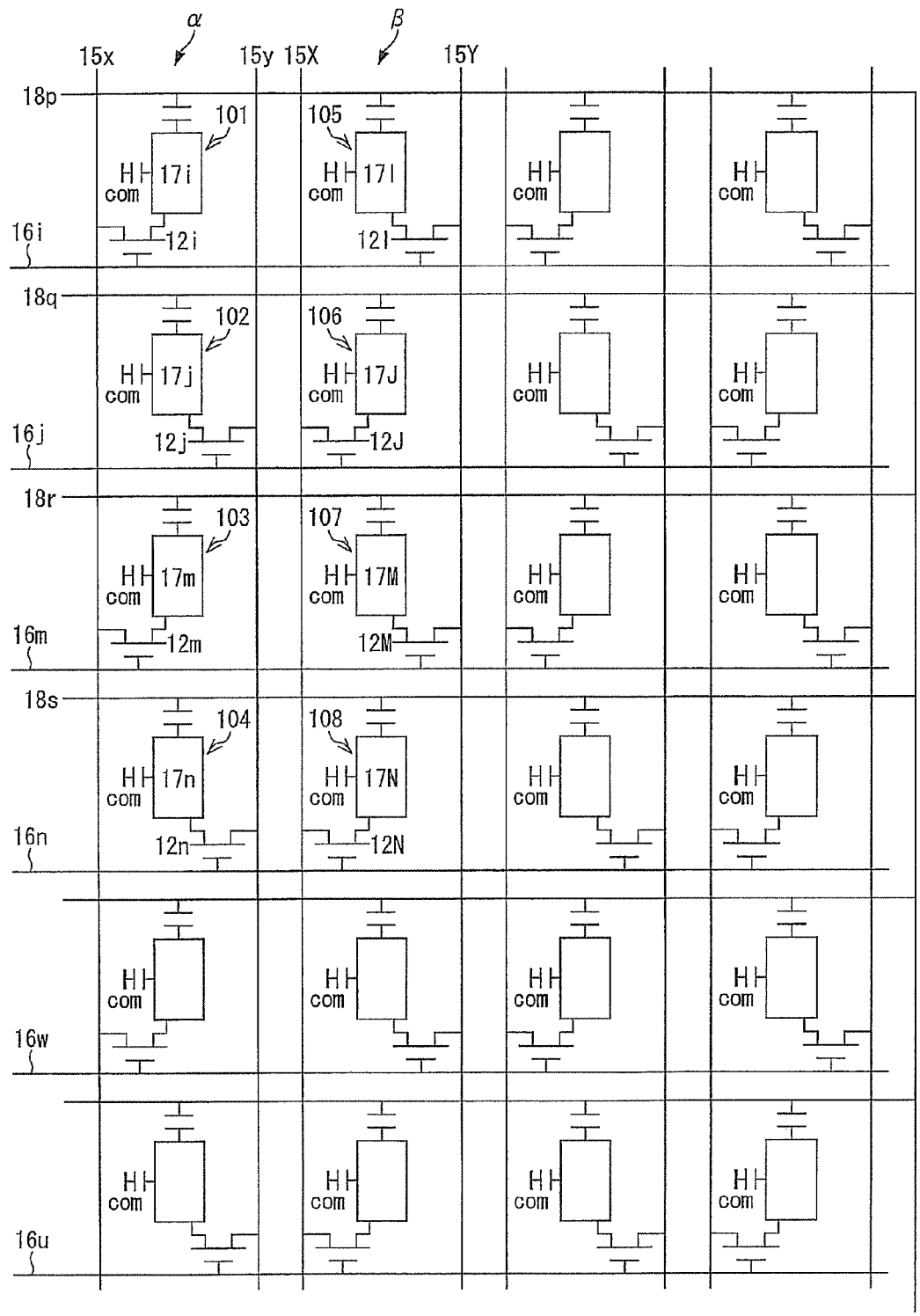
FIG. 2 is an equivalent circuit diagram illustrating a configuration of a liquid crystal panel according to Embodiment 1.

FIG. 2 is an equivalent circuit diagram illustrating a portion of a liquid crystal panel according to Embodiment 1. As illustrated in FIG. 2, in the present liquid crystal panel, data signal lines 15$x$, 15$y$, 15X, and 15Y are arranged in this order, and scanning signal lines 16$i$, 16$j$, 16$m$, 16$n$, 16$w$, and 16$u$, each of which extend in the row direction (left-right direction of FIG. 2) are arranged in this order. A pixel 101 is provided between intersections where the scanning signal line 16$i$ intersects with the data signal lines 15$x$ and 15$y$, a pixel 102 is provided between intersections where the scanning signal line 16$j$ intersects with the data signal lines 15$x$ and 15$y$, a pixel 103 is provided between intersections where the scanning signal line 16$m$ intersects with the data signal lines 15$x$ and 15$y$, a pixel 104 is provided between intersections where the scanning signal line 16$n$ intersects with the data signal lines 15$x$ and 15$y$, a pixel 105 is provided between intersections where the scanning signal line 16$i$ intersects with the data signal lines 15X and 15Y, a pixel 106 is provided between intersections where the scanning signal line 16$j$ intersects with the data signal lines 15X and 15Y, a pixel 107 is provided between intersections where the scanning signal line 16m intersects with the data signal lines 15X and 15Y, and a pixel 108 is provided between intersections where the scanning signal line 16n intersects with the data signal lines 15X and 15Y. A storage capacitor wire 18p is provided associated with the pixels 101 and 105, a storage capacitor wire 18q is provided associated with the pixels 102 and 106, a storage capacitor wire 18r is provided associated with the pixels 103 and 107, and a storage capacitor wire 18s is provided associated with the pixels 104 and 108.

Adjacent to a pixel column α which includes the pixels 101 to 104 is disposed a pixel column β which includes the pixels 105 to 108; the data signal lines 15x and 15y are provided associated with the pixel column α, and the data signal lines 15X and 15Y are provided associated with the pixel column β.

Furthermore, one pixel electrode is disposed per pixel; a pixel electrode 17i of the pixel 101 is connected to the data signal line 15x via a transistor 12i that is connected to the scanning signal line 16i, a pixel electrode 17j of the pixel 102 is connected to the data signal line 15y via a transistor 12j that is connected to the scanning signal line 16j; a pixel electrode 17m of the pixel 103 is connected to the data signal line 15x via a transistor 12m that is connected to the scanning signal line 16m, a pixel electrode 17n of the pixel 104 is connected to the data signal line 15y via a transistor 12n that is connected to the scanning signal line 16n, a pixel electrode 17I of the pixel 105 is connected to the data signal line 15Y via a transistor 12I that is connected to the scanning signal line 16i, a pixel electrode 17J of the pixel 106 is connected to the data signal line 15X via a transistor 12J that is connected to the scanning signal line 16j, a pixel electrode 17M of the pixel 107 is connected to the data signal line 15Y via a transistor 12M that is connected to the scanning signal line 16m, and a pixel electrode 17N of the pixel 108 is connected to the data signal line 15X via a transistor 12N that is connected to the scanning signal line 16n.

The scanning signal line 16i connected to the pixel electrode 17i of the pixel 101 and connected to the pixel electrode 17I of the pixel 105, and the scanning signal line 16j connected to the pixel electrode 17j of the pixel 102 and connected to the pixel electrode 17J of pixel 106, are selected simultaneously (later described). Moreover, the scanning signal line 16m connected to the pixel electrode 17m of the pixel 103 and connected to the pixel electrode 17M of the pixel 107, and the scanning signal line 16n connected to the pixel electrode 17n of the pixel 104 and connected to the pixel electrode 17N of the pixel 108 are selected simultaneously (later described).

Moreover, respective storage capacitors are formed between the storage capacitor wire 18p and each of the pixel electrodes 17i and 17I, respective storage capacitors are formed between the storage capacitor wire 18q and each of the pixel electrodes 17j and 17J, respective storage capacitors are formed between the storage capacitor wire 18r and each of the pixel electrodes 17m and 17M, respective storage capacitors are formed between the storage capacitor wire 18s and each of the pixel electrodes 17n and 17N, and respective liquid crystal capacitors are formed between each of the pixel electrodes and a common electrode com.

Figure 1:
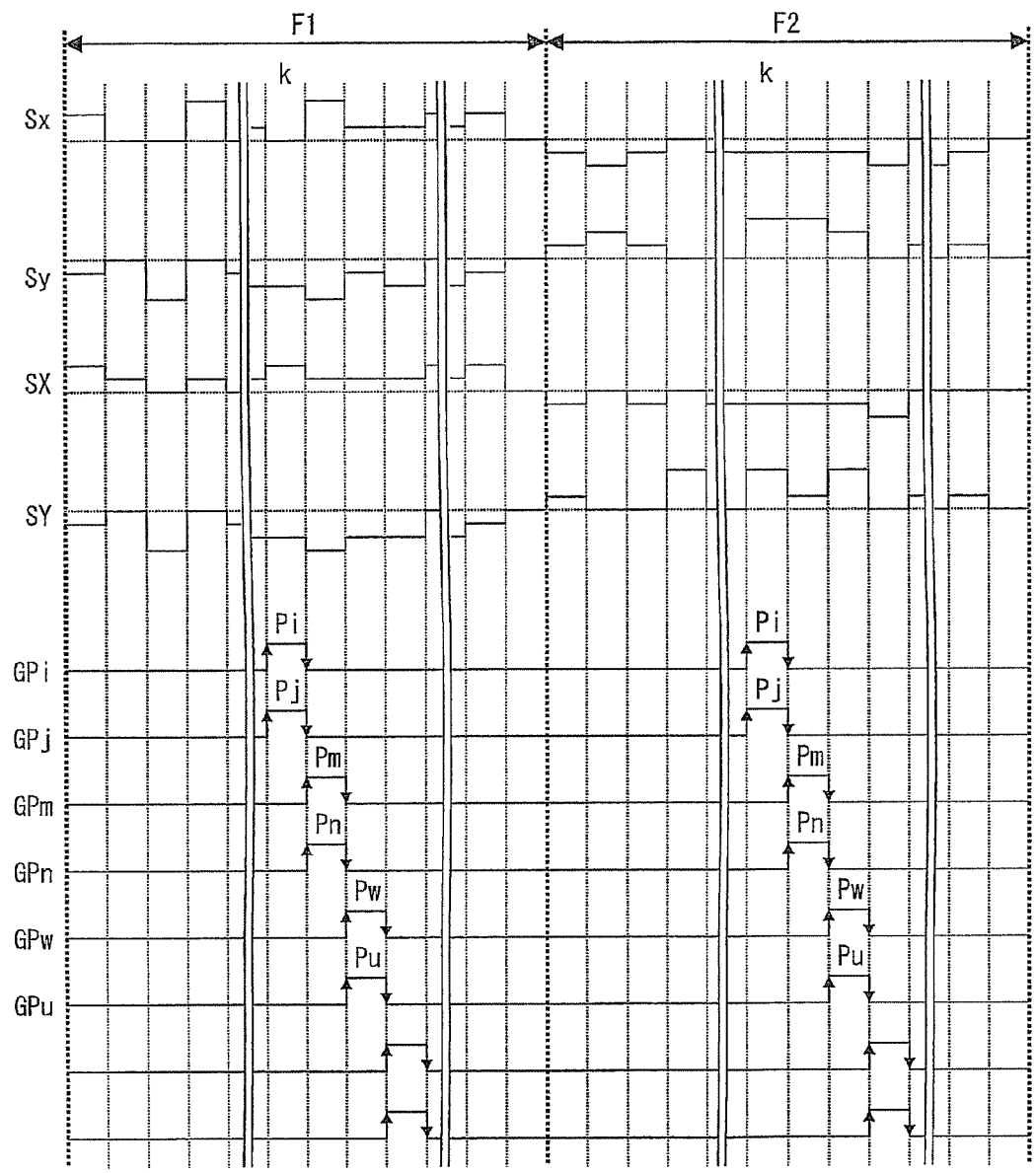
FIG. 1 is a timing chart illustrating a driving method of a liquid crystal display apparatus according to Embodiment 1.
Figure 3:
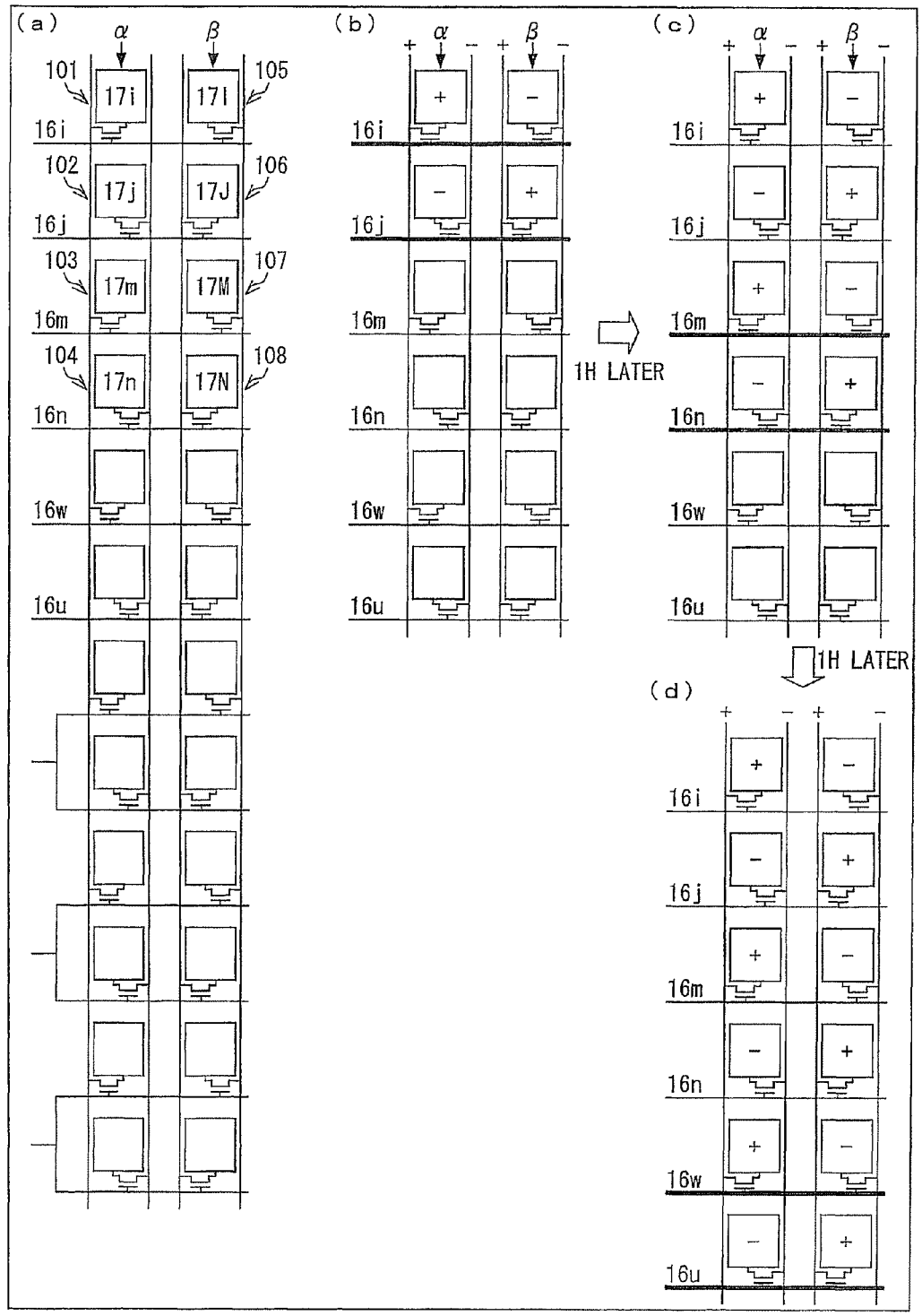
FIG. 3 is a schematic view illustrating a display state of a liquid crystal display apparatus which is driven by the driving method of FIG. 1.

FIG. 1 is a timing chart showing a driving method of the present liquid crystal display apparatus which includes the liquid crystal panel (normally black mode) of FIG. 2. Sx, Sy, SX, SY represent data signals (data signals) that are supplied to the data signal lines 15x, 15y, 15X, 15Y, respectively, and GPi, GPj, GPm, GPn, GPw, GPu represent gate pulse signals which are supplied to the scanning signal lines 16i, 16j, 16m, 16n, 16w, 16u, respectively. Moreover, (a) of FIG. 3 is a schematic view of a portion of FIG. 2, and (b) to (d) of FIG. 3 are schematic views illustrating a write state of the portion illustrated in (a) of FIG. 3, from a kth horizontal scanning period to a (k+2)th horizontal scanning period in FIG. 1.

As illustrated in FIG. 1, in the present driving method, two scanning signal lines are selected simultaneously, and data signals whose polarities are reversed per vertical scanning period (1V) are supplied to the data signal lines. In one vertical scanning period, data signals (signal potentials) respectively supplied to two data signal lines which are associated to one pixel column are made to have different polarities, and data signals that are respectively supplied to two adjacent data signal lines which each are associated to different pixel columns are made to have different polarities. At a timing in which two scanning pulses fall, two scanning pulses rise; simultaneously with a start of a horizontal scanning period corresponding to a current stage, a scanning pulse of the current stage rises, and simultaneously with a start of a horizontal scanning period corresponding to a subsequent stage (termination of the horizontal scanning period corresponding to the current stage), the scanning pulse of the current stage falls.

More specifically, in consecutive frames F1 and F2, F1 is driven by the following driving method. First, in F1, the data signal lines 15x and 15X receive data signals of a positive polarity, and the data signal lines 15y and 15Y receive data signals of a negative polarity.

Simultaneously with a start of a kth horizontal scanning period (i.e. switchover to a data signal corresponding to the kth horizontal scanning period), a pulse Pi of the gate pulse signal GPi and a pulse Pj of the gate pulse signal GPj rise, and simultaneously with a start of the (k+1)th horizontal scanning period (termination of the kth horizontal scanning period), the pulse Pi and the pulse Pj fall.

As a result, data signals of the positive polarity are written into the pixel electrode 17i of the pixel 101, data signals of the negative polarity are written into the pixel electrode 17j of the pixel 102, data signals of the negative polarity are written into the pixel electrode 17I of the pixel 105, and data signals of the positive polarity are written into the pixel electrode 17J of the pixel 106, as illustrated in (a) and (b) of FIG. 3.

Moreover, simultaneously with the start of the (k+1)th horizontal scanning period, a pulse Pm of the gate pulse signal GPm and a pulse Pn of the gate pulse signal GPn rise, and simultaneously with a start of a (k+2)th horizontal scanning period, the pulse Pm and the pulse Pn fall.

As a result, data signals of the positive polarity are written into the pixel electrode 17m of the pixel 103, data signals of the negative polarity are written into the pixel electrode 17n of the pixel 104, data signals of the negative polarity are written into the pixel electrode 17M of the pixel 107, and data signals of the positive polarity are written into the pixel electrode 17N of the pixel 108, as illustrated in (a) and (c) of FIG. 3.

Furthermore, simultaneously with the start of the (k+2)th horizontal scanning period, a pulse Pw of the gate pulse signal GPw and a pulse Pu of the gate pulse signal GPu rise, and simultaneously with a start of a (k+3)th horizontal scanning period, the pulse Pw and the pulse Pu fall. As a result, data signals having a polarity as illustrated in (d) of FIG. 3 are written into a pixel electrode connected to the scanning signal line 16w and into a pixel electrode connected to the scanning signal line 16u.

The above thus allows for achieving a dot-reversal polarity distribution of data signals written into the pixels, in F1.

On the other hand, the following drive method is performed in F2. First, in F2, the data signal lines 15x and 15X receive data signals of a negative polarity, and the data signal lines 15y and 15Y receive data signals of a positive polarity.

Simultaneously with a start of the kth horizontal scanning period (i.e. a switchover of data signals corresponding to the kth horizontal scanning period), the pulse Pi of the gate pulse signal Gpi and the pulse Pj of the gate pulse signal GPj rise, and simultaneously with the start of the (k+1)th horizontal scanning period (termination of the kth horizontal scanning period), the pulse Pi and the pulse Pj fall.

As a result, data signals of the negative polarity are written into the pixel electrode 17i of the pixel 101, data signals of the positive polarity are written into the pixel electrode 17j of the pixel 102, data signals of the positive polarity are written into the pixel electrode 17I of the pixel 105, and data signals of the negative polarity are written into the pixel electrode 17J of the pixel 106.

Moreover, simultaneously with the start of the (k+1)th horizontal scanning period, the pulse Pm of the gate pulse signal GPm and the pulse Pn of the gate pulse signal GPn rise, and simultaneously with the start of the (k+2)th horizontal scanning period, the pulse Pm and the pulse Pn fall.

As a result, data signals of the negative polarity are written into the pixel electrode 17m of the pixel 103, data signals of the positive polarity are written into the pixel electrode 17n of the pixel 104, data signals of the positive polarity are written into the pixel electrode 17M of the pixel 107, and data signals of the negative polarity are written into the pixel electrode 17N of the pixel 108.

Furthermore, simultaneously with the start of the (k+2)th horizontal scanning period, the pulse Pw of the gate pulse signal GPw and the pulse Pu of the gate pulse signal GPu rise, and simultaneously with the start of the (k+3)th horizontal scanning period, the pulse Pw and the pulse Pu fall.

The above thus allows for achieving a dot-reversal polarity distribution of the data signals written into each of the pixels, in F2 also.

Figure 36:
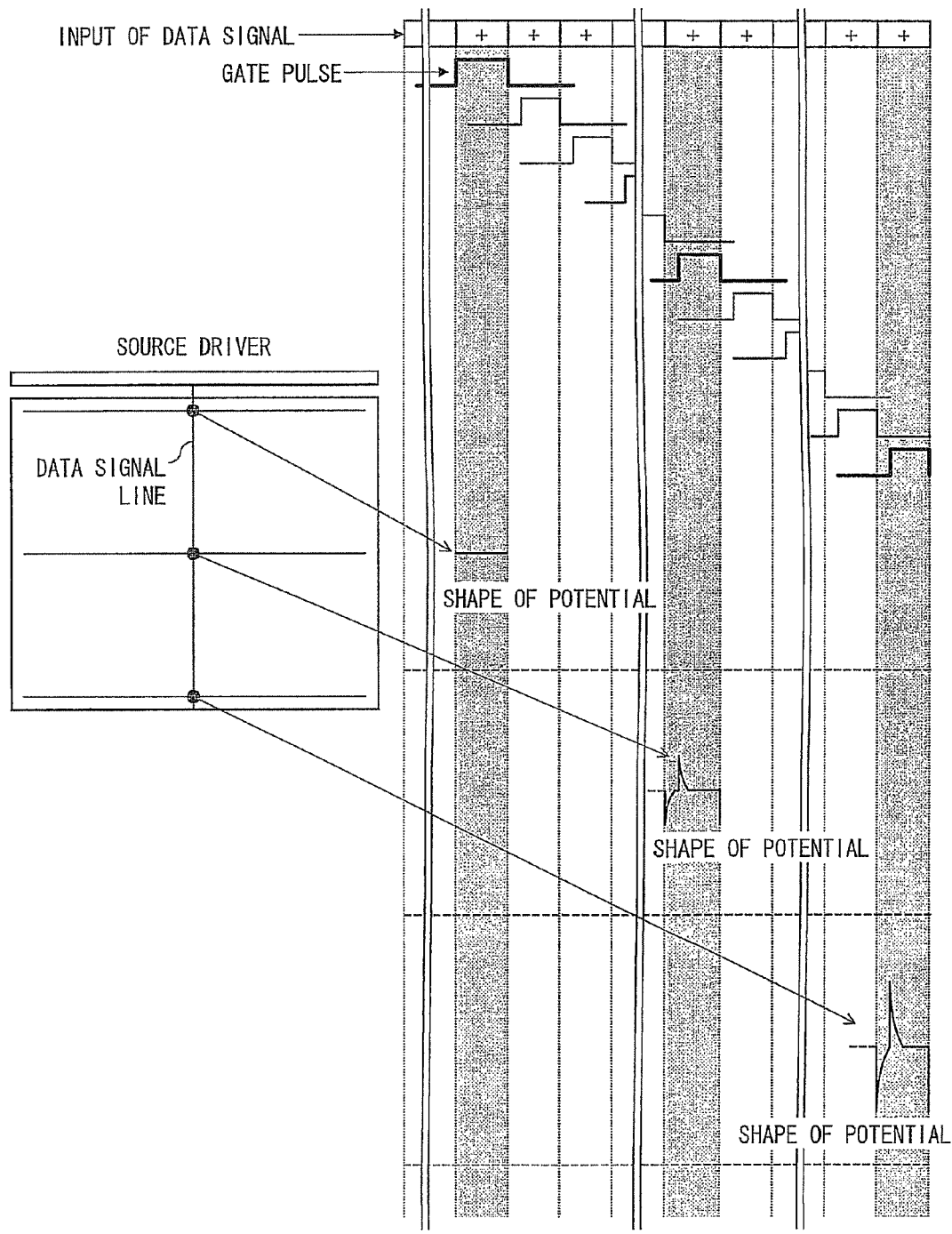
FIG. 36 is a schematic view describing problems in using the driving method of FIG. 35 in LT reversal driving.

In the present liquid crystal display apparatus, two scanning pulses rise at a timing in which two scanning pulses fall. Hence, an effect (fall of electric potential) received by the data signal lines due to the fall of the two scanning pulses are canceled out by an effect (rise of electric potential) received by the data signal lines due to the rise of the two scanning pulses. As a result, a ripple (wavelike variation) generated in the electric potential of the data signal line can be reduced even in the 1V reversal driving. This allows for preventing the phenomenon that the size of the ripple increases as a supply source of the data signal becomes more distant (see FIG. 36), thereby improving display quality.

Moreover, since it is possible to simultaneously select two scanning signal lines in the present liquid crystal display apparatus, it is possible to reduce a write time into the screen by half while causing no change to a write time of the pixels. Namely, the present liquid crystal display apparatus is suitable for high-speed driving such as double-speed driving (120 Hz drive) and the like.

Moreover, the present liquid crystal display apparatus is a configuration which accomplishes dot reversal driving while supplying data signals of an identical polarity to the data signal lines during a single vertical scanning period. Accordingly, the present liquid crystal display apparatus can also be said as suitable for achieving a large size and for achieving high-speed driving, as well as for achieving low power consumption.

Figure 4:
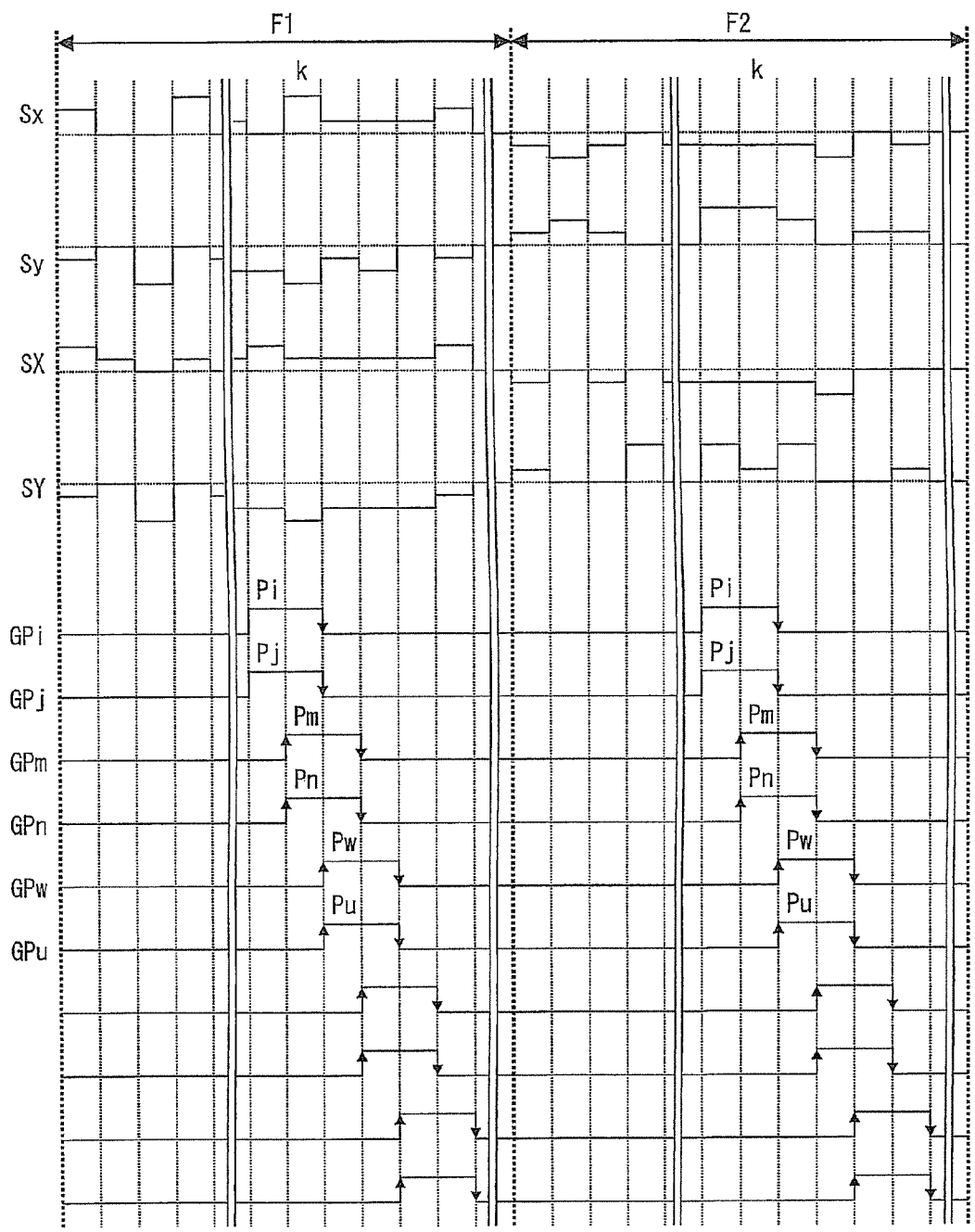
FIG. 4 is a timing chart illustrating another driving method of a liquid crystal display apparatus according to Embodiment 1.

In the drive method of FIG. 1, a scanning pulse of the current stage rises simultaneously with a start of a horizontal scanning period corresponding to the current stage, and the scanning pulse of the current stage falls simultaneously with the start of a horizontal scanning period corresponding to a subsequent stage (termination of the horizontal scanning period corresponding to the current stage). However, the driving method is not limited to this example. For instance, the method may be as illustrated in FIG. 4, in which the scanning pulse of the current stage rises simultaneously with the start of the horizontal scanning period corresponding to a preceding stage, and the scanning pulse of the current stage falls simultaneously with the start of the horizontal scanning period corresponding to a subsequent stage (termination of the horizontal scanning period of the current stage). In this case, the scanning pulse has a width of 2H.

More specifically, the pulse Pi and pulse Pj rise simultaneously with the start of (k−1)th horizontal scanning period, and the pulse Pm and pulse Pn rise simultaneously with the start of the kth horizontal scanning period; thereafter, simultaneously with the start of (k+1)th horizontal scanning period (termination of the kth horizontal scanning period), the pulse Pi and pulse Pj fall, whereas the pulse Pw and pulse Pu rise.

The driving method of FIG. 4 allows for precharging during a first half (1H) of the pulse and for carrying out a main charge during the second half (1H) of the pulse. This allows for improving the pixel charging rate. Of course in this case also, two scanning pulses rise at the timing in which two scanning pulses fall. This allows for preventing the phenomenon that the size of the ripple increases as the supply source of the data signal becomes more distant (see FIG. 36), thereby improving the display quality.

Figure 5:
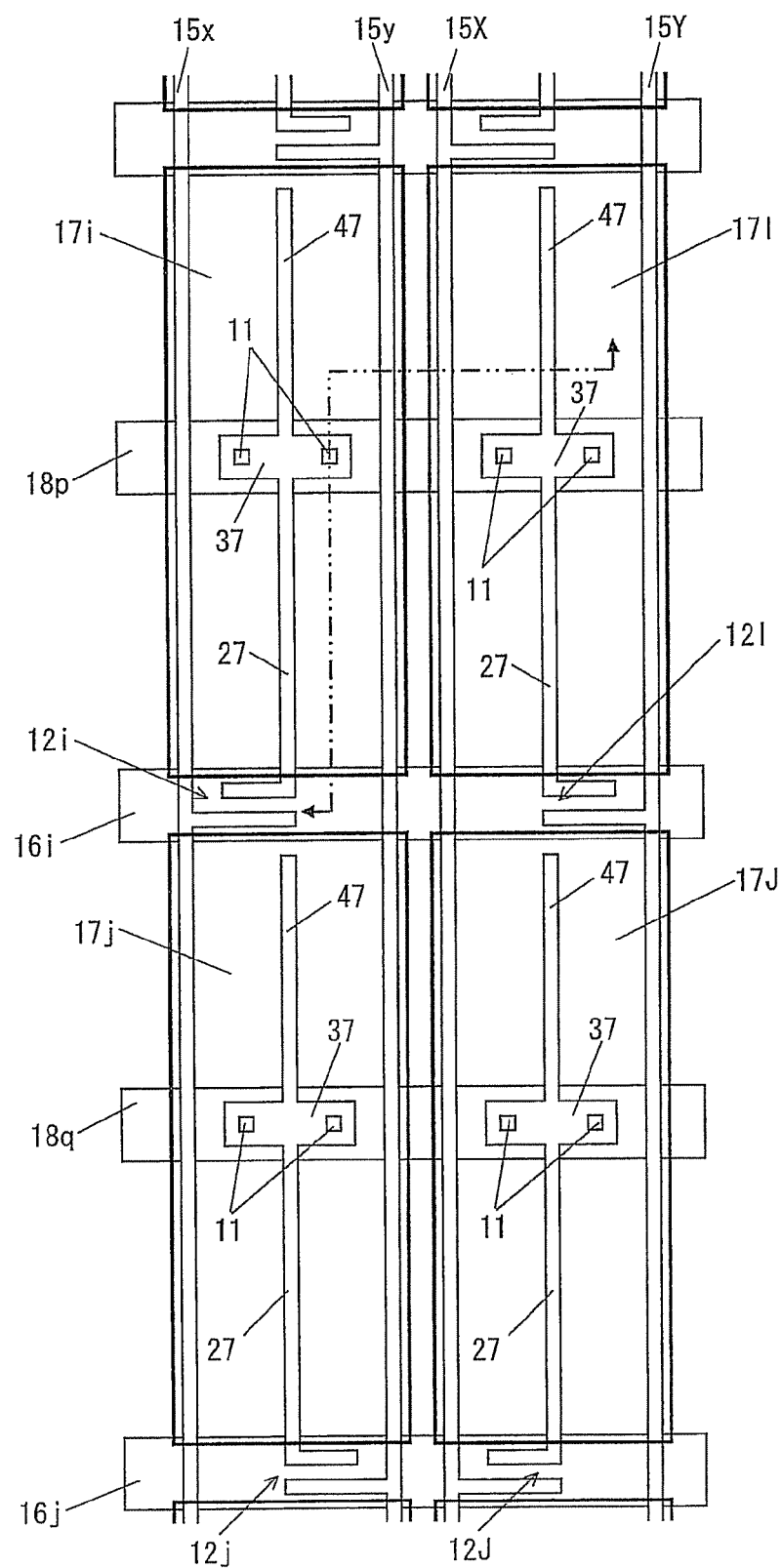
FIG. 5 is a plan view illustrating a specific example of the liquid crystal panel of FIG. 2.
Figure 6:
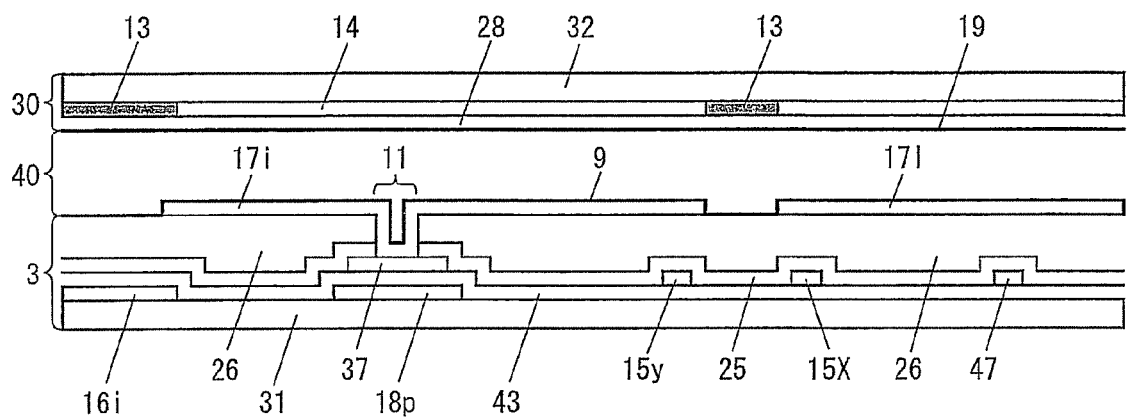
FIG. 6 is a cross sectional view of the liquid crystal panel of FIG. 5.

A specific example of the liquid crystal panel (portion including pixels 101, 102, 105, and 106) of FIG. 2 is illustrated as a plan view in FIG. 5 and as a cross sectional view in FIG. 6. In an active matrix substrate of the present liquid crystal panel, the scanning signal lines 16i and 16j which extend in a row direction and the storage capacitor wires 18p and 18q which extend in the row direction are provided on a transparent substrate 31. A gate insulating film 43 is provided so as to cover these members, and on the gate insulating film 43, a metal layer is formed, which metal layer includes the data signal lines 15x, 15y, 15X, and 15Y each extending in the column direction, semiconductor layers (i layer and n+ layer) and source electrodes and drain electrodes for each of transistors 12i, 12j, 12I, and 12J, drain draw-out electrodes 27, capacitor electrodes 37, and extension wires 47. Moreover, an inorganic interlayer insulating film 25 is provided so as to cover the metal layer, and an organic interlayer insulating film 26 which is thicker than the inorganic interlayer insulating film 25 is formed on an upper layer of the inorganic interlayer insulating film 25. Furthermore, pixel electrodes 17i, 17j, 17I, and 17J are formed on the organic interlayer insulating film 26, and an alignment film 9 is formed so as to cover these pixel electrodes. The inorganic interlayer insulating film 25 and the organic interlayer insulating film 26 are hollowed through at a section in which contact holes 11 are opened; this allows for the pixel electrodes to be in contact with respective capacitor electrodes 37. Meanwhile, a color filter substrate 30 has a black matrix 13 and a colored layer (color filter layers) 14 formed on a glass substrate 32, and a common electrode (com) 28 is formed on an upper layer of these layers. Further, an alignment film 19 is provided so as to cover the common electrode 28.

In the present liquid crystal panel, for instance, an edge of the pixel electrode 17j on an upstream side in the scanning direction overlaps an edge of the scanning signal line 16i on a downstream side in the scanning direction, whereas an edge of the pixel electrode 17j on the downstream side in the scanning direction overlaps an edge of the scanning signal line 16j on the upstream side in the scanning direction. From a plan view perspective, two edges of the pixel electrode 17j which run along the column direction of the pixel electrode 17j cover the data signal line 15x and data signal line 15y, respectively. Moreover, a storage capacitor is formed in a part on which the capacitor electrode overlaps the storage capacitor wire in such a manner that a gate insulating film is sandwiched between the capacitor electrode and the storage capacitor wire.

Figure 7:
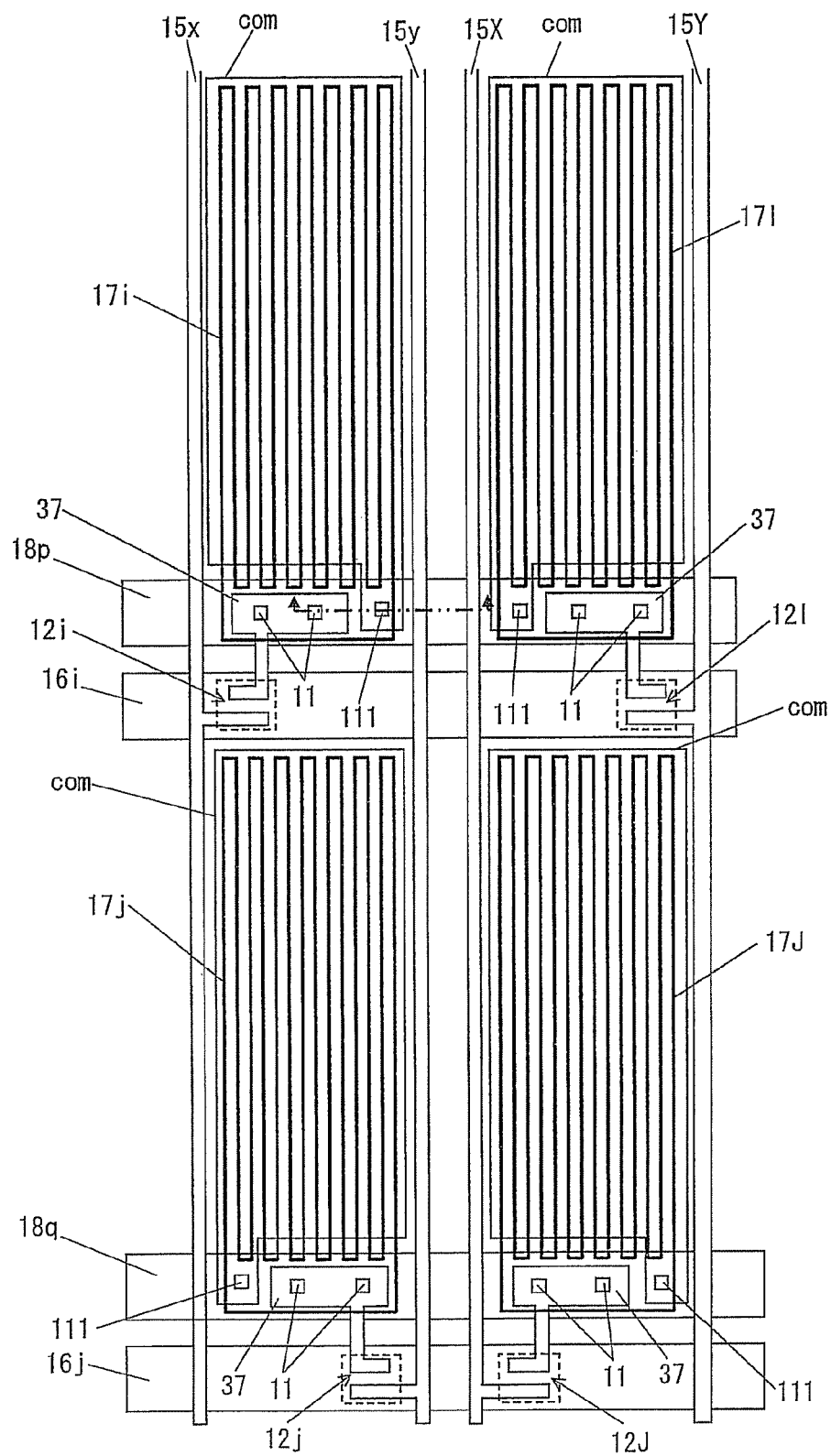
FIG. 7 is a plan view illustrating another specific example of the liquid crystal panel illustrated in FIG. 2.
Figure 8:
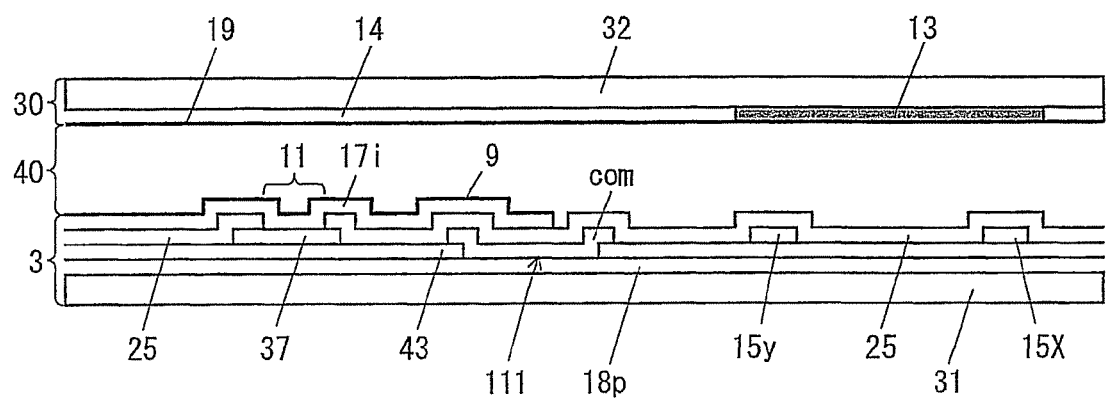
FIG. 8 is a cross sectional view of the liquid crystal panel of FIG. 7.

Another specific example of the liquid crystal panel (portion including pixels 101, 102, 105, and 106) illustrated in FIG. 2 is illustrated in FIG. 7 as a plan view and in FIG. 8 as a cross sectional view thereof. In an active matrix substrate of the present liquid crystal panel, the scanning signal lines 16i and 16j which extend in a row direction and the storage capacitor wires 18p and 18q which extend in the row direction are provided on the transparent substrate 31. The gate insulating film 43 is provided so as to cover these members, and on the gate insulating film 43, a metal layer is formed, which metal layer includes: the data signal lines 15x, 15y, 15X, 15Y each extending in the column direction; semiconductor layers (i layer and n+ layer) and source electrode and drain electrode for each of transistors 12i, 12j, 12I, 12J; capacitor electrodes 37; and a common electrode com. Moreover, an inorganic interlayer insulating film 25 is provided so as to cover the metal layer. On the inorganic interlayer insulating film 25, comb-shaped pixel electrodes 17i, 17j, 17I, 17J are formed, and an alignment film 9 is formed so as to cover these pixel electrodes. The inorganic interlayer insulating film 25 is hollowed through at a section in which the contact hole 11 is formed; this allows for the pixel electrodes to be in contact with the capacitor electrode 37. Moreover, at where the contact hole 111 is formed, the gate insulating film 43 is hollowed through, whereby allowing for the common electrode com to be in contact with the storage capacitor wire. On the other hand, the color filter substrate 30 has a black matrix 13 and a colored layer (color filter layer) 14 formed on the glass substrate 32, and an alignment film 19 is formed thereon so as to cover these members.

In the present liquid crystal panel, a transmittance of liquid crystal is controlled by an oblique electric field generated between the comb-shaped pixel electrode and the common electrode com. Hence, it is possible to improve the viewing angle characteristics.

Figure 9:
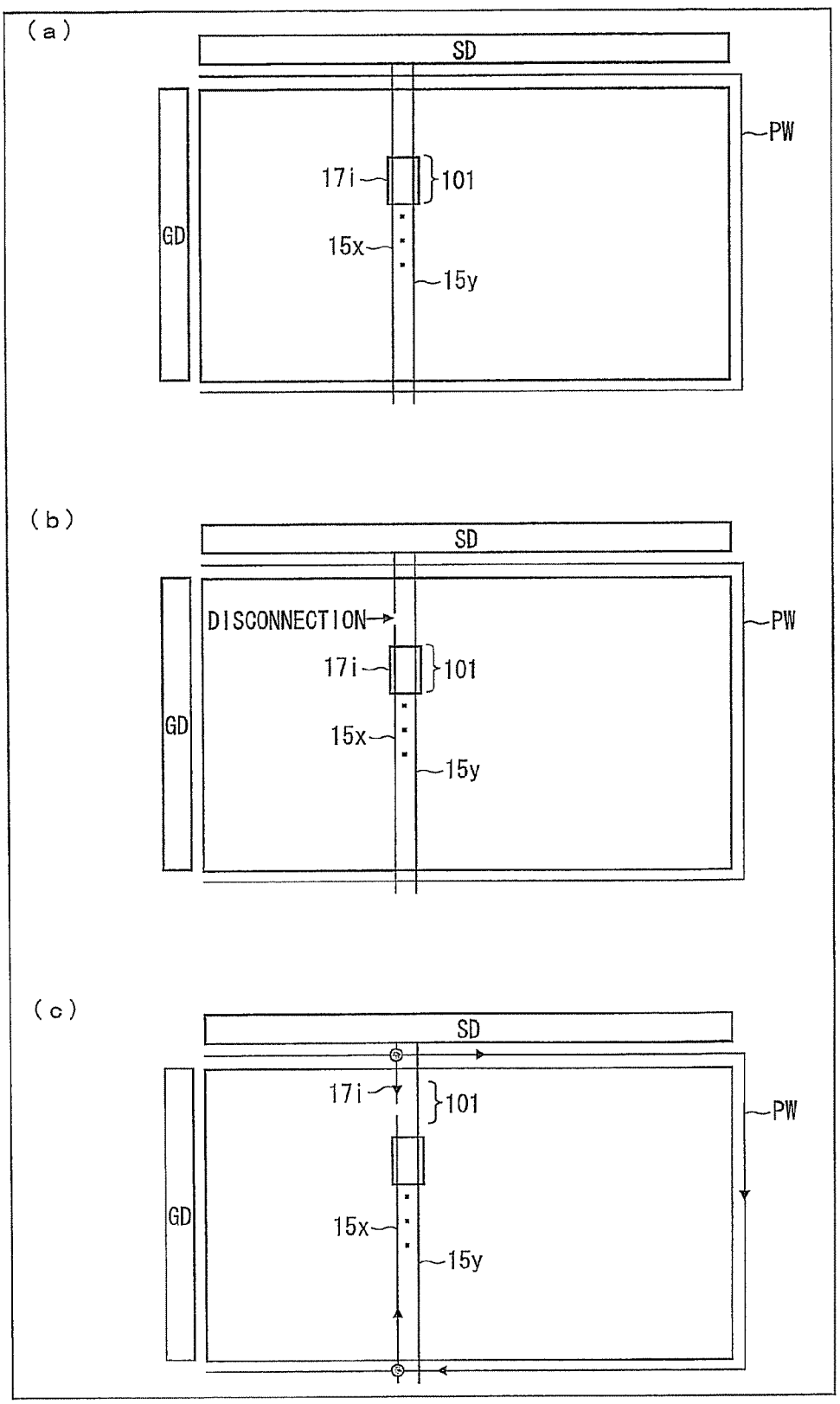
FIG. 9 is a schematic view illustrating how to repair a disconnection of a data signal line in a liquid crystal panel according to Embodiment 1.

As illustrated in (a) of FIG. 9, it is preferable to provide a spare wire PW for correcting a disconnection of the data signal line in the present liquid crystal display apparatus. The spare wire PW is drawn around a display region, and for example in a case where the data signal line 15x becomes disconnected as illustrated in (b) of FIG. 9, the vicinity of an input end (closest part to the source driver) of the data signal line 15x and the vicinity of an output end (most distant part from the source driver) of the data signal line 15x are connected to each other via the spare wire PW (see (c) of FIG. 9). This allows for transmitting data signals to parts downstream of the disconnected part (part from the disconnected part to the output end) via the spare wire PW, and as a result can repair the disconnection of the data signal line 15x.

If there is the phenomenon that the size of the ripple increases as the supply source of the data signal becomes more distant (see FIG. 36), providing a spare wire would leave a repair mark since the size of the ripple in the part downstream of the disconnected part (particularly in the vicinity of the output end) becomes different from its surroundings. However, the present liquid crystal display apparatus allows for preventing such a phenomenon; hence, it is advantageous in a point that no repair mark is caused.

Figure 10:
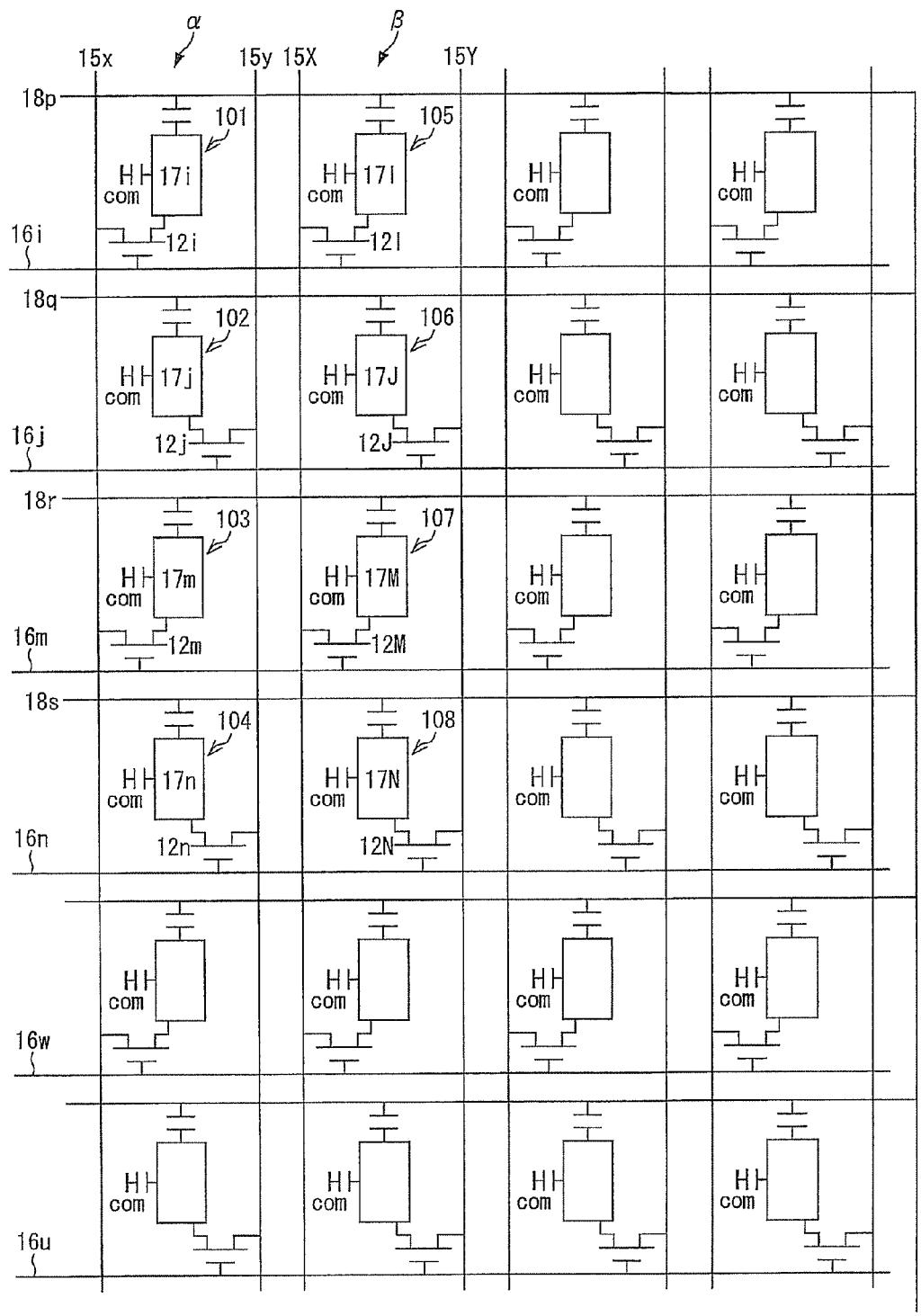
FIG. 10 is an equivalent circuit diagram of another configuration of the liquid crystal panel according to Embodiment 1.

The present liquid crystal panel may be configured as illustrated in FIG. 10. Namely, one pixel electrode is disposed per pixel; the pixel electrode 17i of pixel 101 is connected to the data signal line 15x via the transistor 12i that is connected to the scanning signal line 16i, the pixel electrode 17j of the pixel 102 is connected to the data signal line 15y via the transistor 12j that is connected to the scanning signal line 16j, the pixel electrode 17m of the pixel 103 is connected to the data signal line 15x via the transistor 12m that is connected to the scanning signal line 16m, the pixel electrode 17n of the pixel 104 is connected to the data signal line 15y via the transistor 12n that is connected to the scanning signal line 16n, the pixel electrode 17I of the pixel 105 is connected to the data signal line 15X via the transistor 12I that is connected to the scanning signal line 16i, the pixel electrode 17J of the pixel 106 is connected to the data signal line 15Y via the transistor 12J of the scanning signal line 16j, the pixel electrode 17M of the pixel 107 is connected to the data signal line 15X via the transistor 12M that is connected to the scanning signal line 16m, and the pixel electrode 17N of the pixel 108 is connected to the data signal line 15Y via the transistor 12N of the scanning signal line 16n.

Figure 11:
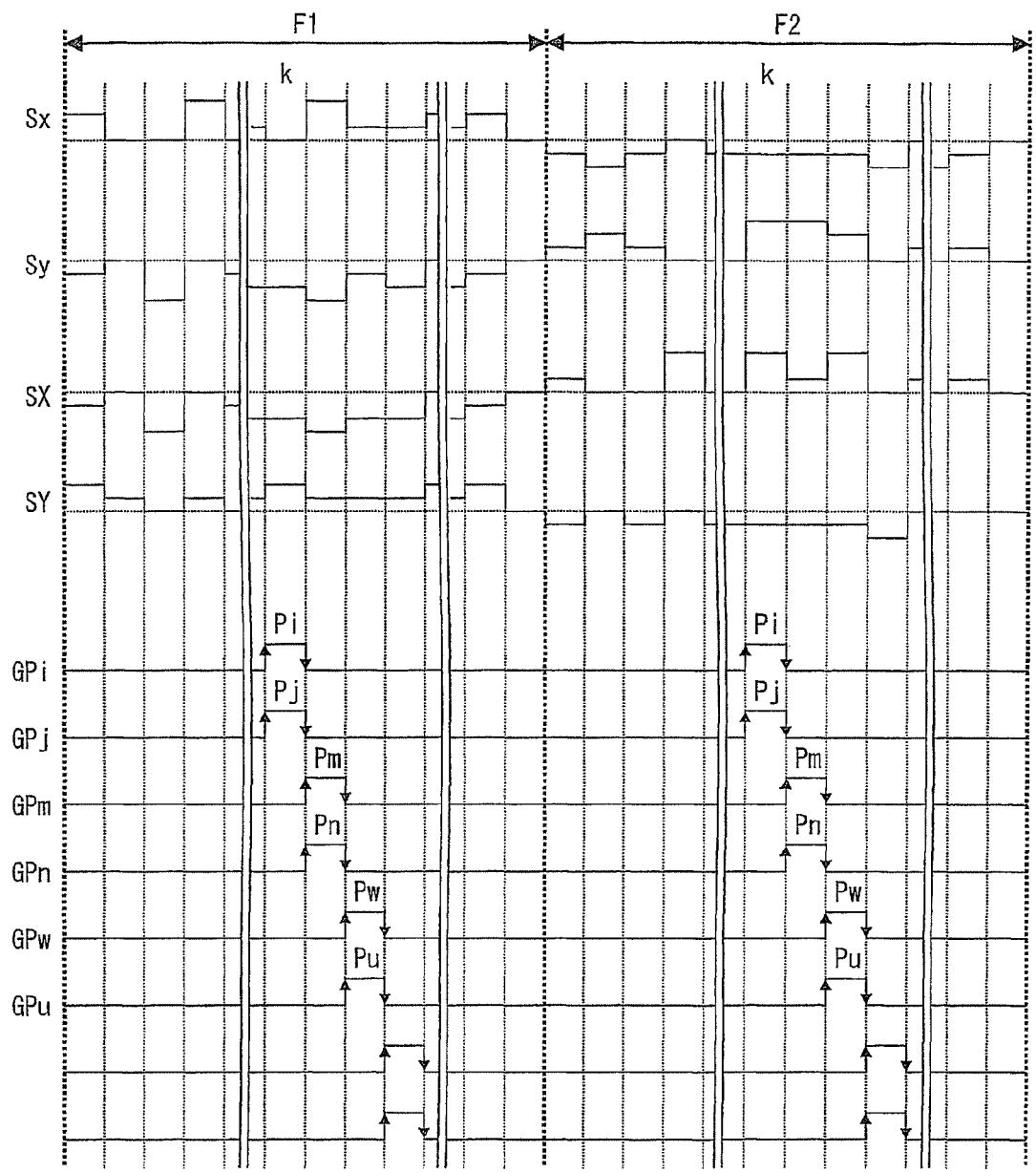
FIG. 11 is a timing chart illustrating a driving method of a liquid crystal display apparatus including the liquid crystal panel of FIG. 10.
Figure 12:
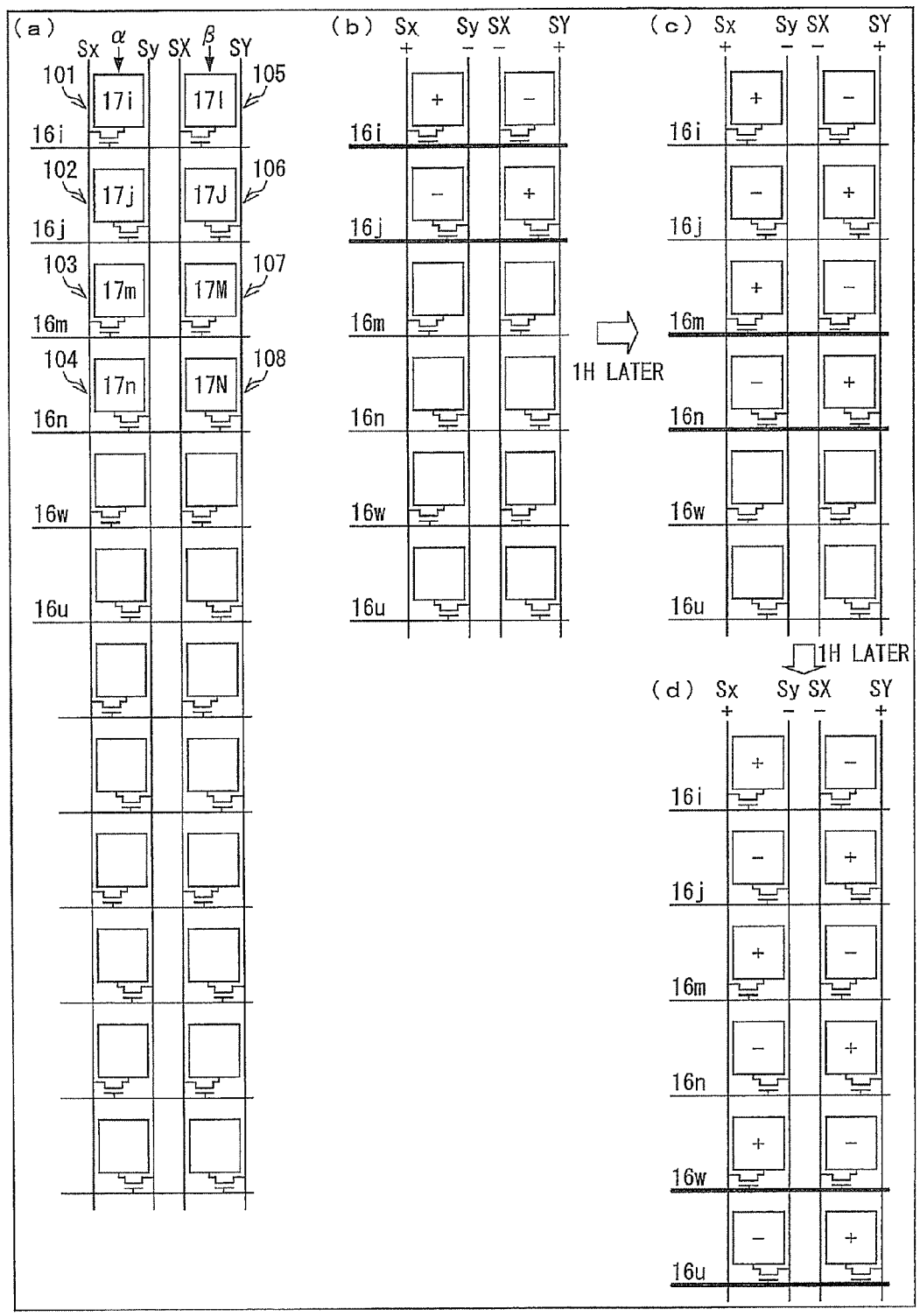
FIG. 12 is a schematic view illustrating a display state of a liquid crystal display apparatus which is driven by the driving method of FIG. 11.

In a case where a liquid crystal display apparatus including the liquid crystal panel of FIG. 10 is driven, a dot-reversal polarity distribution of data signals written into the pixels can be achieved in F1, as illustrated in (a) to (d) of FIG. 12, by supplying, in F1, data signals of the positive polarity to the data signal lines 15x and 15Y and supplying data signals of the negative polarity in the data signal lines 15y and 15X, as illustrated in FIG. 11. Moreover, the dot reversal polarity distribution of data signals to be written into the pixels can also be achieved in F2, by supplying, in F2, data signals of the negative polarity to the data signal lines 15x and 15Y and supplying the data signals of the positive polarity to the data signal lines 15y and 15X.

Embodiment 2

Figure 13:
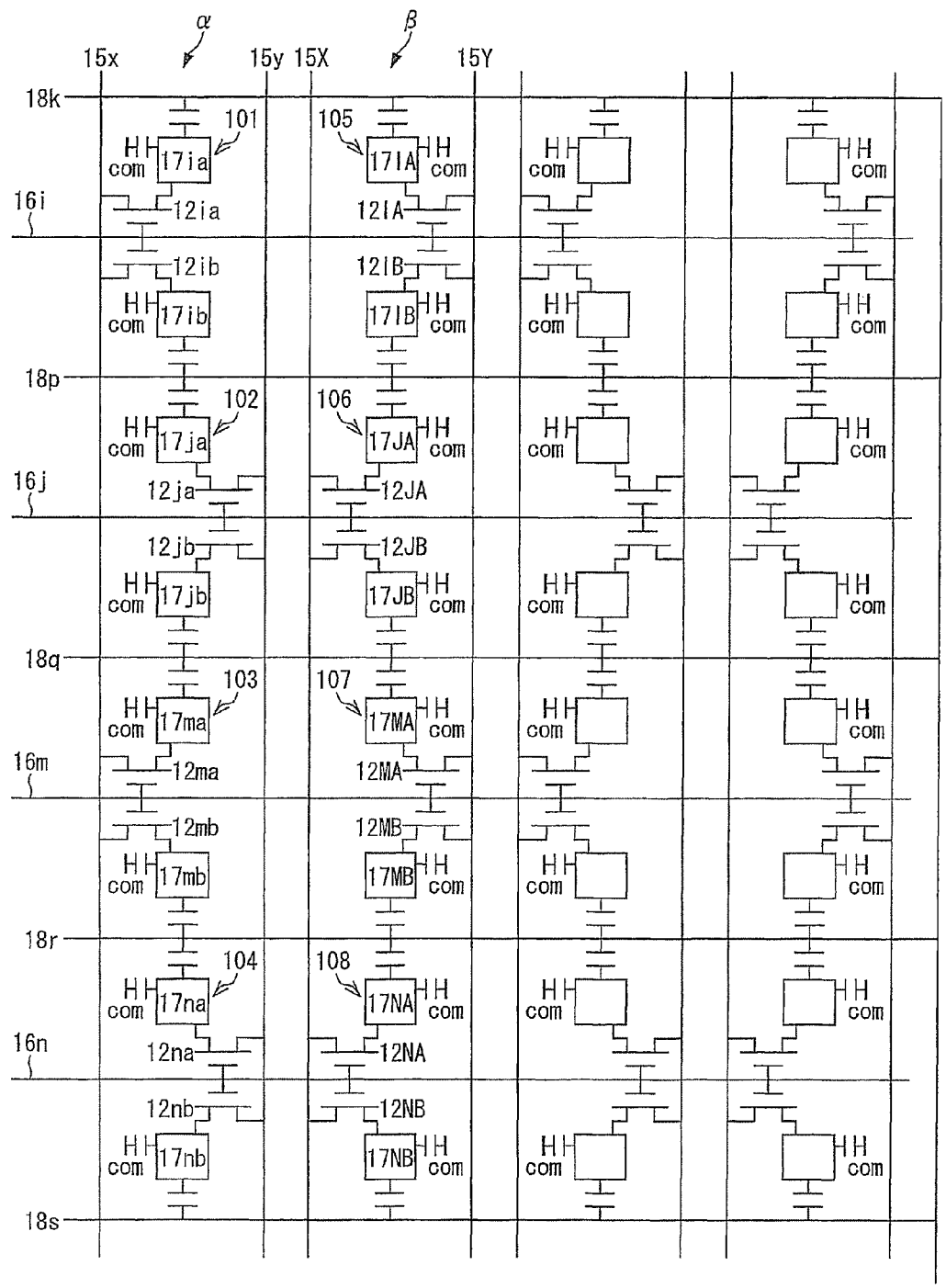
FIG. 13 is an equivalent circuit diagram illustrating a configuration of a liquid crystal panel according to Embodiment 2.

FIG. 13 is an equivalent circuit diagram illustrating a portion of a liquid crystal panel according to Embodiment 2. As illustrated in FIG. 13, in the present liquid crystal panel, the data signal lines 15x, 15y, 15X, and 15Y are arranged in this order, and the scanning signal lines 16i, 16j, 16m, and 16n, each of which extend in the row direction (left-right direction of FIG. 13) are arranged in this order. The pixel 101 is provided between intersections where the scanning signal line 16i intersects with the data signal lines 15x and 15y, the pixel 102 is provided between intersections where the scanning signal line 16j intersects with the data signal lines 15x and 15y, the pixel 103 is provided between intersections where the scanning signal line 16m intersects with the data signal lines 15x and 15y, the pixel 104 is provided between intersections where the scanning signal line 16n intersects with the data signal lines 15x and 15y, the pixel 105 is provided between intersections where the scanning signal line 16i intersects with the data signal lines 15X and 15Y, the pixel 106 is provided between intersections where the scanning signal line 16j intersects with the data signal lines 15X and 15Y, the pixel 107 is provided between intersections where the scanning signal line 16m intersects with the data signal lines 15X and 15Y, and the pixel 108 is provided between intersections where the scanning signal line 16n intersects with the data signal lines 15X and 15Y. A storage capacitor wire 18k is provided associated with the pixels 101 and 105, the storage capacitor wire 18p is provided associated with the pixels 101, 105, 102, 106, the storage capacitor wire 18q is provided associated with the pixels 102, 106, 103, 107, the storage capacitor wire 18r is provided associated with the pixels 103, 107, 104, 108, and the storage capacitor wire 18s is provided associated with the pixels 104, 108.

Adjacent to a pixel column α which includes the pixels 101 to 104 is disposed a pixel column β which includes the pixels 105 to 108; the data signal lines 15x and 15y are provided associated with the pixel column α, and the data signal lines 15X and 15Y are provided associated with the pixel column β.

Furthermore, two pixel electrodes are provided per pixel: a pixel electrode 17ia of the pixel 101 is connected to the data signal line 15x via a transistor 12ia that is connected to the scanning signal line 16i, and a pixel electrode 17ib of the pixel 101 is connected to the data signal line 15x via a transistor 12ib that is connected to the scanning signal line 16i; a pixel electrode 17ja of the pixel 102 is connected to the data signal line 15y via a transistor 12ja that is connected to the scanning signal line 16j, and a pixel electrode 17jb of the pixel 102 is connected to the data signal line 15y via a transistor 12jb that is connected to the scanning signal line 16j; a pixel electrode 17ma of the pixel 103 is connected to the data signal line 15x via a transistor 12ma that is connected to the scanning signal line 16m, and the pixel electrode 17mb of the pixel 103 is connected to the data signal line 15x via a transistor 12mb that is connected to the scanning signal line 16m; a pixel electrode 17na of the pixel 104 is connected to the data signal line 15y via a transistor 12na that is connected to the scanning signal line 16n, and a pixel electrode 17nb of the pixel 104 is connected to the data signal line 15y via a transistor 12nb that is connected to the scanning signal line 16n; a pixel electrode 17IA of the pixel 105 is connected to the data signal line 15Y via a transistor 12IA that is connected to the scanning signal line 16i, and a pixel electrode 17IB of the pixel 105 is connected to the data signal line 15Y via a transistor 12IB that is connected to the scanning signal line 16i; and a pixel electrode 17JA of the pixel 106 is connected to the data signal line 15X via a transistor 12JA that is connected to the scanning signal line 16j, and a pixel electrode 17JB of the pixel 106 is connected to the data signal line 15X via a transistor 12JB that is connected to the scanning signal line 16j.

Note that the scanning signal line 16i and the scanning signal line 16j are selected simultaneously, and the scanning signal line 16m and the scanning signal line 16n are selected simultaneously (later described).

Moreover, respective storage capacitors are formed between the storage capacitor wire 18k and each of the pixel electrodes 17ia and 17IA, respective storage capacitors are formed between the storage capacitor wire 18p and each of the pixel electrodes 17ib, 17IB, 17ja, and 17JA, respective storage capacitors are formed between the storage capacitor wire 18q and each of the pixel electrodes 17jb, 17JB, 17ma, and 17MA, and respective storage capacitors are formed between the storage capacitor wire 18r and each of the pixel electrodes 17mb, 17MB, 17na, and 17NA. Moreover, respective liquid crystal capacitors are formed between each of the pixel electrodes and the common electrode com.

Figure 14:
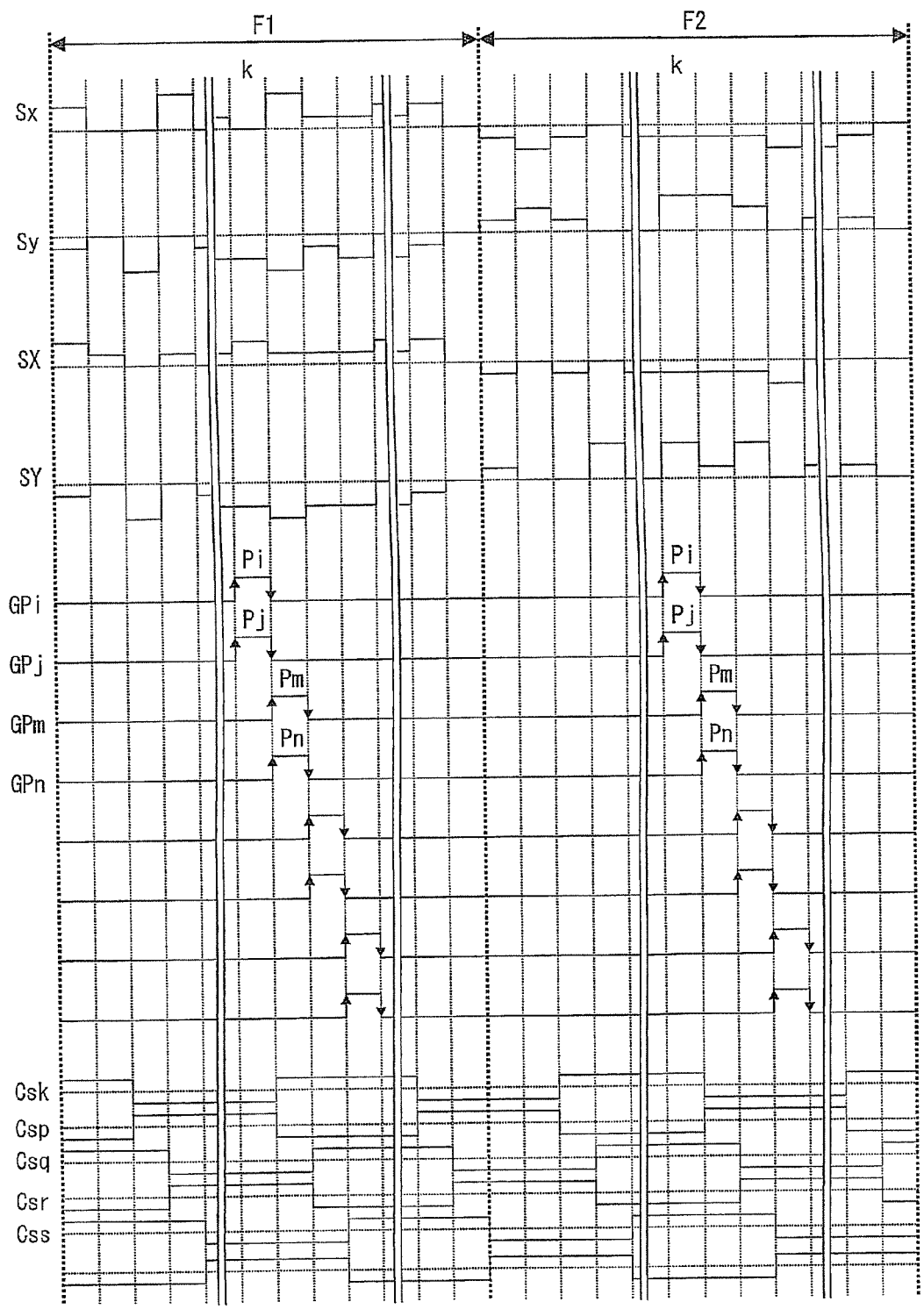
FIG. 14 is a timing chart illustrating a driving method of a liquid crystal display apparatus according to Embodiment 2.
Figure 15:
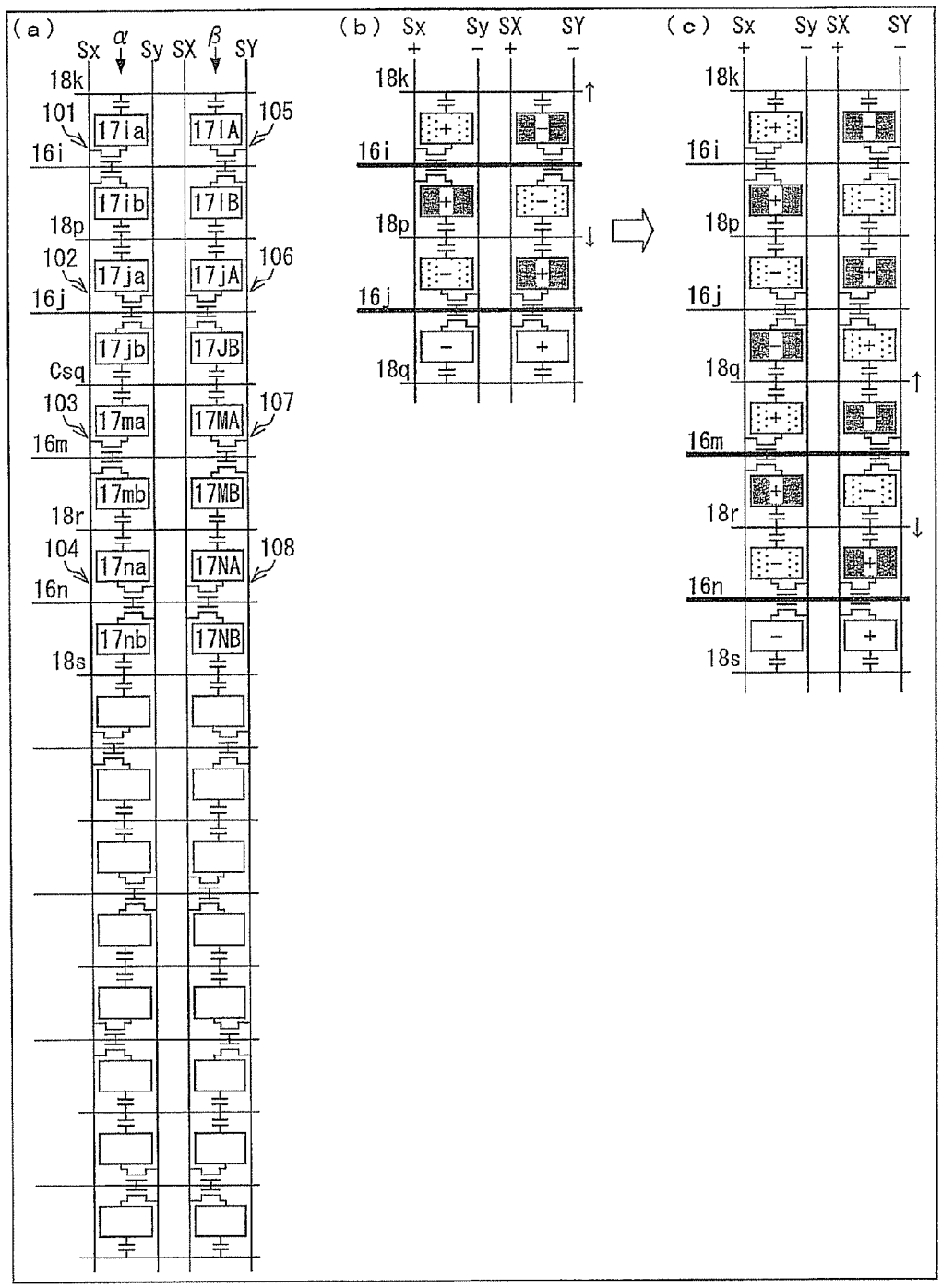
FIG. 15 is a schematic view illustrating a display state of a liquid crystal display apparatus which is driven by the driving method of FIG. 14.

FIG. 14 is a timing chart illustrating a driving method of the present liquid crystal display apparatus including the liquid crystal panel (normally black mode) illustrated in FIG. 13. Note that Sx, Sy, SX, and SY represent data signals (data signals) supplied to the data signal lines 15x, 15y, 15X, and 15Y, respectively, GPi, GPj, GPm, and GPn represent gate pulse signals supplied to the scanning signal lines 16i, 16j, 16m, and 16n, respectively, and Csk, Csp, Csq, Csr and Css represent storage capacitor wire signals supplied to the storage capacitor wires 18k, 18p, 18q, 18r, and 18s, respectively. Moreover, (a) of FIG. 15 illustrates a schematic view of a portion of FIG. 14, and (b) and (c) of FIG. 15 are schematic views illustrating a write state of the portion illustrated in (a) of FIG. 15 from the kth horizontal scanning period to the (k+1)th horizontal scanning period in FIG. 14.

As illustrated in FIG. 14, in the present driving method, two scanning signal lines are selected simultaneously, and data signals whose polarities are reversed per vertical scanning period (1V) are supplied to the data signal lines. In a single vertical scanning period, data signals (signal potentials) respectively supplied to two data signal lines which are associated to one pixel column are made to have different polarities, and data signals that are respectively supplied to two adjacent data signal lines which each are associated to different pixel columns are made to have different polarities. At a timing in which two scanning pulses fall, two scanning pulses rise; simultaneously with a start of a horizontal scanning period corresponding to a current stage, a scanning pulse of the current stage rises, and simultaneously with a start of a horizontal scanning period corresponding to a subsequent stage (termination of the horizontal scanning period corresponding to the current stage), the scanning pulse of the current stage falls. Furthermore, to each of the storage capacitor wires, storage capacitor wire signals having reversed polarities per 4H (horizontal scanning period) are supplied.

More specifically, in consecutive frames F1 and F2, F1 is driven by the following driving method. First, in F1, the data signal lines 15x and 15X receive data signals of a positive polarity, and the data signal lines 15y and 15Y receive data signals of a negative polarity.

Simultaneously with a start of the kth horizontal scanning period (i.e. switchover to a data signal corresponding to the kth horizontal scanning period), a pulse Pi of the gate pulse signal GPi and a pulse Pj of the gate pulse signal GPj rise, and simultaneously with a start of the (k+1)th horizontal scanning period (termination of the kth horizontal scanning period), the pulse Pi and the pulse Pj fall. Furthermore, simultaneously with the start of the (k+1)th horizontal scanning period (termination of the kth horizontal scanning period), the storage capacitor wire signal Csk is reversed from the negative polarity to the positive polarity, and the storage capacitor wire signal Csp is reversed from the positive polarity to the negative polarity.

As a result, as illustrated in (a) and (b) of FIG. 15, the electric potential of the pixel electrode 17ia is of a positive polarity and its effective potential is higher than an electric potential of a data signal written in, thereby causing the sub pixel including the pixel electrode 17ia to be a bright sub-pixel, whereas the electric potential of the pixel electrode 17ib is of a positive polarity and its effective potential is lower than the electric potential of the data signal written in, thereby causing the sub pixel including the pixel electrode 17ib to be a dark sub-pixel. Moreover, an electric potential of the pixel electrode 17IA is of a negative polarity and its effective potential is higher than an electric potential of the data signal written in, thereby causing the sub pixel including the pixel electrode 17IA to be a dark sub-pixel, whereas the electric potential of the pixel electrode 17IB is of a negative polarity and its effective potential is lower than the electric potential of the data signal written in, thereby causing the sub pixel including the pixel electrode 17IB to be a bright sub-pixel. Moreover, the electric potential of the pixel electrode 17ja is of a negative polarity and its effective potential is lower than the electric potential of the data signal written in, thereby causing the sub pixel including the pixel electrode 17ja to be a bright sub-pixel, whereas the electric potential of the pixel electrode 17JA is of a positive polarity and its effective potential is lower than the electric potential of the data signal written in, thereby causing the sub pixel including the pixel electrode 17JA to be a dark sub-pixel. Moreover, a data signal of a negative polarity is written into the pixel electrode 17jb, and a data signal of a positive polarity is written into the pixel electrode 17JB.

Thereafter, simultaneously with the start of the (k+1)th horizontal scanning period, the pulse Pm of the gate pulse signal GPm and the pulse Pn of the gate pulse signal GPn rise, and simultaneously with the start of the (k+2)th horizontal scanning period, the pulse Pm and the pulse Pn fall. Furthermore, simultaneously with the start of the (k+2)th horizontal scanning period, the storage capacitor wire signal Csq is reversed from the negative polarity to the positive polarity, and the storage capacitor wire signal Csr is reversed from the positive polarity to the negative polarity.

As a result, as illustrated in (a) and (c) of FIG. 15, the electric potential of the pixel electrode 17jb is of a negative polarity and its effective potential is higher than the electric potential of the data signal written in, thereby causing the sub pixel including the pixel electrode 17jb to be a dark sub-pixel, whereas the electric potential of the pixel electrode 17JB is of a positive polarity and its effective potential is higher than the electric potential of the data signal written in, thereby causing the sub pixel including the pixel electrode 17JB to be a bright sub-pixel. Moreover, the electric potential of the pixel electrode 17ma is of a positive polarity and its effective potential is higher than the electric potential of the data signal written in, thereby causing the sub pixel including the pixel electrode 17ma to be a bright sub-pixel, whereas the electric potential of the pixel electrode 17mb is of a positive polarity and its effective potential is lower than the electric potential of the data signal written in, thereby causing the sub pixel including the pixel electrode 17mb to be a dark sub-pixel. Moreover, the electric potential of the pixel electrode 17MA is of a negative polarity and its effective potential is higher than the electric potential of the data signal written in, thereby causing the sub pixel including the pixel electrode 17MA to be a dark sub-pixel, whereas the electric potential of the pixel electrode 17MB is of a negative polarity and its effective potential is lower than the electric potential of the data signal written in, thereby causing the sub pixel including the pixel electrode 17MB to be a bright sub-pixel. Moreover, the electric potential of the pixel electrode 17na is of a negative polarity, and its effective potential is lower than the electric potential of the data signal written in, thereby causing the sub pixel of the pixel electrode 17na to be a bright sub-pixel, whereas the electric potential of the pixel electrode 17NA is of a positive polarity and its effective potential is lower than the electric potential of the data signal written in, thereby causing the sub pixel including the pixel electrode 17NA be a dark sub-pixel. Moreover, data signals of the negative polarity are written into the pixel electrode 17nb, and data signals of a positive polarity are written into the pixel electrode 17NB.

The above allows for having a dot reversal polarity distribution of the data signals written into the pixels in F1, and further allows for displaying a light-and-dark checkered display (display in which bright sub-pixels and dark sub-pixels are alternately aligned in each of the row direction and the column direction).

On the other hand, the following drive method is performed in F2. First, in F1, the data signal lines 15x and 15X receive data signals of the negative polarity, and the data signal lines 15y and 15Y receive data signals of a positive polarity.

Simultaneously with a start of the kth horizontal scanning period (i.e., switchover of data signals corresponding to the kth horizontal scanning period), the pulse Pi of the gate pulse signal GPi and the pulse Pj of the gate pulse signal GPj rise, and simultaneously with the start of the (k+1)th horizontal scanning period (termination of the kth horizontal scanning period), the pulse Pi and the pulse Pj fall. Furthermore, simultaneously with the start of the (k+1)th horizontal scanning period (termination of the kth horizontal scanning period), the storage capacitor wire signal Csk is reversed from the positive polarity to the negative polarity, and the storage capacitor wire signal Csp is reversed from the negative polarity to the positive polarity.

Thereafter, simultaneously with the start of the (k+1)th horizontal scanning period, the pulse Pm of the gate pulse signal GPm and the pulse Pn of the gate pulse signal GPn rise, and simultaneously with the start of the (k+2)th horizontal scanning period, the pulse Pm and the pulse Pn fall. Furthermore, simultaneously with the start of the (k+2)th horizontal scanning period, the storage capacitor wire, signal Csq is reversed from the positive polarity to the negative polarity, and the storage capacitor wire signal Csr is reversed from the negative polarity to the positive polarity.

With the present liquid crystal display apparatus, it is possible to display a halftone with use of the bright and dark sub-pixels, which allows for improving viewing angle characteristics. Moreover, the light-and-dark checkered display allows for preventing striped unevenness, which is caused by having the bright sub pixels or dark sub pixels be consecutively arranged.

Moreover, also with the present liquid crystal display apparatus, two scanning pulses rise at a timing in which two scanning pulses fall. Accordingly, an effect (fall of electric potential) received by the data signal line due to the fall of the two scanning pulses is canceled out by the effect (rise of electric potential) received by the data signal lines due to the rise of the two scanning pulses. This as a result allows for reducing the ripple (wavelike variation) in the electric potential of the data signal lines in the 1V reversal driving, which prevents the phenomenon that the size of the ripple increases as the supply source of the data signal becomes more distant (see FIG. 36), thereby improving the display quality.

Figure 16:
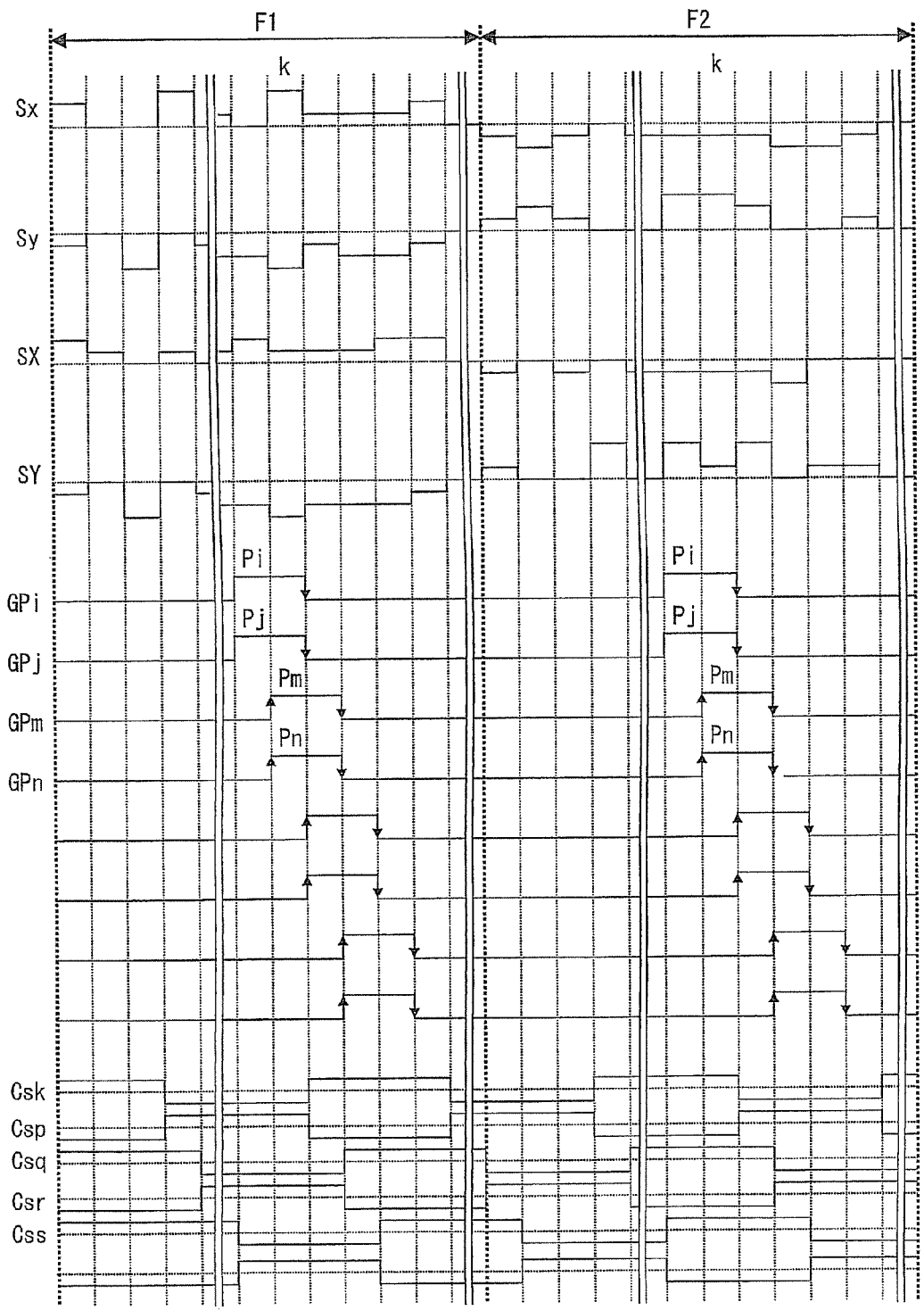
FIG. 16 is a timing chart illustrating another driving method of a liquid crystal display apparatus according to Embodiment 2.

In the driving method of FIG. 14, simultaneously with the start of the horizontal scanning period corresponding to the current stage the scanning pulse of the current stage rises, and simultaneously with the start of the horizontal scanning period corresponding to a subsequent stage (termination of the horizontal scanning period corresponding to the current stage) the scanning pulse of the current stage falls. However, the driving method is not limited to this example. For example, the scanning pulse of the current stage may be risen simultaneously with a start of a horizontal scanning period corresponding to a preceding stage, and the scanning pulse of the current stage may be fallen simultaneously with a start of the horizontal scanning period corresponding to a subsequent stage (termination of a horizontal scanning period corresponding to the current stage), as illustrated in FIG. 16. In this case, the scanning pulse has a width of 2H.

More specifically, the pulse Pi and the pulse Pj rise simultaneously with the start of the (k−1)th horizontal scanning period, the pulse Pm and the pulse Pn rise simultaneously with the start of the kth horizontal scanning period, the pulse Pi and the pulse Pj fall simultaneously with the start of the (k+1)th horizontal scanning period (termination of kth horizontal scanning period), and the pulse Pm and the pulse Pn fall simultaneously with the start of the (k+2)th horizontal scanning period.

The driving method of FIG. 16 allows for precharging in the first half (1H) of the pulse and allow for carrying out a main write in the second half (1H) of the pulse. Hence, it is possible to improve the pixel charging rate. In this case also, two scanning pulses rise at a timing in which two scanning pulses fall, which allows for preventing the phenomenon that the size of the ripple increases as the supply source of the data signal becomes more distant (see FIG. 36), thereby improving the display quality.

Figure 17:
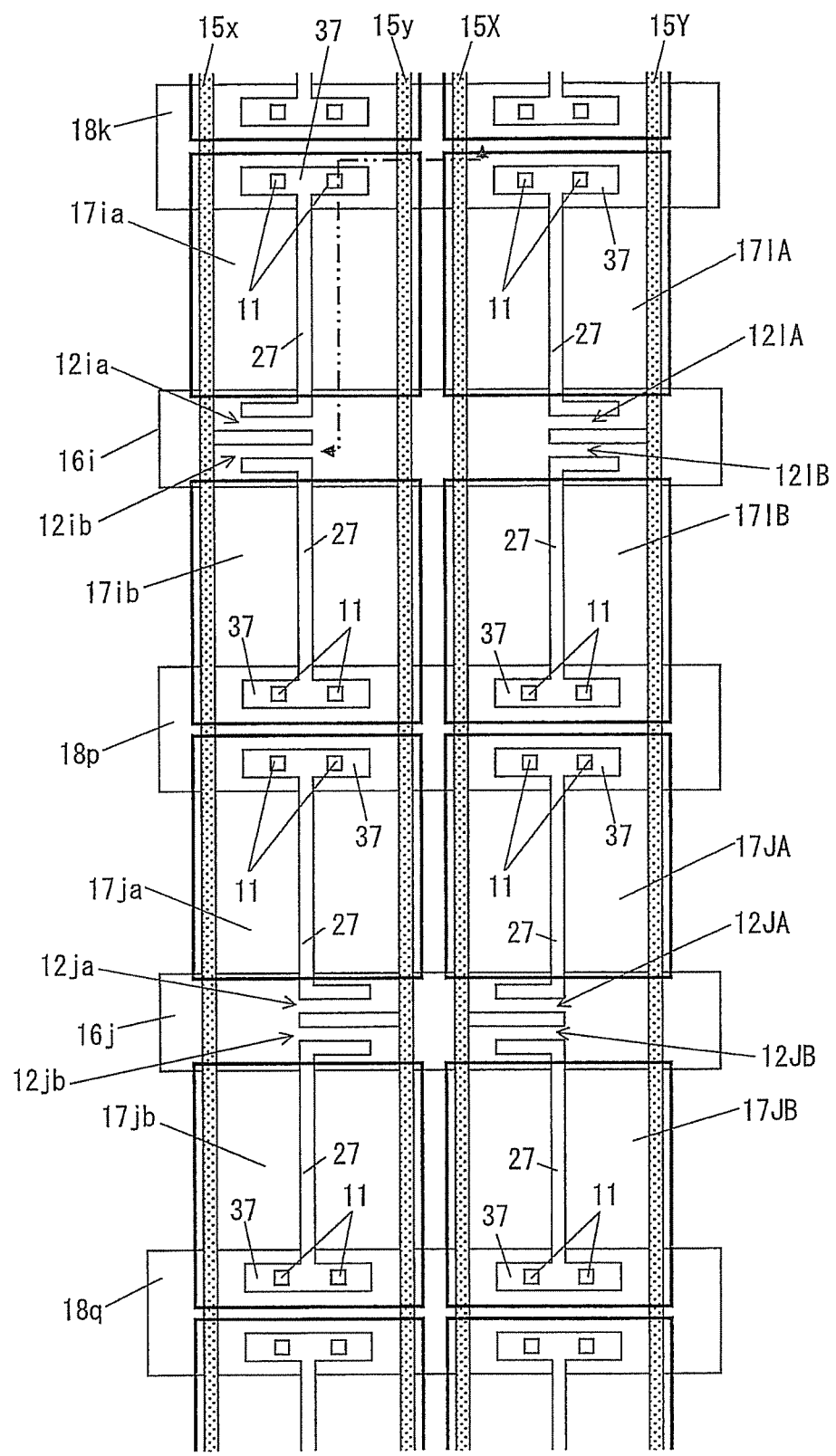
FIG. 17 is a plan view illustrating a specific example of the liquid crystal panel of FIG. 13.
Figure 18:
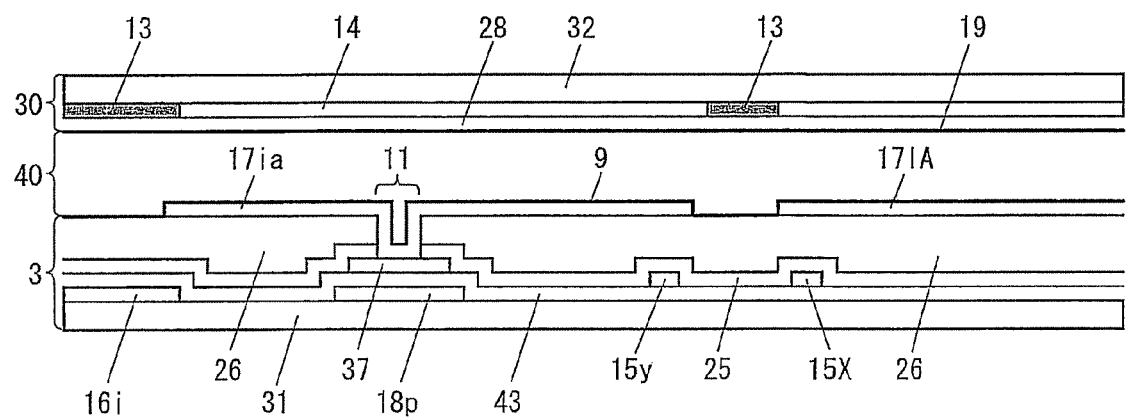
FIG. 18 is a cross sectional view illustrating the liquid crystal panel of FIG. 17.

One specific example of the liquid crystal panel of FIG. 13 (portion including pixels 101, 102, 105, and 106) is illustrated as a plan view in FIG. 17 and as a cross sectional view in FIG. 18. In the active matrix substrate of the present liquid crystal panel, the scanning signal lines 16$i$ and 16$j$ which extend in a row direction and storage capacitor wires 18$k$, 18$p$, and 18$q$ which extend in the row direction are provided on a transparent substrate 31. A gate insulating film 43 is provided so as to cover these members, and on the gate insulating film 43, a metal layer is formed, which metal layer includes: the data signal lines 15$x$, 15$y$, 15X, and 15Y each extending in a column direction; semiconductor layers (i layer and n+ layer) and source electrodes and drain electrodes for each of the transistors 12$ia$, 12$ib$, 12$ja$, 12$jb$, 12IA, 12IB, 12JA, and 12JB; drain draw-out electrodes 27; and capacitor electrodes 37. Moreover, an inorganic interlayer insulating film 25 is provided so as to cover the metal layer, and an organic interlayer insulating film 26 which is thicker than the inorganic interlayer insulating film 25 is formed on an upper layer of the inorganic interlayer insulating film 25. Furthermore, pixel electrodes 17$ia$, 17$ib$, 17$ja$, 12$jb$, 17IA, 17IB, 17JA, and 17JB are formed on the organic interlayer insulating film 26, and an alignment film 9 is formed so as to cover these pixel electrodes. The inorganic interlayer insulating film 25 and the organic interlayer insulating film 26 are hollowed through at a section in which contact holes 11 are opened; this allows for the pixel electrodes to be in contact with respective capacitor electrodes 37. Meanwhile, the color filter substrate 30 has a black matrix 13 and a colored layer (color filter layer) 14 formed on the glass substrate 32, and a common electrode (com) 28 is formed on an upper layer of these layers. Furthermore, an alignment film 19 is provided so as to cover the common electrode 28.

In the present liquid crystal panel, for instance, an edge of the pixel electrode 17$ia$ on an upstream side in the scanning direction overlaps the storage capacitor wire 18$k$, whereas an edge of the pixel electrode 17$ia$ on a downstream side in scanning direction overlaps an edge of the scanning signal line 16$i$ on the upstream side in the scanning direction. From a plan view perspective, two edges of the pixel electrode 17$ia$ which run along the column direction of the pixel electrode 17$ia$ cover the data signal line 15$x$ and data signal line 15$y$, respectively. Moreover, an edge of the pixel electrode 17$ib$ on the upstream side in the scanning direction overlaps an edge of the scanning signal line 16$i$ on the downstream side in the scanning direction, whereas an edge of the pixel electrode 17$ib$ on the downstream side in the scanning direction overlaps the storage capacitor wire 18$p$. From a plan view perspective, the two edges of the pixel electrode 17$ib$ which run along the column direction of the pixel electrode 17$ib$ cover the data signal line 15$x$ and data signal line 15$y$, respectively. Moreover, a storage capacitor is formed in a part on which the capacitor electrode overlaps the storage capacitor wire electrode in such a manner that a gate insulating film is sandwiched between the capacitor electrode and the storage capacitor wire.

Embodiment 3

Figure 19:
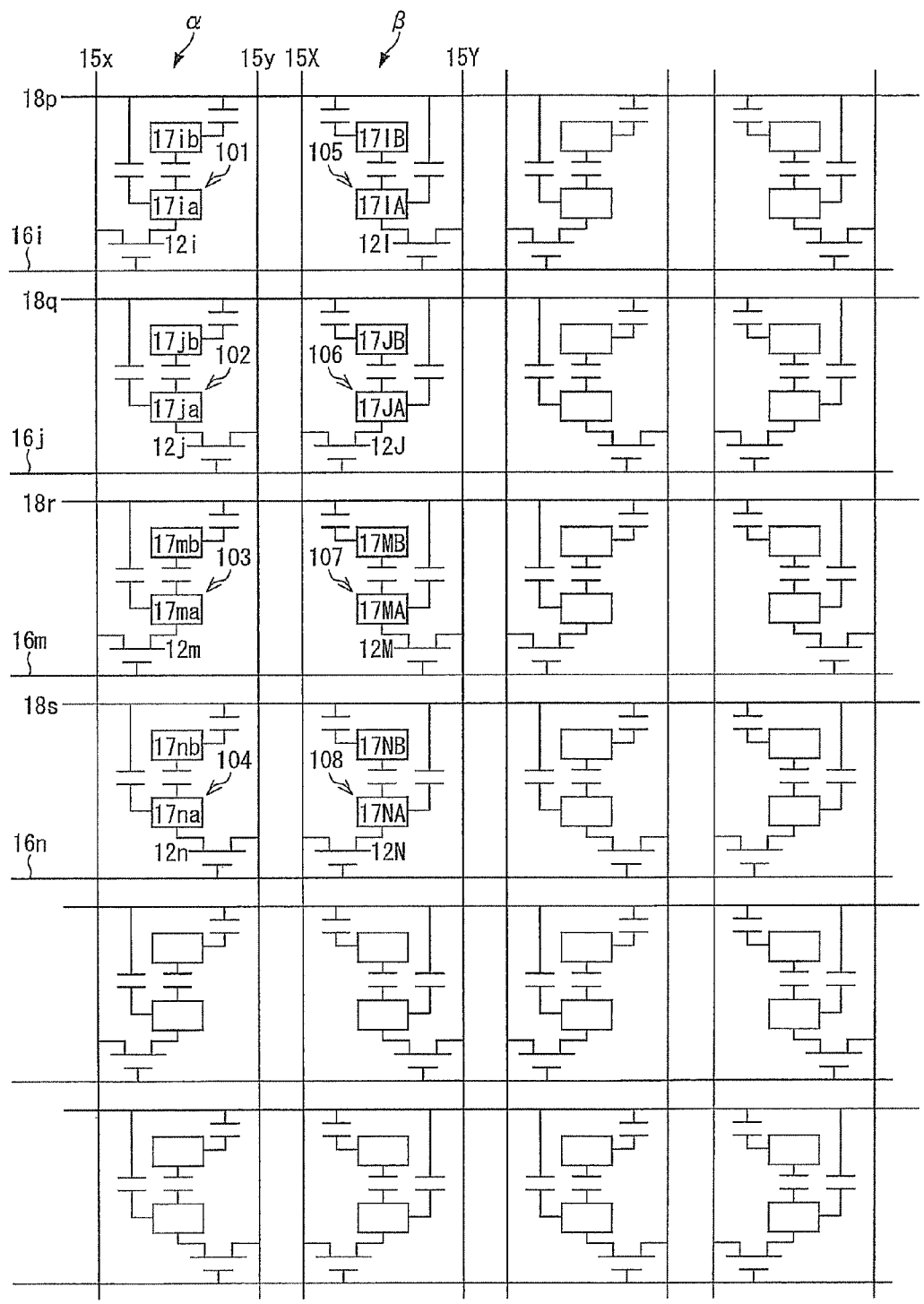
FIG. 19 is an equivalent circuit diagram illustrating a configuration of a liquid crystal panel according to Embodiment 3.

FIG. 19 is an equivalent circuit diagram illustrating a portion of a liquid crystal panel according to Embodiment 3. As illustrated in FIG. 19, dispositions of the data signal lines, the scanning signal lines, the storage capacitor wires, the transistors, and the pixels in the present liquid crystal panel are all the same as those in FIG. 2.

Two pixel electrodes are provided per pixel: a pixel electrode 17$ia$ of the pixel 101 is connected to the data signal line 15$x$ via the transistor 12$i$ that is connected to the scanning signal line 16$i$, and a pixel electrode 17$ib$ of the pixel 101 is connected to the pixel electrode 17$ia$ via a coupling capacitor; a pixel electrode 17$ja$ of the pixel 102 is connected to the data signal line 15$y$ via the transistor 12$j$ that is connected to the scanning signal line 16$j$; a pixel electrode 17$jb$ of the pixel 102 is connected to the pixel electrode 17$ja$ via a coupling capacitor; a pixel electrode 17$ma$ of the pixel 103 is connected to the data signal line 15$x$ via the transistor 12$m$ that is connected to the scanning signal line 16$m$, and a pixel electrode 17$mb$ of the pixel 103 is connected to the pixel electrode 17$ma$ via a coupling capacitor; a pixel electrode 17$na$ of the pixel 104 is connected to the data signal line 15$y$ via the transistor 12$n$ that is connected to the scanning signal line 16$n$ and a pixel electrode 17$nb$ of the pixel 104 is connected to the pixel electrode 17$na$ via a coupling capacitor; a pixel electrode 17IA of the pixel 105 is connected to the data signal line 15Y via the transistor 12I that is connected to the scanning signal line 16$i$, and a pixel electrode 17IB of the pixel 105 is connected to the pixel electrode 17IA via a coupling capacitor; and a pixel electrode 17JA of the pixel 106 is connected to the data signal line 15X via the transistor 12J that is connected to the scanning signal line 16$j$, and a pixel electrode 17JB of the pixel 106 is connected to the pixel electrode 17JA via a coupling capacitor.

Note that the scanning signal line 16$i$ and the scanning signal line 16$j$ are selected simultaneously, and the scanning signal line 16$m$ and the scanning signal line 16$n$ are selected simultaneously (later described).

Respective storage capacitors are formed between the storage capacitor wire 18$p$ and each of the pixel electrodes 17$ia$, 17$ib$, 17IA, and 17IB, respective storage capacitors are formed between the storage capacitor wire 18$q$ and each of the pixel electrodes 17$ja$, 17$jb$, 17JA, and 17JB, respective storage capacitors are formed between the storage capacitor wire 18$r$ and each of the pixel electrodes 17$ma$, 17$mb$, 17MA, and 17MB, and respective storage capacitors are formed between the storage capacitor wire 18$s$ and each of the pixel electrodes 17$na$, 17$nb$, 17NA, and 17NB. Moreover, although not illustrated, respective liquid crystal capacitors are formed between each of the pixel electrodes and the common electrode.

Figure 20:
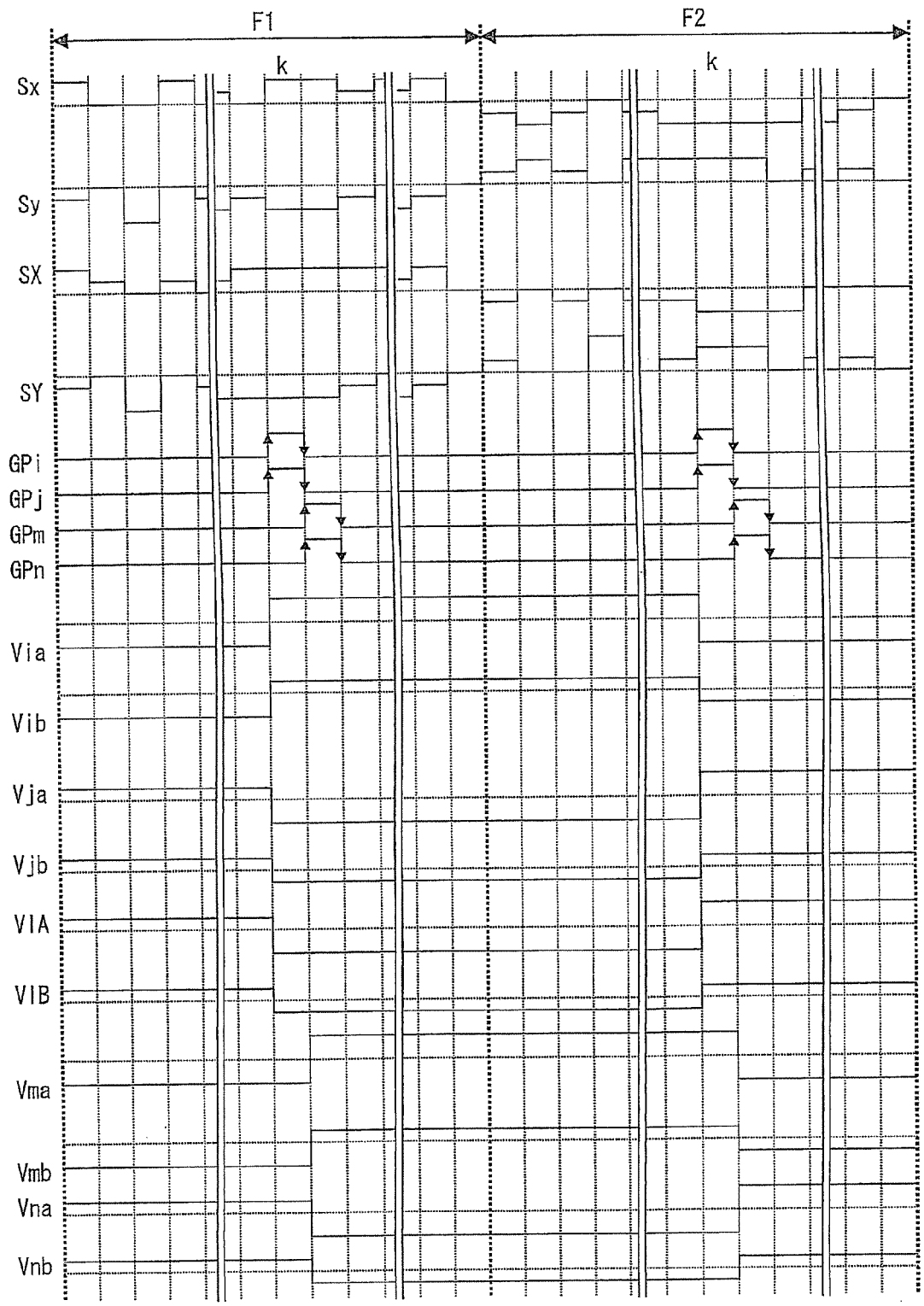
FIG. 20 is a timing chart illustrating a driving method of a liquid crystal display apparatus according to Embodiment 3.

FIG. 20 is a timing chart illustrating a driving method of the present liquid crystal display apparatus including the liquid crystal panel (normally black mode) of FIG. 19. Sx, Sy, SX, and SY represent data signals (data signals) that are supplied to the data signal lines 15$x$, 15$y$, 15X, and 15Y, respectively, and GPi, GPj, GPm, and GPn represent gate pulse signal supplied to the scanning signal lines 16$i$, 16$j$, 16$m$, and 16$n$, respectively.

Figure 21:
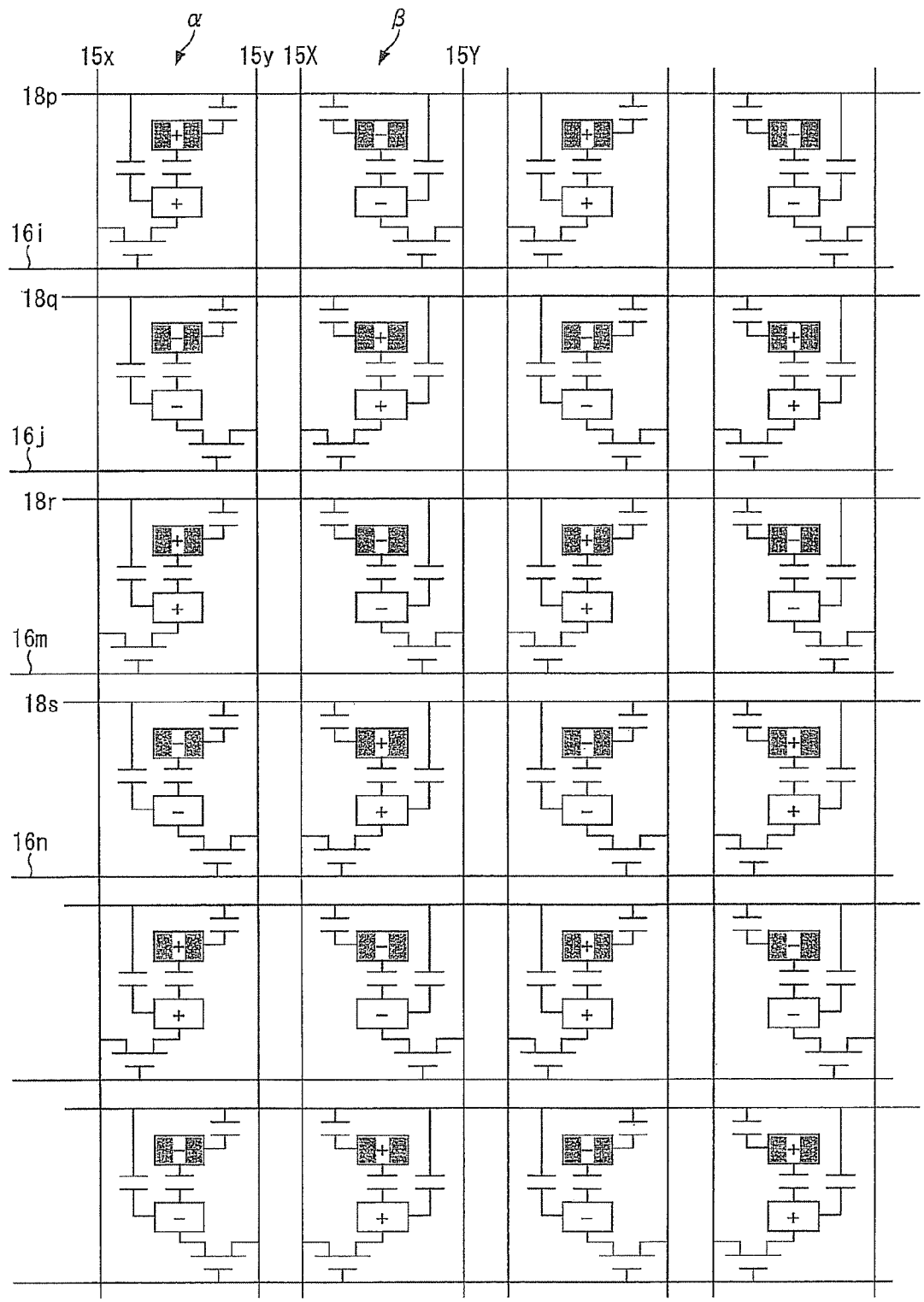
FIG. 21 is a schematic view illustrating a display state of a liquid crystal display apparatus which is driven by the driving method of FIG. 20.

As illustrated in FIG. 20, the data signal lines and the scanning signal lines are driven as illustrated in FIG. 1. Just one of the two pixel electrodes capacitively coupled within the pixel is connected to a transistor and the other pixel is electrically floating. This makes an electric potential of one of the pixel electrodes (e.g., 17$ia$) be identical to that of the data signal, and makes an electric potential of other pixel electrode (e.g., 17$ib$) be identical to the electric potential of the data signal or that close to Vcom (electric potential of the common electrode). Therefore, the electric potentials of the pixel electrodes 17$ia$, 17$ib$, 17$ja$, 17$jb$, 17IA, 17IB, 17$ma$, 17$mb$, 17$na$, and 17*nb* become as shown as Via, Vib, Vja, Vjb, VIA, VIB, Vma, Vmb, Vna, and Vnb illustrated in FIG. 20, respectively, and the polarity distribution of each of the pixels and the disposition of the bright and dark sub pixels in each of the pixels in F1 of FIG. 20, are as illustrated in FIG. 21.

Since it is also possible to display a halftone with use of the bright and dark sub pixels in the present liquid crystal display apparatus, it is possible to improve the viewing angle characteristics.

Moreover, two scanning pulses rise at a timing in which two scanning pulses fall. Accordingly, the effect (fall of electric potential) received by the data signal lines due to the fall of the two scanning pulses is canceled out by the effect (rise of electric potential) received by the data signal lines due to the rise of the two scanning pulses. This as a result allows for reducing the ripple (wavelike variation) in the electric potential of the data signal lines in the 1V reversal driving, which prevents the phenomenon that the size of the ripple increases as the supply source of the data signal becomes more distant (see FIG. 36), thereby improving the display quality.

Embodiment 4

Figure 22:
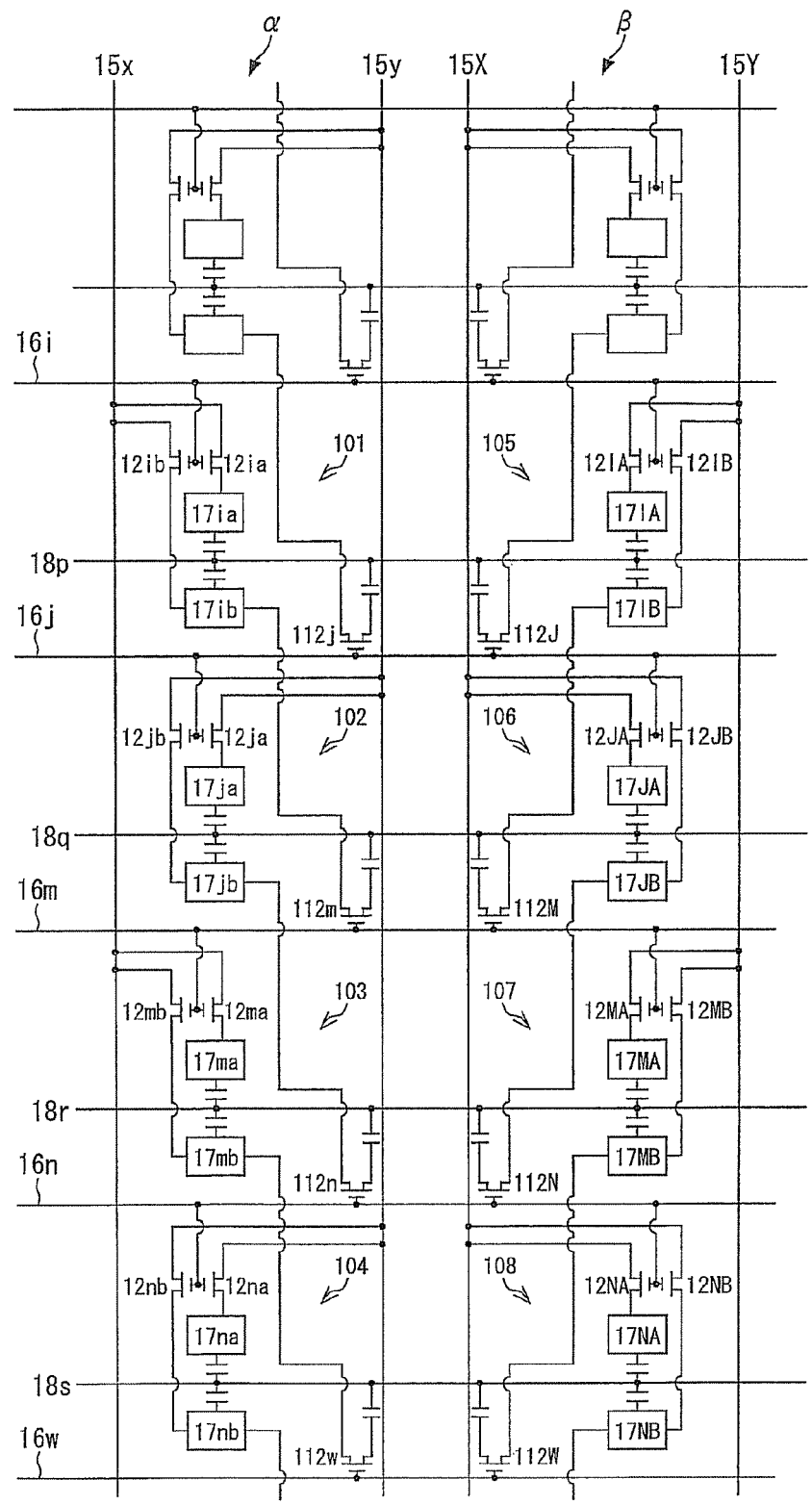
FIG. 22 is an equivalent circuit diagram illustrating a configuration of a liquid crystal panel according to Embodiment 4.

FIG. 22 is an equivalent circuit diagram illustrating a portion of a liquid crystal panel according to Embodiment 4. As illustrated in FIG. 22, the dispositions of the data signal lines, the scanning signal lines, the storage capacitor wires and the pixels in the present liquid crystal panel are identical to those in FIG. 2.

Two pixel electrodes are disposed per pixel: a pixel electrode 17*ia* of the pixel 101 is connected to the data signal line 15*x* via a transistor 12*ia* that is connected to the scanning signal line 16*i*, and a pixel electrode 17*ib* is connected to (i) the data signal line 15*x* via a transistor 12*ib* that is connected to the scanning signal line 16*i* and (ii) a capacitor electrode forming a capacitor with the storage capacitor wire 18*q*, via a transistor 112*m* that is connected to the scanning signal line 16*m*; a pixel electrode 17*ja* of the pixel 102 is connected to the data signal line 15*y* via a transistor 12*ja* that is connected to the scanning signal line 16*j*, and the pixel electrode 17*jb* is connected to (i) the data signal line 15*y* via a transistor 12*jb* that is connected to the scanning signal line 16*j* and (ii) a capacitor electrode forming a capacitor with the storage capacitor wire 18*r*, via a transistor 112*n* that is connected to the scanning signal line 16*n*; a pixel electrode 17*ma* of the pixel 103 is connected to the data signal line 15*x* via a transistor 12*ma* that is connected to the scanning signal line 16*m*, and the pixel electrode 17*mb* is connected to (i) the data signal line 15*x* via a transistor 12*mb* that is connected to the scanning signal line 16*m* and (ii) a capacitor electrode forming a capacitor with the storage capacitor wire 18*s*, via a transistor 112*w* that is connected to the scanning signal line 16*w*; the pixel electrode 17*na* of the pixel 104 is connected to the data signal line 15*y* via a transistor 12*na* that is connected to the scanning signal line 16*n*, and the pixel electrode 17*nb* is connected to (i) the data signal line 15*y* via a transistor 12*nb* that is connected to the scanning signal line 16*n* and (ii) a capacitor electrode forming a capacitor with a storage capacitor wire subsequent to (on a downstream side of the scanning direction) the storage capacitor wire 18*s* via a transistor that is connected to a scanning signal line of a subsequent stage of the scanning signal line 16*w*; a pixel electrode 17IA of the pixel 105 is connected to the data signal line 15Y via a transistor 12IA that is connected to the scanning signal line 16*i*, and a pixel electrode 17IB is connected to (i) the data signal line 15Y via a transistor 12IB that is connected to the scanning signal line 16*i* and (ii) a capacitor electrode forming a capacitor with the storage capacitor wire 18*q*, via a transistor 112M that is connected to the scanning signal line 16*m*; and a pixel electrode 17JA of the pixel 106 is connected to the data signal line 15X via a transistor 12JA that is connected to the scanning signal line 16*j*, and a pixel electrode 17JB is connected to (i) the data signal line 15X via a transistor 12JB that is connected to the scanning signal line 16*j* and (ii) a capacitor electrode forming a capacitor with the storage capacitor wire 18*r*, via a transistor 112N that is connected to the scanning signal line 16*n*.

Note that the scanning signal line 16*i* and the scanning signal line 16*j* are selected simultaneously, and the scanning signal line 16*m* and the scanning signal line 16*n* are selected simultaneously (later described).

Moreover, respective storage capacitors are formed between the storage capacitor wire 18*p* and each of the pixel electrodes 17*ia*, 17*ib*, 17IA, and 17IB, respective storage capacitors are formed between the storage capacitor wire 18*q* and each of the pixel electrodes 17*ja*, 17*jb*, 17JA, and 17JB, respective storage capacitors are formed between the storage capacitor wire 18*r* and each of the pixel electrodes 17*ma*, 17*mb*, 17MA, and 17MB, and respective storage capacitors are formed between the storage capacitor wire 18*s* and each of the pixel electrodes 17*na*, 17*nb*, 17NA, and 17NB. Moreover, although not illustrated, respective liquid crystal capacitors are formed between each of the pixel electrodes and the common electrode.

Figure 23:
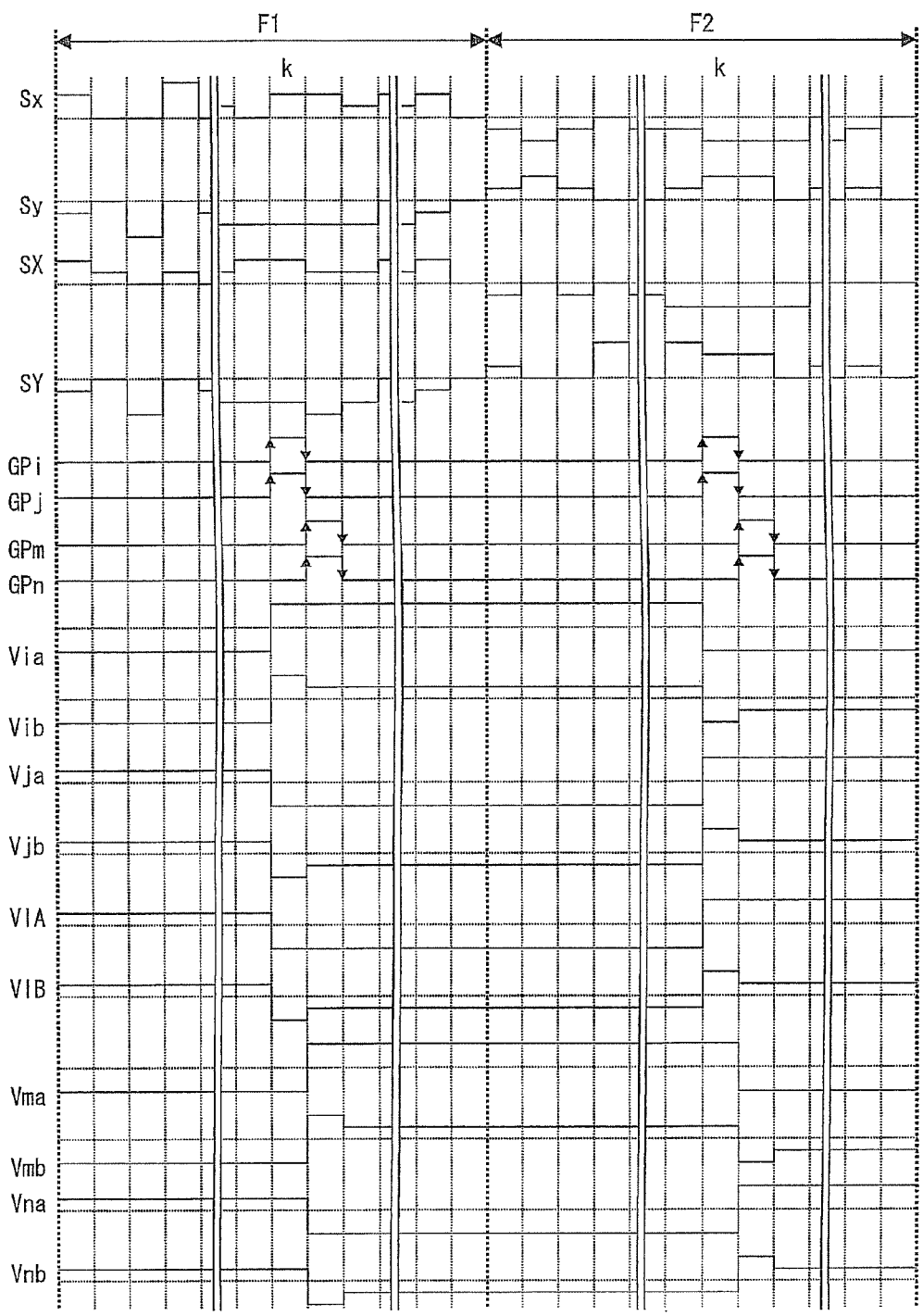
FIG. 23 is a timing chart illustrating a driving method of a liquid crystal display apparatus according to Embodiment 4.

FIG. 23 is a timing chart showing a driving method of the present liquid crystal display apparatus including the liquid crystal panel (normally black mode) of FIG. 22. Note that Sx, Sy, SX, and SY represent data signals (data signals) that are supplied to the data signal lines 15*x*, 15*y*, 15X, and 15Y, respectively, and GPi, GPj, GPm, and GPn represent gate pulse signals supplied to the scanning signal lines 16*i*, 16*j*, 16*m*, and 16*n*, respectively.

Figure 24:
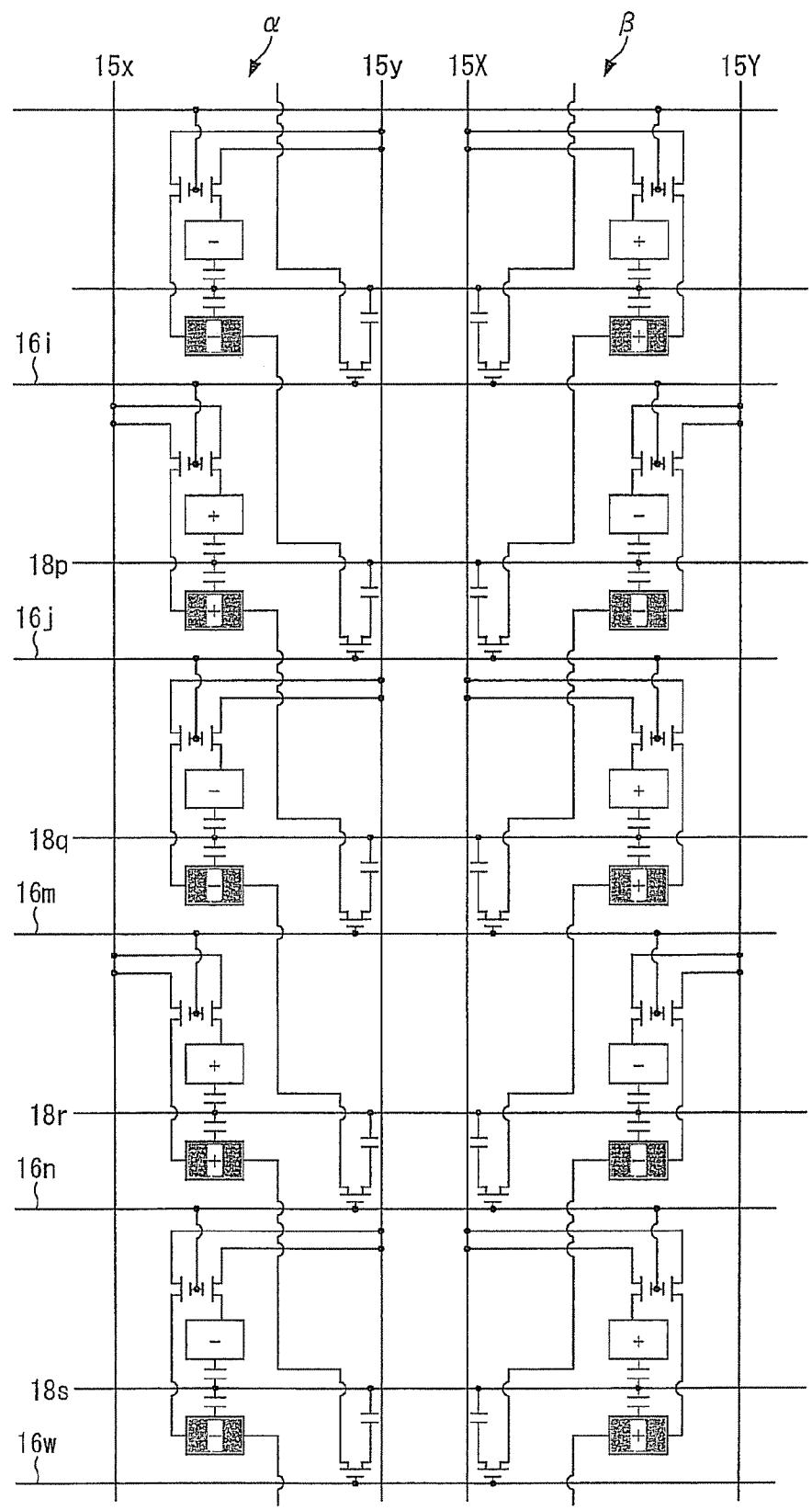
FIG. 24 is a schematic view illustrating a display state of a liquid crystal display apparatus which is driven by the driving method of FIG. 23.

As illustrated in FIG. 23, although the data signal lines and scanning signal lines are driven as illustrated in FIG. 1, the two pixel electrodes disposed in a single pixel are connected to a same data signal line via different transistors, and just one of the two pixel electrodes is connected to a capacitor electrode via a transistor connected to a scanning signal line of a latter stage, which capacitor electrode forms a capacitor with the storage capacitor wire. Hence, an electric potential of the one of the two pixel electrodes becomes same as that of a data signal or that closer to Vcom (electric potential of the common electrode) after the scanning signal line of the latter stage becomes active, and the electric potential of the other pixel electrode becomes an electric potential identical to that of the data signal. Hence, the electric potentials of the pixel electrodes 17*ia*, 17*ib*, 17*ja*, 17*jb*, 17IA, 17IB, 17*ma*, 17*mb*, 17*na*, 17*nb* become as shown in Via, Vib, Vja, Vjb, VIA, VIB, Vma, Vmb, Vna, and Vnb of FIG. 23, respectively, and the polarity distribution of the pixels and the disposition of the bright and dark sub pixels of the pixels in F1 of FIG. 23 are as illustrated in FIG. 24.

Since the present liquid crystal display apparatus is capable of displaying a halftone with use of the bright and dark sub pixels, it is possible to improve the viewing angle characteristics. Furthermore, each of the two pixel electrodes disposed in the one pixel do not become electrically floating, so it is possible to prevent any image sticking and the like of the pixels.

Moreover, at a timing in which two scanning pulses fall, another two scanning pulses rise. Accordingly, the effect (fall of electric potential) received by the data signal lines due to the fall of the two scanning pulses is canceled out by the effect (rise of electric potential) received by the data signal lines due to the rise of the two scanning pulses. This as a result allows for reducing the ripple (wavelike variation) in the electric potential of the data signal lines in the 1V reversal driving, which prevents the phenomenon that the size of the ripple increases as the supply source of the data signal becomes more distant (see FIG. 36), thereby improving the display quality.

Embodiment 5

FIG. 25 is an equivalent circuit diagram illustrating a portion of a liquid crystal panel according to Embodiment 5. As illustrated in FIG. 25, the dispositions of the data signal lines, the scanning signal lines, the storage capacitor wires and the pixels in the present liquid crystal panel are identical to those in FIG. 13.

Two pixel electrodes are provided per pixel: the pixel electrode 17*ia* of the pixel region 101 is connected to the data signal line 15*x* via the transistor 12*ia* that is connected to the scanning signal line 16*i*, and the pixel electrode 17*ib* of the pixel region 101 is connected to the data signal line 15*y* via the transistor 12*ib* that is connected to the scanning signal line 16*i*; the pixel electrode 17*ja* of the pixel region 102 is connected to the data signal line 15*x* via the transistor 12*ja* that is connected to the scanning signal line 16*j*, and the pixel electrode 17*jb* of the pixel region 102 is connected to the data signal line 15*y* via the transistor 12*jb* that is connected to the scanning signal line 16*j*; the pixel electrode 17*ma* of the pixel region 103 is connected to the data signal line 15*x* via the transistor 12*ma* that is connected to the scanning signal line 16*m*, and the pixel electrode 17*mb* of the pixel region 103 is connected to the data signal line 15*y* via the transistor 12*mb* that is connected to the scanning signal line 16*m*; the pixel electrode 17*na* of the pixel 104 is connected to the data signal line 15*x* via the transistor 12*na* that is connected to the scanning signal line 16*n*, and the pixel electrode 17*nb* of the pixel 104 is connected to the data signal line 15*y* via the transistor 12*nb* that is connected to the scanning signal line 16*n*; the pixel electrode 17IA of the pixel 105 is connected to the data signal line 15X via the transistor 12IA that is connected to the scanning signal line 16*i*, and the pixel electrode 17IB of the pixel 105 is connected to the data signal line 15Y via the transistor 12IB that is connected to the scanning signal line 16*i*; and the pixel electrode 17JA of the pixel 106 is connected to the data signal line 15X via the transistor 12JA of the scanning signal line 16*j*, and the pixel electrode 17JB of the pixel 106 is connected to the data signal line 15Y via the transistor 12JB that is connected to the scanning signal line 16*j*.

Moreover, respective storage capacitors are formed between the storage capacitor wire 18*k* and each of the pixel electrodes 17*ia* and 17IA, respective storage capacitors are formed between the storage capacitor wire 18*p* and each of the pixel electrodes 17*ib*, 17IB, 17*ja*, and 17JA, respective storage capacitors are formed between the storage capacitor wire 18*q* and each of the pixel electrodes 17*jb*, 17JB, 17*ma*, and 17MA, and respective storage capacitors are formed between the storage capacitor wire 18*r* and each of the pixel electrodes 17*mb*, 17MB, 17*na*, and 17NA. Moreover, although not illustrated, respective liquid crystal capacitors are formed between each of the pixel electrodes and the common electrode.

Figure 26:
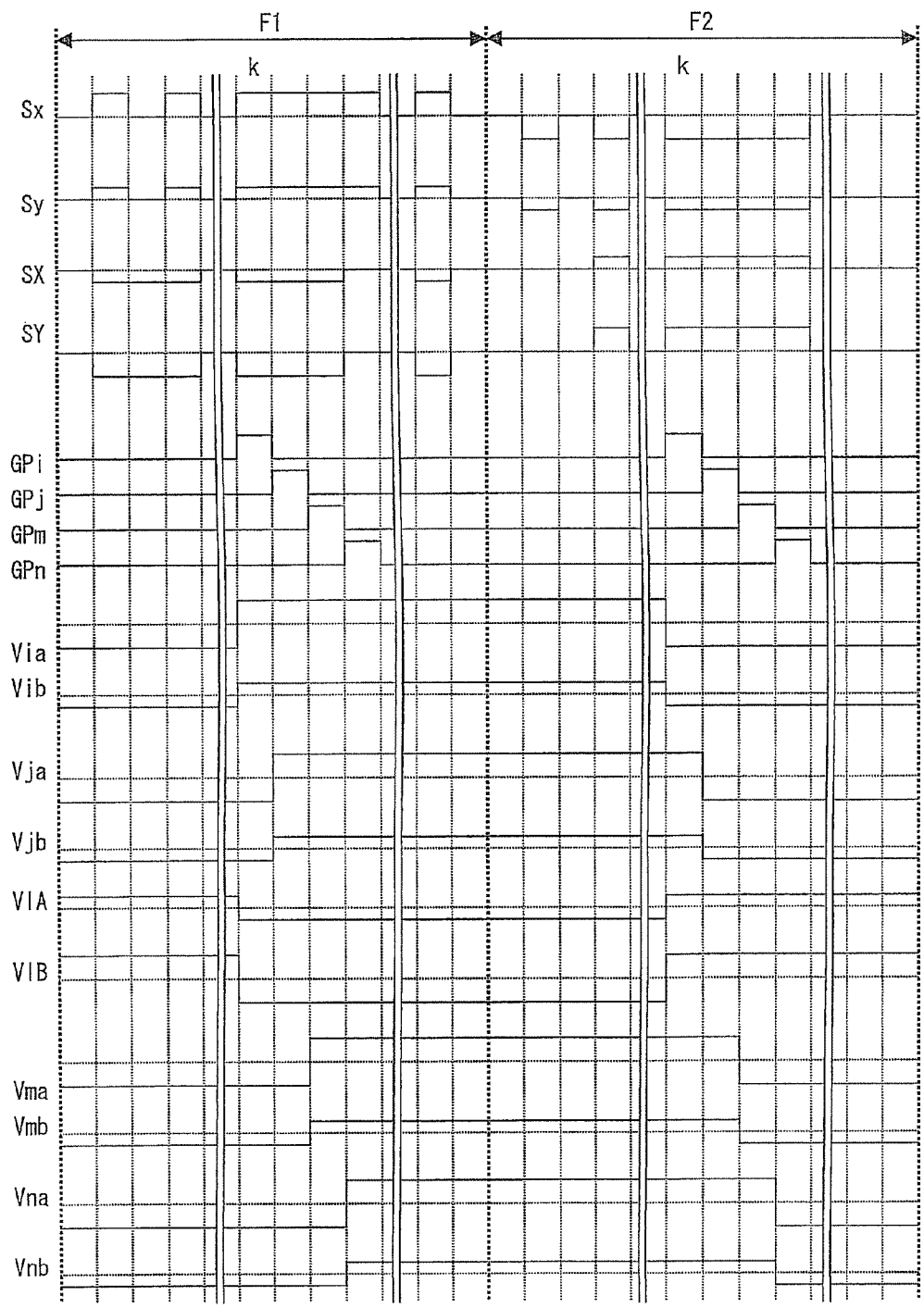
FIG. 26 is a timing chart illustrating a driving method of a liquid crystal display apparatus according to Embodiment 5.

FIG. 26 is a timing chart showing a driving method of the present liquid crystal display apparatus including the liquid crystal panel (normally black mode) of FIG. 25. Sx, Sy, SX, and SY represent data signals (data signals) that are supplied to the data signal lines 15*x*, 15*y*, 15X, and 15Y, respectively, and GPi, GPj, GPm, and GPn represent gate pulse signals that are supplied to the scanning signal lines 16*i*, 16*j*, 16*m*, and 16*n*, respectively.

As illustrated in FIG. 26, in the present drive method, one scanning signal line is selected and data signals whose polarities are reversed per vertical scanning period (1V) are supplied to the data signal lines. In a single vertical scanning period, data signals (signal potentials) respectively supplied to two data signal lines which are associated to a single pixel column are made to have identical polarities, and data signals that are respectively supplied to two adjacent data signal lines which each are associated with different pixel columns are made to have different polarities. Furthermore, in a single horizontal scanning period, an absolute value (Vcom serving as a standard) of data signals supplied to one of the two data signal lines associated with the single pixel column is made not more than an absolute value of the data signals supplied to the other data signal line.

At a timing in which a scanning pulse falls, another scanning pulse rises; simultaneously with a start of a horizontal scanning period corresponding to the current stage, a scanning pulse of the current stage rises, and simultaneously with a start of a horizontal scanning period corresponding to a subsequent stage (termination of the horizontal scanning period corresponding to the current stage), the scanning pulse of the current stage falls.

More specifically, F1 of consecutive frames F1 and F2 is driven by the following driving method. First, in F1, the data signal lines 15*x* and 15*y* receive data signals of a positive polarity, and the data signal lines 15X and 15Y receive data signals of a negative polarity.

Simultaneously with a start of the kth horizontal scanning period (i.e. switchover to a data signal corresponding to the kth horizontal scanning period), the gate pulse signal GPi rises, and simultaneously with a start of the (k+1)th horizontal scanning period (termination of the kth horizontal scanning period), the pulse Pi rises.

Figure 27:
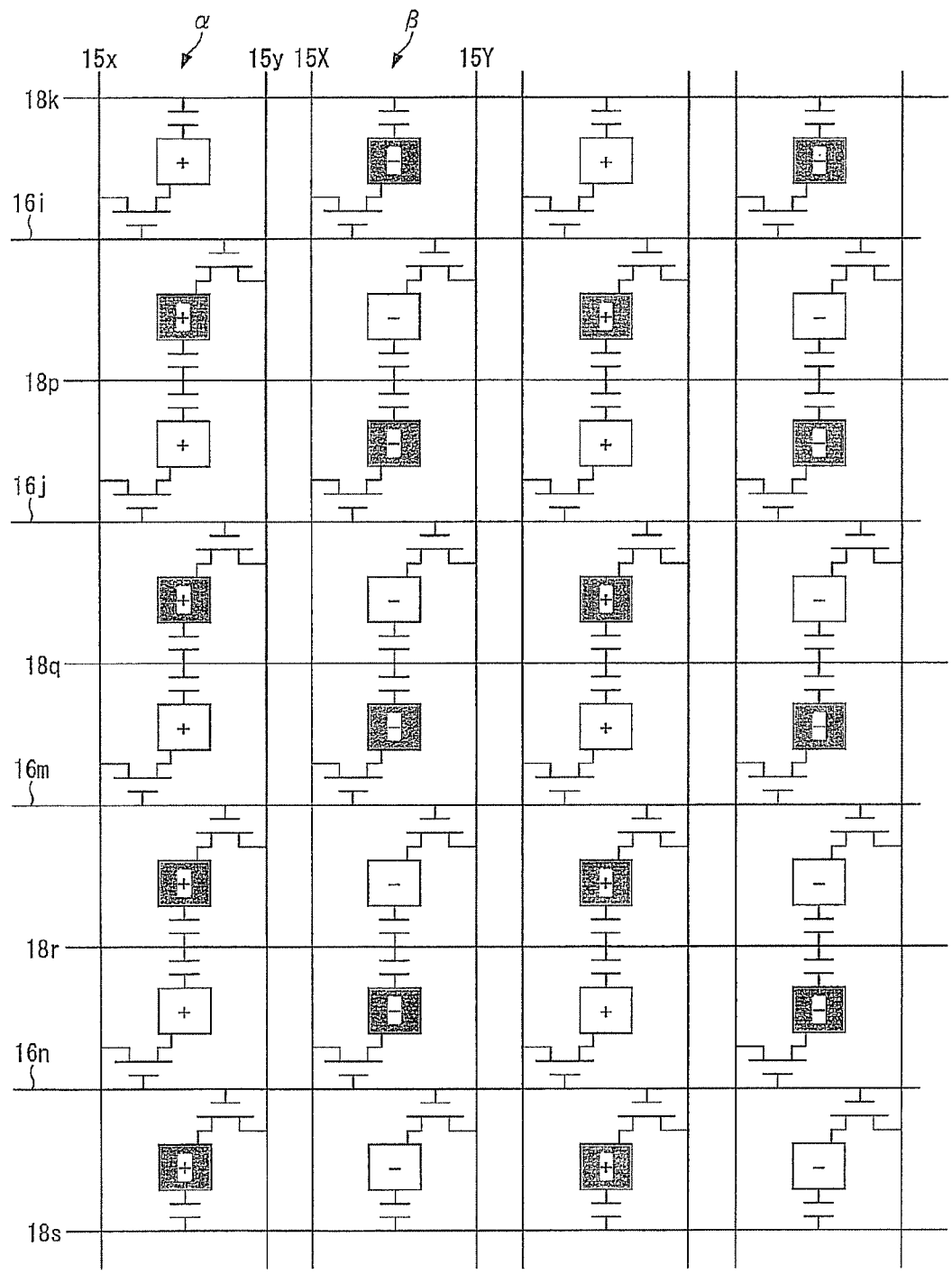
FIG. 27 is a schematic view illustrating a display state of a liquid crystal display apparatus which is driven by the driving method of FIG. 26.

Hence, as illustrated in FIGS. 26 and 27, data signals of a positive polarity are written into the pixel electrode 17*ia* of the pixel 101, and data signals of a positive polarity having an absolute value smaller than that of the data signal written into the pixel electrode 17*ia* are written into the pixel electrode 17*ib*. Moreover, data signals of a negative polarity is written into the pixel electrode 17IB of the pixel 105, and data signals of a negative polarity having an absolute value smaller than that of the data signal written into the pixel electrode 17IB are written into the pixel electrode 17IA.

Moreover, simultaneously with a start of the (k+1)th horizontal scanning period, the pulse Pj of the gate pulse signal GPj rises, and simultaneously with a start of the (k+2)th horizontal scanning period, the pulse Pj falls.

Hence, as illustrated in FIGS. 26 and 27, data signals of a positive polarity are written into the pixel electrode 17*ja* of the pixel 102, and data signals of a positive polarity having an absolute value smaller than that of the data signal written into the pixel electrode 17*ja* are written into the pixel electrode 17*jb*. Moreover, data signals of a negative polarity are written into the pixel electrode 17JB of the pixel 106, and data signals of a negative polarity having an absolute value smaller than that of the data signal written into the pixel electrode 17JB are written into the pixel electrode 17JA.

Simultaneously with the start of the (k+2)th horizontal scanning period, the pulse Pm of the gate pulse signal GPm rises, and simultaneously with the start of the (k+3)th horizontal scanning period, the pulse Pm falls.

As a result, as illustrated in FIGS. 26 and 27, data signals of a positive polarity are written into the pixel electrode 17*ma* of the pixel 103, and data signals of a positive polarity having an absolute value smaller than that of the data signals written into the pixel electrode 17*ma* are written into the pixel electrode 17*mb*. Moreover, data signals of a negative polarity are written into the pixel electrode 17MB of the pixel 107, and data signals of a negative polarity having an absolute value smaller than that of the data signals written into the pixel electrode 17MB are written into the pixel electrode 17MA.

Moreover, simultaneously with the (k+3)th horizontal scanning period, the pulse Pn of the gate pulse signal GPn rises, and simultaneously with the start of a (k+4)th horizontal scanning period, the pulse Pn rises.

As a result, as illustrated in FIGS. 26 and 27, data signals of a positive polarity are written into the pixel electrode 17*na* of the pixel 104, and data signals of a positive polarity having an absolute value smaller than that of the data signals written into the pixel electrode 17*na* are written into the pixel electrode 17*nb*. Moreover, data signals of a negative polarity are written into the pixel electrode 17NB of the pixel 108, and data signals of a negative polarity having an absolute value smaller than that of the data signals written into the pixel electrode 17NB are written into the pixel electrode 17NA.

Since the present liquid crystal display apparatus is capable of displaying a halftone with use of the bright and dark sub pixels, it is possible to improve the viewing angle characteristics. Moreover, the light-and-dark checkered display allows for preventing striped unevenness, which is caused by having the bright sub pixels or dark sub pixels be consecutively arranged.

Moreover, also with the present liquid crystal display apparatus, at the timing in which one scanning pulse falls, another scanning pulse rises. Accordingly, an effect (fall of electric potential) received by the data signal line due to the fall of the scanning pulse is canceled out by an effect (rise of electric potential) received by the data signal line caused by the rise of a scanning pulse. This as a result allows for reducing the ripple (wavelike variation) in the electric potential of the data signal lines in the 1V reversal driving, which prevents the phenomenon that the size of the ripple increases as the supply source of the data signal becomes more distant (see FIG. 36), thereby improving the display quality.

Embodiment 6

Figure 28:
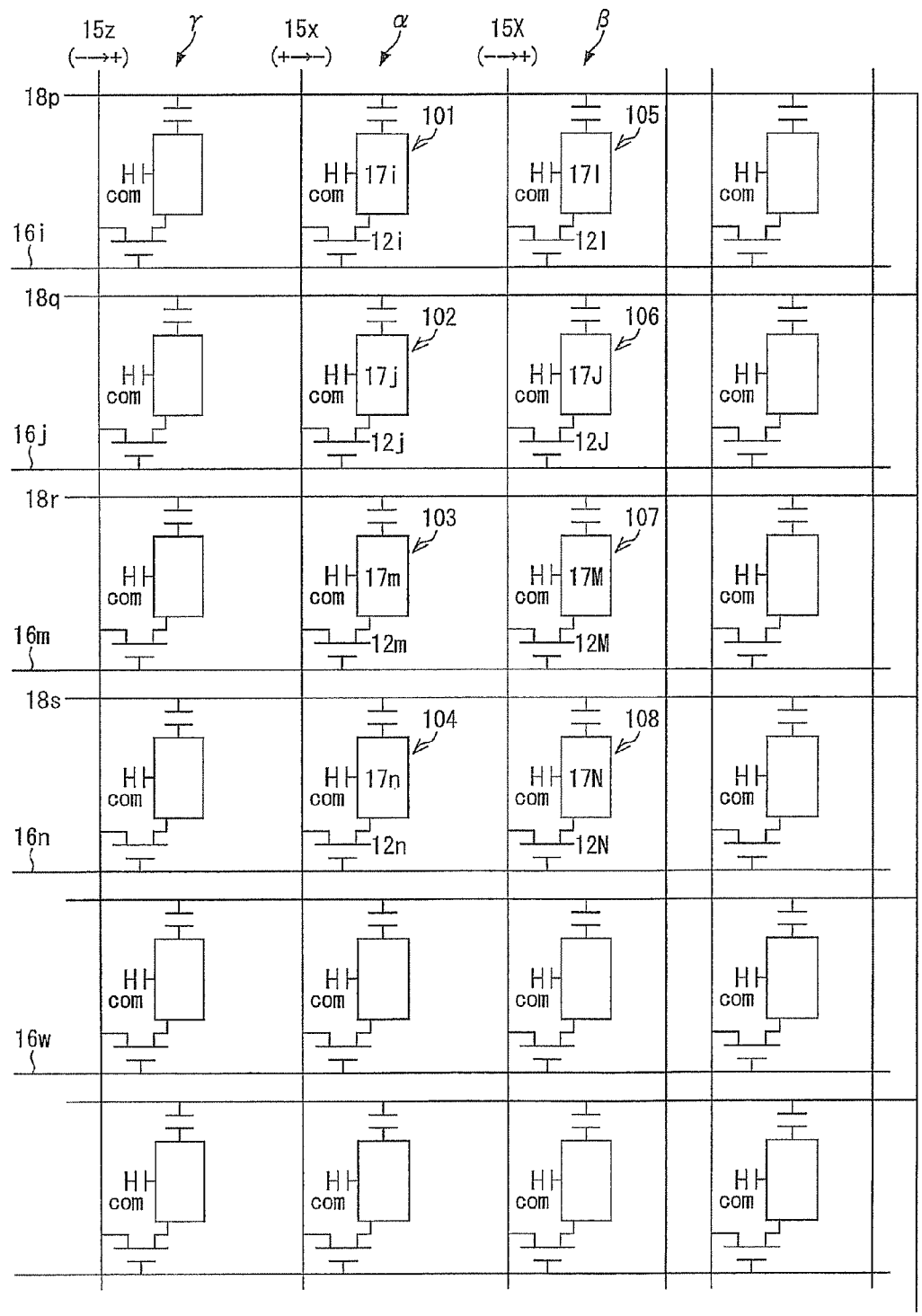
FIG. 28 is an equivalent circuit diagram illustrating a configuration of a liquid crystal panel according to Embodiment 3.

FIG. 28 is an equivalent circuit diagram illustrating a portion of a liquid crystal panel according to Embodiment 6. As illustrated in FIG. 28, in the present liquid crystal panel, data signal lines 15*z*, 15*x*, and 15X are arranged in this order, and scanning signal lines 16*i*, 16*j*, 16*m*, 16*n*, and 16*w*, each of which extend in a row direction (left-right direction in FIG. 28), are arranged in this order. A pixel 101 is provided associated with an intersection where the data signal line 15*x* intersects with the scanning signal line 16*i*, a pixel 102 is provided associated with an intersection where the data signal line 15*x* intersects with the scanning signal line 16*j*, a pixel 103 is provided associated with an intersection where the data signal line 15*x* intersects with the scanning signal line 16*m*, a pixel 104 is provided associated with an intersection where the data signal line 15*x* intersects with the scanning signal line 16*n*, the pixel 105 is provided associated with an intersection where the data signal line 15X intersects with the scanning signal line 16*i*, a pixel 106 is provided associated with an intersection where the data signal line 15X intersects with the scanning signal line 16*j*, the pixel 107 is provided associated with an intersection where the data signal line 15X intersects with the scanning signal line 16*m*, and a pixel 108 is provided associated with an intersection where the data signal line 15X intersects with the scanning signal line 16*n*. A storage capacitor wire 18*p* is provided associated with the pixels 101 and 105, a storage capacitor wire 18*q* is provided associated with the pixels 102 and 106, a storage capacitor wire 18*r* is provided associated with the pixels 103 and 107, and a storage capacitor wire 18*s* is provided associated with the pixels 104 and 108.

On either sides of a pixel column a that includes the pixels 101 to 104 are disposed (i) a pixel column γ and (ii) a pixel column β that includes the pixels 105 to 108. The data signal line 15*x* is disposed associated with the pixel column α, and the data signal line 15X is disposed associated with the pixel column β.

Furthermore, one pixel electrode is disposed per pixel: a pixel electrode 17*i* of the pixel 101 is connected to the data signal line 15*x* via a transistor 12*i* that is connected to the scanning signal line 16*i*; a pixel electrode 17*j* of the pixel 102 is connected to the data signal line 15*x* via a transistor 12*j* that is connected to the scanning signal line 16*j*; a pixel electrode 17*m* of the pixel 103 is connected to the data signal line 15*x* via a transistor 12*m* that is connected to the scanning signal line 16*m*; a pixel electrode 17*n* of the pixel 104 is connected to the data signal line 15*x* via a transistor 12*n* that is connected to the scanning signal line 16*n*; a pixel electrode 17I of the pixel 105 is connected to the data signal line 15X via a transistor 12I that is connected to the scanning signal line 16*i*; a pixel electrode 17J of the pixel 106 is connected to the data signal line 15X via a transistor 12J that is connected to the scanning signal line 16*j*; a pixel electrode 17M of the pixel 107 is connected to the data signal line 15X via a transistor 12M that is connected to the scanning signal line 16*m*; and a pixel electrode 17N of the pixel 108 is connected to the data signal line 15X via a transistor 12N that is connected to the scanning signal line 16*n*.

Moreover, respective storage capacitors are formed between the storage capacitor wire 18*p* and each of the pixel electrodes 17*i* and 17I, respective storage capacitors are formed between the storage capacitor wire 18*q* and each of the pixel electrodes 17*j* and 17J, respective storage capacitors are formed between the storage capacitor wire 18*r* and each of the pixel electrodes 17*m* and 17M, and respective storage capacitors are formed between the storage capacitor wire 18*s* and each of the pixel electrodes 17*n* and 17N. Furthermore, respective liquid crystal capacitors are formed between each of the pixel electrodes and the common electrode com.

Figure 29:
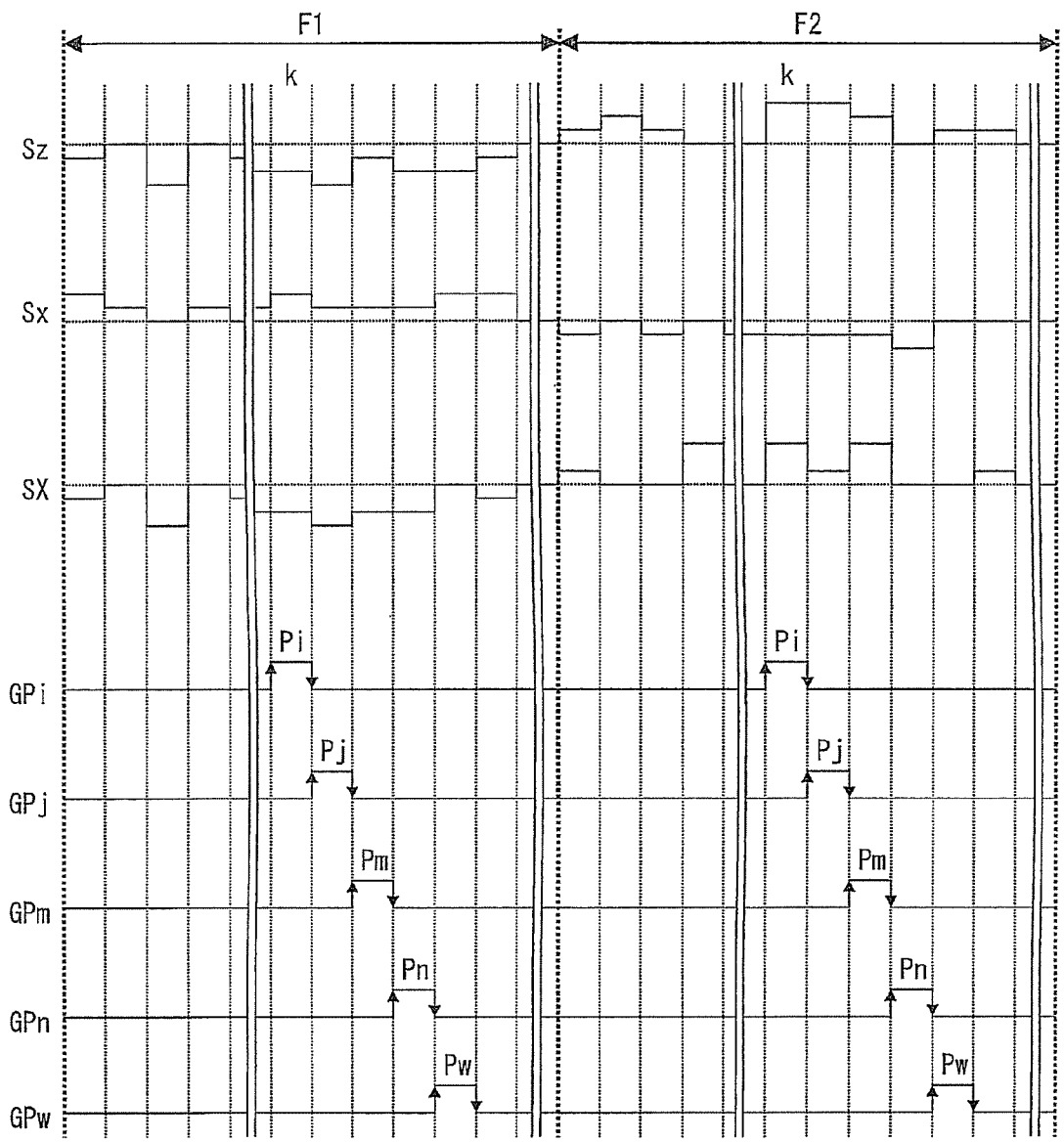
FIG. 29 is a timing chart illustrating a driving method of a liquid crystal display apparatus according to Embodiment 3.

FIG. 29 is a timing chart illustrating a driving method of the present liquid crystal display apparatus including the liquid crystal panel (normally black mode) illustrated in FIG. 28. Sz, Sx, and SX represent data signals (data signals) that are supplied to the data signal lines 15*z*, 15*x*, and 15X, respectively, and GPi, GPj, GPm, and GPn represent gate pulse signals that are supplied to the scanning signal lines 16*i*, 16*j*, 16*m*, and 16*n*, respectively.

As illustrated in FIG. 29, in the present drive method, one scanning signal line is selected simultaneously and data signals whose polarities are reversed per vertical scanning period (1V) are supplied to the data signal lines. In a single vertical scanning period, data signals respectively supplied to two adjacent data signal lines disposed associated with different pixel columns are made to have different polarities. At a timing in which one scanning pulse falls, one scanning pulse rises; simultaneously with a start of the horizontal scanning period corresponding to a current stage, a scanning pulse of the current stage rises, and simultaneously with a start of the horizontal scanning period corresponding to a subsequent stage (termination of the horizontal scanning period corresponding to the current stage), the scanning pulse of the current stage falls.

For example, in F1, the data signal lines 15z and 15X receive data signals of a negative polarity, and the data signal line 15x receives data signals of a positive polarity.

Simultaneously with the start of the kth horizontal scanning period (i.e. switchover to a data signal corresponding to the kth horizontal scanning period), the pulse Pi of the gate pulse signal GPi rises, and simultaneously with the start of the (k+1)th horizontal scanning period (termination of the kth horizontal scanning period), the pulse Pi falls. Moreover, simultaneously with the start of the (k+1)th horizontal scanning period, the pulse Pj of the gate pulse signal GPj rises, and simultaneously with the start of the (k+2)th horizontal scanning period, the pulse Pj falls. Moreover, simultaneously with the start of the (k+2)th horizontal scanning period, the pulse Pm of the gate pulse signal GPm rises, and simultaneously with the (k+3)th horizontal scanning period, the pulse Pm falls. Moreover, simultaneously with the start of the (k+3)th horizontal scanning period, the pulse Pn of the gate pulse signal GPn rises, and simultaneously with the start of the (k+4)th horizontal scanning period, the pulse Pn falls.

In the present liquid crystal display apparatus, at a timing in which one scanning pulse falls, another one scanning pulse rises. Hence, an effect (fall of electric potential) received by the data signal line due to the fall of the one scanning pulse is canceled out by the effect (rise of electric potential) received by the data signal line due to the rise of another one scanning pulse. As a result, the ripple (wavelike variation) generated in the electric potential of the data signal line can be reduced even in the 1V reversal driving. This allows for preventing the phenomenon that the size of the ripple increases as the supply source of the data signal becomes more distant (see FIG. 36), thereby improving the display quality.

Figure 30:
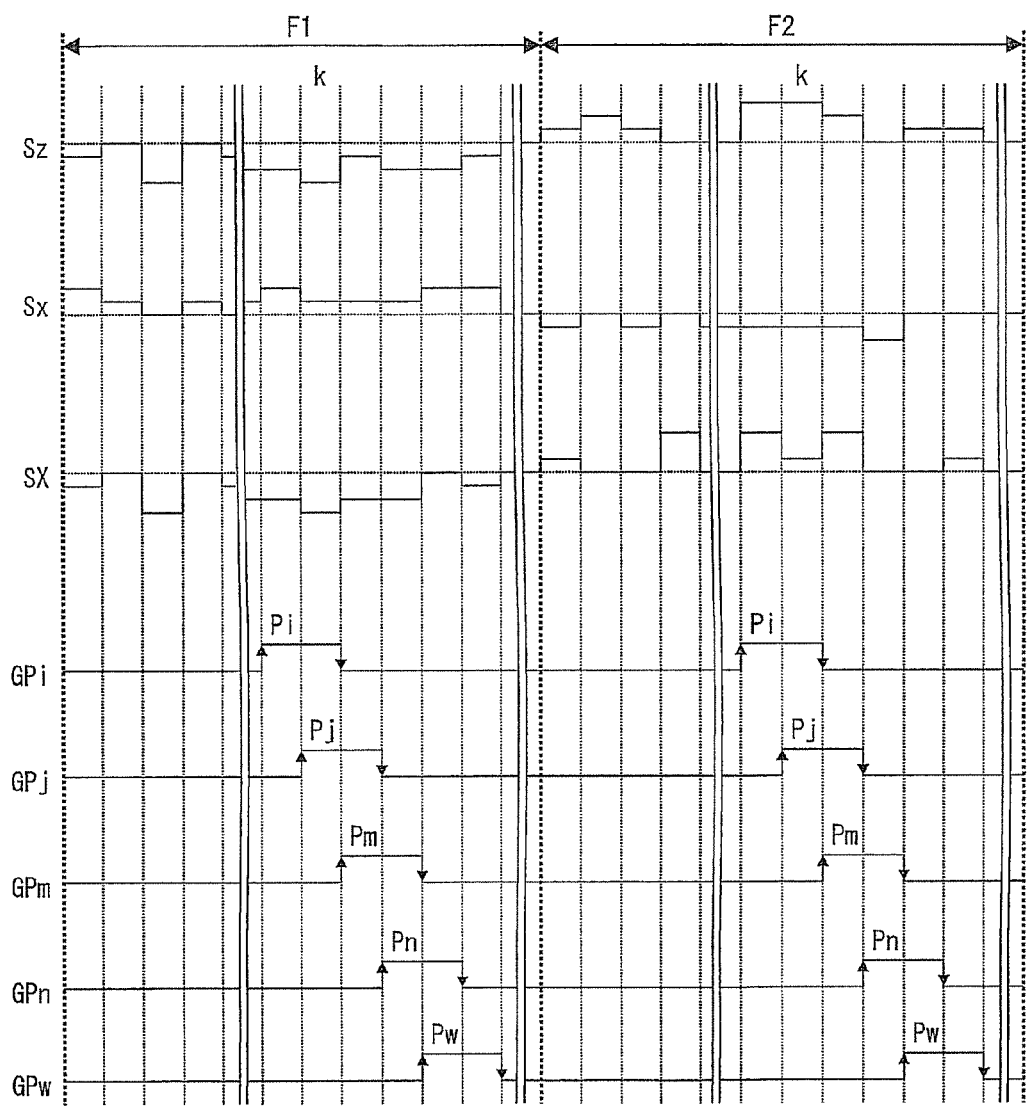
FIG. 30 is a timing chart illustrating another driving method of a liquid crystal display apparatus according to Embodiment 3.

In the drive method of FIG. 29, the scanning pulse of the current stage rises simultaneously with the start of the horizontal scanning period corresponding to the current stage, and the scanning pulse of the current stage falls simultaneously with a start of the horizontal scanning period of a subsequent stage (termination of the horizontal scanning period corresponding to the current stage). However, the driving method is not limited to this example. For instance, the method may be as illustrated in FIG. 30, in which the scanning pulse of the current stage rises simultaneously with a start of a horizontal scanning period corresponding to a preceding stage, and the scanning pulse of the current stage falls simultaneously with a start of the horizontal scanning period corresponding to a subsequent stage (termination of the horizontal scanning period corresponding to the current stage). In this case, the scanning pulse has a width of 2H.

More specifically, the pulse Pi rises simultaneously with the start of the (k−1)th horizontal scanning period, the pulse Pj rises simultaneously with the start of the kth horizontal scanning period, and simultaneously with the start of the (k+1)th horizontal scanning period (termination of the kth horizontal scanning period), the pulse Pi falls while the pulse Pm rises. Moreover, simultaneously with the start of the (k+2)th horizontal scanning period, the pulse Pj falls while the pulse Pn rises.

The drive method of FIG. 30 allows for precharging during a first half (1H) of the pulse and for carrying out a main charge during a second half (1H) of the pulse. This allows for improving the pixel charging rate. Of course in this case also, one scanning pulse rises at a timing in which one scanning pulse falls. This allows for preventing the phenomenon that the size of the ripple increases as the supply source of the data signal becomes more distant (see FIG. 36), thereby improving the display quality.

In each of the embodiments, 1V reversal driving is used as one type of the LT reversal driving, however the reversal driving is not limited to the LT reversal driving. Alternatively, nV reversal driving may be used (for example, polarities of data signals that are supplied to the data signal lines may be reversed per two frames) or nH reversal driving may be used (for example, polarities of data signals that are supplied to the data signal lines may be reversed per 12H).

The waveform shown in FIG. 1 and the like of the signal potential that is supplied to the data signal lines is of a case where leading-in of pixel potential at a time when a transistor is turned OFF can be ignored (a case where a center value of the signal potential=Vcom) (for easy description). In a case where the leading-in of the pixel potential cannot be ignored, the center value of the signal potential is to be higher than Vcom, and further in a case where a leading-in amount varies based on gray scales (data signals), the center value is to be varied in accordance with the gray scales (data signals).

Figure 31:
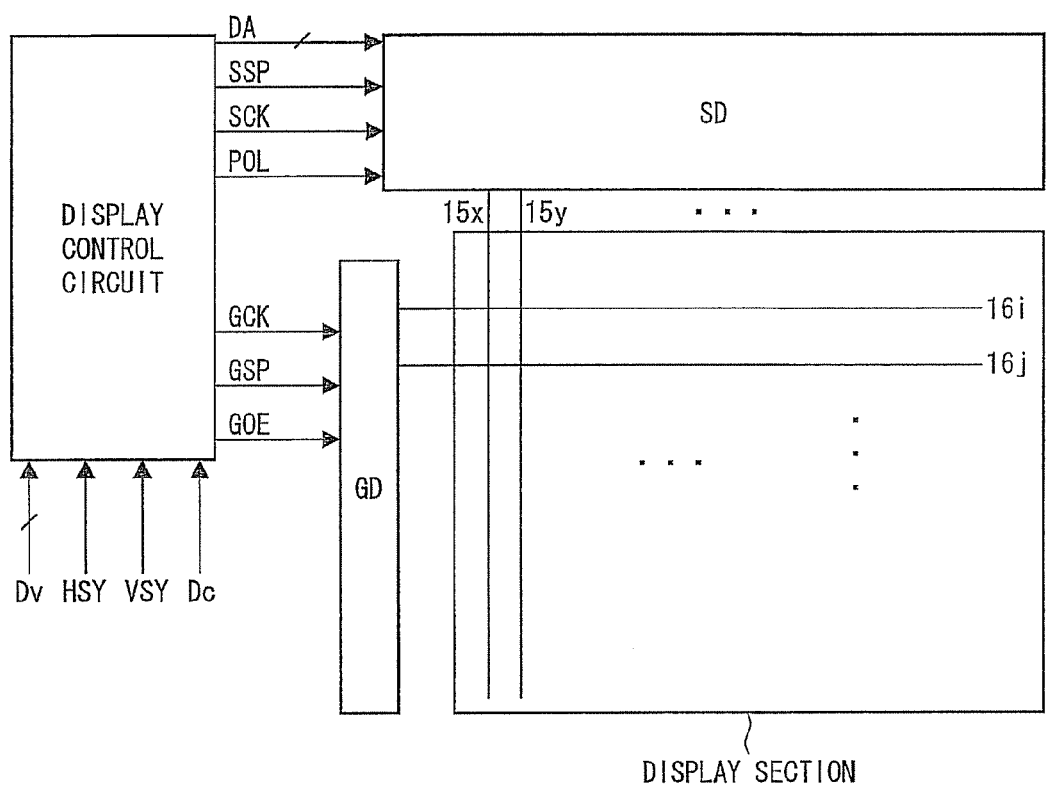
FIG. 31 is a block diagram describing an entire configuration of the present liquid crystal display apparatus.

FIG. 31 is a block diagram illustrating a configuration of the present liquid crystal display apparatus. As illustrated in FIG. 31, the present liquid crystal display apparatus includes a display section (liquid crystal panel), a source driver (SD), a gate driver (GD), and a display control circuit. The source driver drives data signal lines, the gate driver drives scanning signal lines, and the display control circuit controls the source driver and the gate driver. A storage capacitor wire driving circuit for driving storage capacitor wires (Cs wires) may also be provided if necessary.

The display control circuit receives, from an external signal source (e.g., a tuner), a digital video signal Dv representing an image to be displayed, a horizontal sync signal HSY and vertical sync signal VSY corresponding to the digital video signal Dv, and a control signal Dc for controlling a display operation. Moreover, based on these received signals Dv, HSY, VSY, and Dc, the display control circuit generates, as signals for displaying on the display section the image represented by the digital video signal Dv, a data start pulse signal SSP, a data clock signal SCK, a digital image signal DA (signal corresponding to the digital video signal Dv) representing the image to be displayed, a gate start pulse signal GSP, a gate clock signal GCK, and a gate driver output control signal (scanning signal output control signal) GOE. The display control circuit then outputs these signals.

More specifically, the display control circuit (i) outputs the video signal Dv as the digital image signal DA, after carrying out timing adjustment and the like of the video signal Dv by use of an inner memory as necessary, (ii) generates the data clock signal SCK as a signal made up of a pulse corresponding to pixels in the image that the digital image signal DA represents, (iii) generates the data start pulse signal SSP as a signal that, based on the horizontal sync signal HSY, becomes a high-level (H level) for just a predetermined time per horizontal scanning period, (iv) generates a gate start pulse signal GSP as a signal that, based on the vertical sync signal VSY, becomes a H level for just a predetermined time per frame period (one vertical scanning period), (v) generates a gate clock signal GCK based on the horizontal sync signal HSY, and (vi) generates a gate driver output control signal GOE based on the horizontal sync signal HSY and control signal Dc.

Among the signals that are generated in the display control circuit as the aforementioned, the digital image signal DA, a polarity inversion signal POL that controls a polarity of the data signal (data data signal), the data start pulse signal SSP, and the data clock signal SCK are inputted into the source driver; whereas the gate start pulse signal GSP, gate clock signal GCK, and gate driver output control signal GOE are inputted into the gate driver.

The source driver successively generates, per one horizontal scanning period, an analog potential (data signal) that is equivalent to a pixel value in the scanning signal lines of the image represented by the digital image signal DA, based on the digital image signal DA, the data clock signal SCK, the data start pulse signal SSP, and the polarity inversion signal POL. The source driver then outputs these data signals to the data signal lines.

The gate driver generates a gate on-pulse signal based on the gate start pulse signal GSP, the gate clock signal GCK, and the gate driver output control signal GOE, and outputs this generated signal to the scanning signal line. This causes the scanning signal lines to be selectively driven.

By driving the data signal lines and scanning signal lines of the display section (liquid crystal panel) by the source driver and gate driver as described above, a data signal is written into a pixel electrode from the data signal lines via a transistor (TFT) connected to the selected scanning signal line. As a result, a voltage is applied to a liquid crystal layer of the sub pixels, which controls the amount of light transmitted from the backlight. Accordingly, the image represented by the digital video signal Dv is displayed on the sub pixels.

Figure 32:
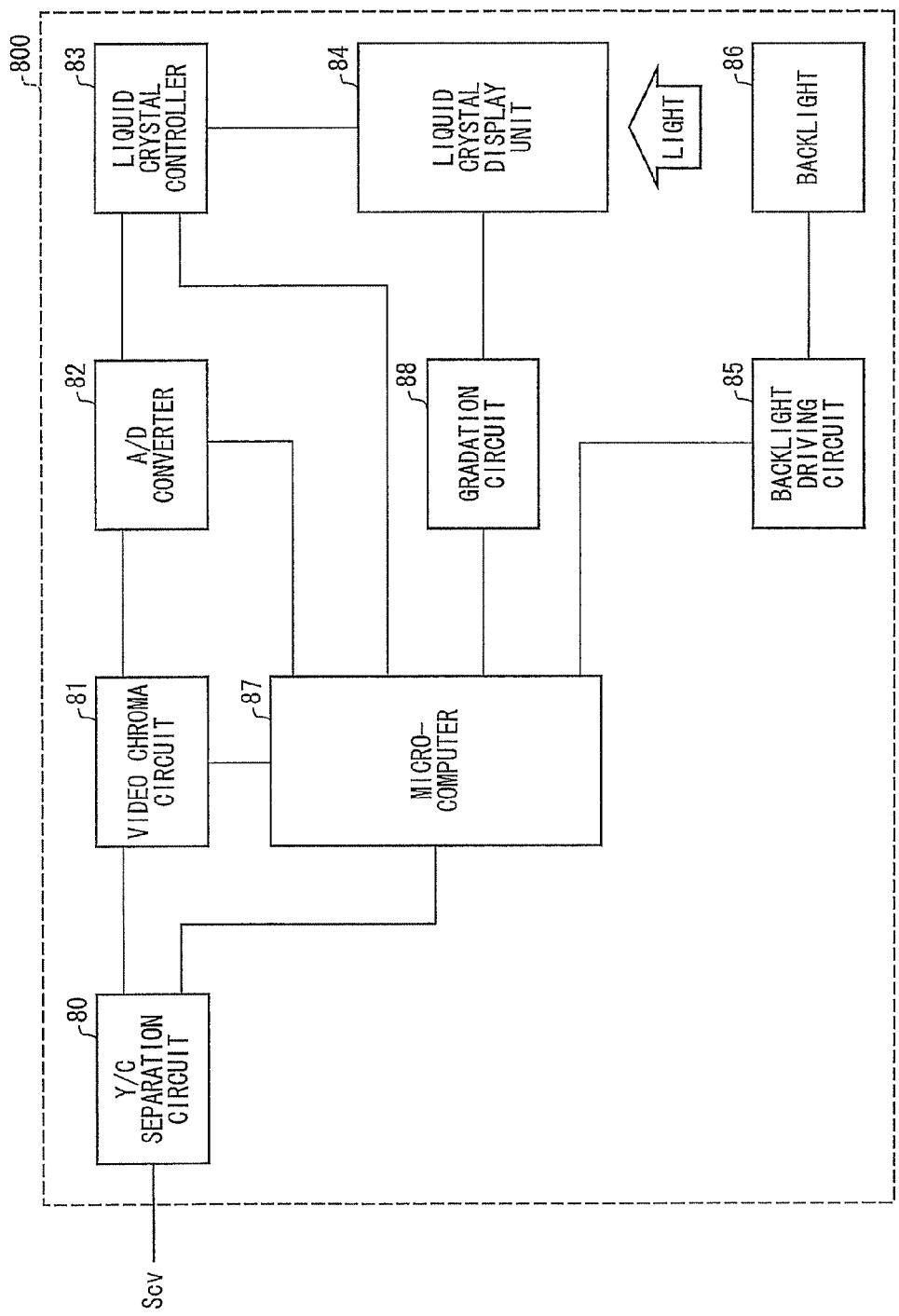
FIG. 32 is a block diagram describing functions of the present liquid crystal display apparatus.

The following description explains one configuration example of the present liquid crystal display device in a case where the liquid crystal display device is applied to a television receiver. FIG. 32 is a block diagram illustrating a configuration of a liquid crystal display apparatus 800 for use in a television receiver. The liquid crystal display apparatus 800 includes: a liquid crystal display unit 84; a Y/C separation circuit 80, a video chroma circuit 81; an A/D converter 82; a liquid crystal controller 83; a backlight driving circuit 85; a backlight 86; a microcomputer (microcomputer) 87; and a gradation circuit 88. The liquid crystal display unit 84 includes a liquid crystal panel, and a source driver and gate driver for driving the liquid crystal panel.

In the liquid crystal display apparatus 800 of this configuration, first, a composite color video signal Scv as a television signal is inputted into the Y/C separation circuit 80 from outside, and the composite color video signal Scv is divided into a brightness signal and a color signal. The brightness signal and color signal are converted by the video chroma circuit 81 into analog RGB signals that correspond to the light's three principle colors, and further the analog RGB signals are converted by the A/D converter 82 into digital RGB signals. The digital RGB signals are inputted into the liquid crystal controller 83. Moreover, in the Y/C separation circuit 80, horizontal and vertical sync signals are also retrieved from the composite color video signal Scv inputted from the outside. These sync signals also are inputted into the liquid crystal controller 83 via the microcomputer 87.

In the liquid crystal display unit 84, the digital RGB signals are inputted from the liquid crystal controller 83 at a predetermined timing, together with a timing signal based on the sync signal. Moreover, in the gradation circuit 88, gradation electric potentials are generated for each of the three principle colors of color display R, G, B. These gradation electric potentials are also supplied to the liquid crystal display unit 84. In the liquid crystal display unit 84, a driving signal (data signal=signal electric potential, scanning signal etc.) is generated by the source driver, gate driver and the like provided inside, based on the RGB signals, the timing signal, and the gradation electric potentials, and a color image is displayed on the inner liquid crystal panel based on the driving signal. In order to display an image by the liquid crystal display unit 84, it is necessary to irradiate light from a rear side of liquid crystal panel inside of the liquid crystal display unit. With the liquid crystal display apparatus 800, light is irradiated on a rear side of the liquid crystal panel by having the backlight driving circuit 85 drive the backlight 86 under control of the microcomputer 87. Control of the entire system including the foregoing processes is carried out by the microcomputer 87. Video signals inputted from the outside (composite color video signal) may be not just video signals based on television broadcast, but may also be video signals captured by a camera and video signals supplied via Internet connection. With use of the liquid crystal display apparatus 800, it is possible to perform image display based on various video signals.

Figure 33:
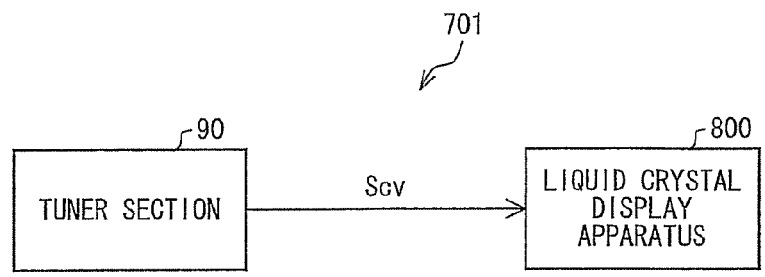
FIG. 33 is a block diagram describing functions of the present television receiver.

In a case where an image based on television broadcast is displayed by the liquid crystal display apparatus 800, a tuner section 90 is connected to the liquid crystal display device 800 as illustrated in FIG. 33, thus configuring the present television receiver 701. The tuner section 90 extracts signals of channels to be received among waves (high frequency signals) that are received by an antenna (not illustrated), and converts the extracted signals to intermediate frequency signals. By detecting this intermediate frequency signal, composite color video signals Scv as a television signal are taken out. The composite color video signal Scv is, as already described, inputted into the liquid crystal display apparatus 800, and an image based on this composite color video signal Scv is displayed on the liquid crystal display apparatus 800.

Figure 34:
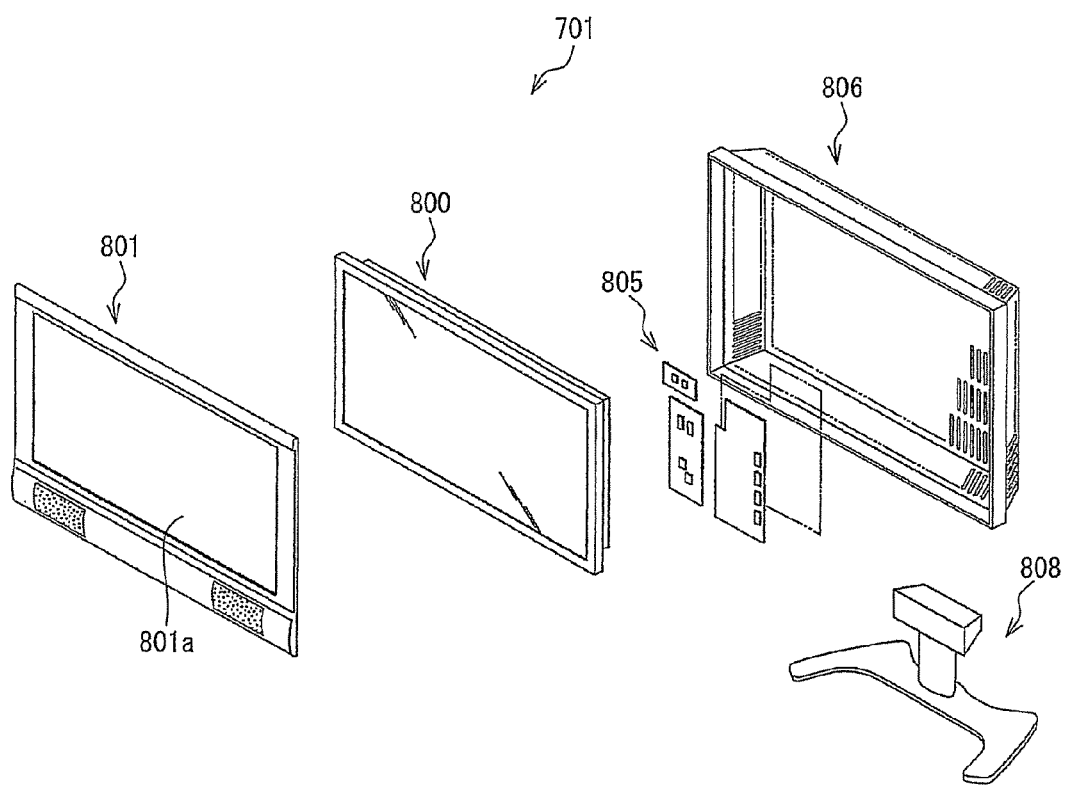
FIG. 34 is an exploded perspective view illustrating a configuration of the present television receiver.
Figure 35:
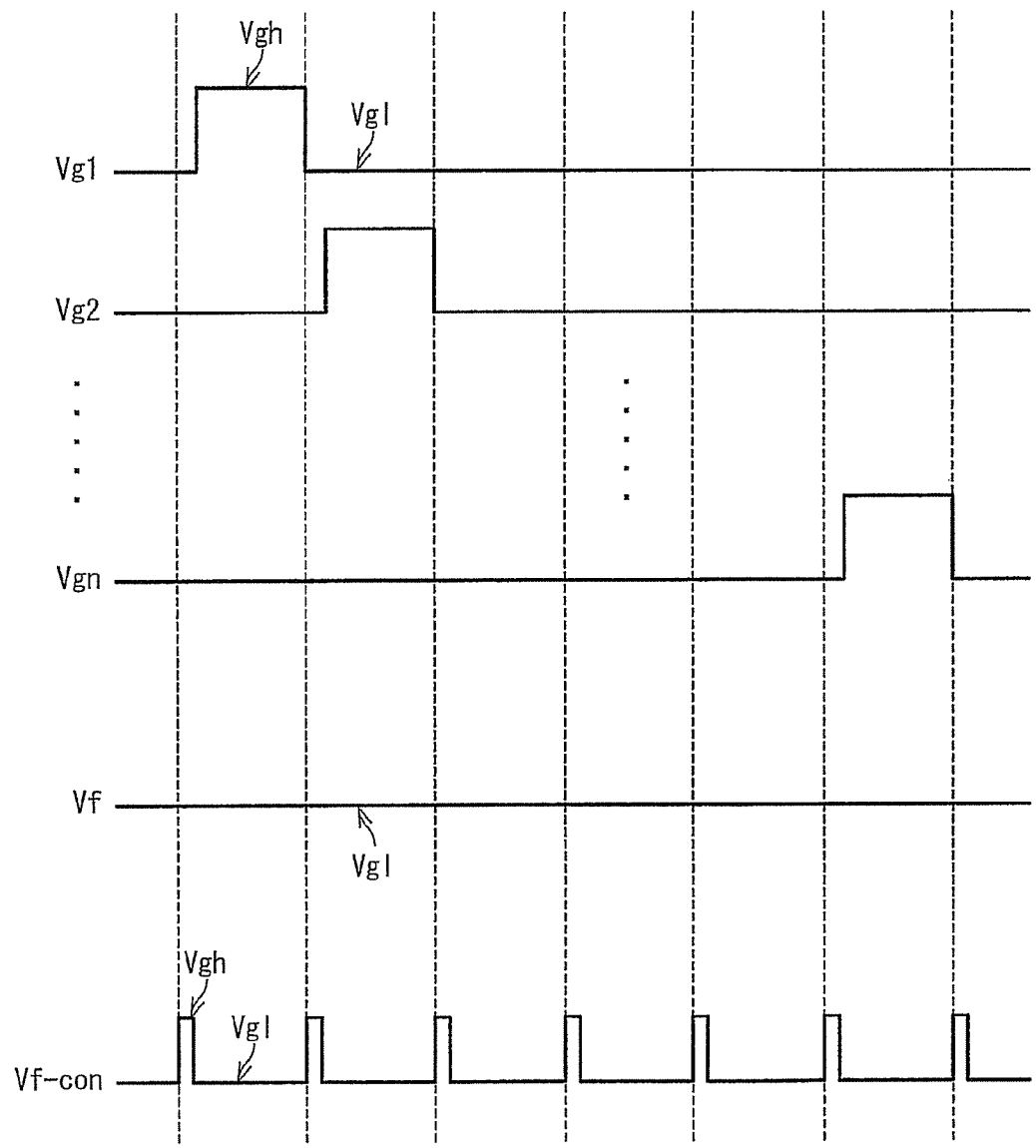
FIG. 35 is a timing chart illustrating a conventional driving method of a liquid crystal display apparatus.

FIG. 34 is an exploded perspective view of an example illustrating one configuration of the present television receiver. As illustrated in FIG. 34, the present television receiver 701 includes, as its constituents, the liquid crystal display apparatus 800, a first housing 801, and a second housing 806. The first housing 801 and the second housing 806 sandwiches the liquid crystal display apparatus 800 so that the liquid crystal display apparatus 800 is surrounded by the two housings. The first housing 801 has an opening 801a that transmits an image displayed on the liquid crystal display apparatus 800. Moreover, the second housing 806 covers a rear side of the liquid crystal display apparatus 800, and includes an operation circuit 805 for operating the display apparatus 800. Further, the second housing 806 has a supporting member 808 disposed on its lower side.

A display apparatus of the present invention is a display apparatus including: scanning signal lines; and data signal lines, wherein: each of the data signal lines receives data signals whose polarities are reversed per one vertical scanning period, per plurality of vertical scanning periods, or per plurality of horizontal scanning periods, in one horizontal scanning period, one of two data signal lines receives a data signal having a polarity and the other of the two data signal lines receives another data signal having another polarity, the two data signal lines being arranged adjacent to each other, the scanning signal lines are made sequentially active in sets of N line(s) (N is an integer of not less than 1), and at a timing in which a set of N line(s) of the scanning signal line(s) is deactivated from an active state, another set of N line(s) of the scanning signal line(s) is activated from an inactive state.

According to the configuration, at a timing at which a set of N line(s) of the scanning signal line(s) is deactivated, another set of N line(s) of the scanning signal line(s) is activated; hence, an effect (e.g., fall of electric potential) received by the data signal lines due to the deactivation of the set of N line(s) of the scanning signal line(s) (e.g., fall of N scanning pulses) is basically canceled by the effect (e.g., rise of electric potential) received by the data signal lines due to activating the set of N line(s) of scanning signal line(s) (e.g., rise of N scanning pulses). This allows for reducing a ripple (wavelike variation) generating in the electric potential of the data signal lines also in LT reversal driving, which allows for preventing a phenomenon that the size of the ripple increases as the supply source of the data signal becomes more distant (see FIG. 36), thereby improving display quality.

With the present display apparatus, a scanning signal line is activated by a rise of a scanning pulse supplied to the scanning signal line and thereafter is deactivated by a fall of the scanning pulse, or is activated by a fall of a scanning pulse supplied to the scanning signal line and thereafter is deactivated by a rise of the scanning pulse.

The present display apparatus may be configured in such a manner that the N is not less than 2 (two scanning signal lines are selected simultaneously).

The present display apparatus may be configured in such a manner that a scanning pulse of a current stage is activated simultaneously with a start of a horizontal scanning period corresponding to the current stage, and the scanning pulse of the current stage is deactivated simultaneously with termination of the horizontal scanning period corresponding to the current stage.

The present display apparatus may be configured in such a manner that a scanning pulse of a current stage is activated simultaneously with a start of a horizontal scanning period corresponding to a preceding stage, and the scanning pulse of the current stage is deactivated simultaneously with termination of the horizontal scanning period corresponding to the current stage.

The present display apparatus may be configured further including a spare wire for use in repairing a disconnection of the data signal lines, a repaired data signal line of the data signal lines receiving the data signals from one of its ends as well as receiving the data signals from the other one of its ends via the spare wire.

The present display apparatus may be configured in such a manner that the N is 2 and two of the scanning signal lines are selected simultaneously, two of the data signal lines are associated with a first pixel column and another two of the data signal lines are associated with a second pixel column adjacent to the first pixel column, each of pixels include at least one pixel electrode, and a pixel electrode in the first pixel column is connected, via a transistor, to any one of the two data signal lines associated with the first pixel column, and a pixel electrode in the second pixel column is connected, via another transistor, to any one of the two data signal lines associated with the second pixel column.

The present display apparatus may be configured in such a manner that the pixel electrode included in the first pixel column is disposed so that the pixel electrode included in the first pixel column overlaps the two data signal lines associated with the first pixel column, and the pixel electrode included in the second pixel column is disposed so that the pixel electrode included in the second pixel column overlaps the two data signal lines associated with the second pixel column.

The present display apparatus may be configured in such a manner that in each of the first pixel column and the second pixel column, a pixel electrode of one of two consecutive pixels is connected, via a transistor, to a data signal line different from that connected to the pixel electrode of the other one of the two consecutive pixels via another transistor, and the transistor to which the pixel electrode included in the one of the two consecutive pixels is connected, is connected to one of the two scanning signal lines selected simultaneously, and the transistor to which the pixel electrode included in the other one of the two consecutive pixel's is connected, is connected to the other one of the two scanning signal lines selected simultaneously.

The present display apparatus may be configured in such a manner that in a same horizontal scanning period, the two data signal lines associated with a same pixel column are supplied with data signals of different polarities.

The present display apparatus may be configured in such a manner that in a same horizontal scanning period, two adjacent data signal lines being associated with different pixel columns are supplied with data signals of different polarities.

The present display apparatus may be configured in such a manner that in a same horizontal scanning period, two adjacent data signal lines being associated with different pixel columns are supplied with data signals of identical polarities.

The present display apparatus may be configured in such a manner that a pixel includes a plurality of pixel electrodes.

The present display apparatus may be configured further including a plurality of storage capacitor wires, two pixel electrodes provided in a pixel being connected to a same data signal line via different transistors that are connected to a same scanning signal line, one of the two pixel electrodes forming a capacitor with a corresponding one of the storage capacitor wires, and the other one of the two pixel electrodes forming a capacitor with another one of the storage capacitor wires.

The present display apparatus may be configured in such a manner that two pixel electrodes provided in a pixel are connected to each other via a capacitor, and just one of the two pixel electrodes is connected to a corresponding one of the data signal lines via a transistor that is connected to a corresponding one of the scanning signal lines.

The present display apparatus may be configured further including a plurality of storage capacitor wires, two pixel electrodes provided in a pixel being connected to a same data signal line via different transistors that are connected to a same scanning signal line, one of the two pixel electrodes being connected to a capacitor electrode via a transistor that is connected to another one of the scanning signal lines, the capacitor electrode forming a capacitor with the storage capacitor wire.

The present display apparatus may be configured in such a manner that two data signal lines are associated with one pixel, one of two pixel electrodes provided in the pixel is connected to one of the two data signal lines via one of two transistors that are connected to a same scanning signal line, and the other one of the two pixel electrodes is connected to the other one of the two data signal lines that is connected to the other one of the two transistors.

The present display apparatus may be configured in such a manner that the plurality of scanning signal lines and the plurality of data signal lines are formed on a substrate, the substrate further having a comb-shaped pixel electrode and a common electrode being formed thereon.

A method of driving the present display apparatus is a method of driving a display apparatus including scanning signal lines and data signal lines, the method including: outputting, to each of the data signal lines, data signals whose polarities are reversed per one vertical scanning period, per plurality of vertical scanning periods, or per plurality of horizontal scanning periods, while in one horizontal scanning period, outputting a data signal having a polarity to one of two data signal lines and outputting another data signal having another polarity to the other of the two data signal lines, the two data signal lines being arranged adjacent to each other; activating the scanning signal lines sequentially in sets of N line(s) (N is an integer of not less than 1); and activating, at a timing in which a set of N line(s) of the scanning signal line(s)

is deactivated from an active state, another set of N line(s) of the scanning signal line(s) from an inactive state.

A present liquid crystal display apparatus includes the display apparatus. Moreover, a present television receiver includes: the liquid crystal display apparatus; and a tuner section configured to receive television broadcast.

The present invention is not limited to the description of the embodiments above, but may be altered by a skilled person within the scope of the claims. An embodiment based on a proper combination of technical means disclosed in different embodiments is encompassed in the technical scope of the present invention. Moreover, the effects described in the embodiments merely serve as exemplifications of the present invention.

INDUSTRIAL APPLICABILITY

The display apparatus of the present invention is suitably used for a liquid crystal television, for example.

REFERENCE SIGNS LIST 101 to 108 pixel
12$i$, 12$j$, 12$m$, 12$n$ transistor
15$x$, 15$y$, 15X, 15Y data signal line
16$i$, 16$j$, 16$m$, 16$n$ scanning signal line
17$i$, 17$j$, 17$m$, 17$n$ pixel electrode
18$p$, 18$r$, 18$s$ storage capacitor wire
α, β pixel column
Pi, Pj, Pm, Pn pulse (scanning pulse)

The invention claimed is:

1. A display apparatus comprising:
a first pixel column and a second pixel column adjacent each other;
scanning signal lines extending in a row direction; and
data signal lines extending in a column direction, wherein:
each of the data signal lines is configured to receive data signals whose polarities are reversed per one vertical scanning period, per plurality of vertical scanning periods, or per plurality of horizontal scanning periods,
in one horizontal scanning period, one of two data signal lines is configured to receive a data signal having a polarity and the other of the two data signal lines is configured to receive another data signal having another polarity, the two data signal lines being arranged adjacent to each other,
the scanning signal lines are made sequentially active in sets of N lines,
at a timing in which a set of N lines of the scanning signal lines is deactivated from an active state, another set of N lines of the scanning signal lines is activated from an inactive state,
the N is 2 and two of the scanning signal lines are selected simultaneously,
a first data signal line of the data signal lines, a second data signal line of the data signal lines, a third data signal line of the data signal lines and a fourth data signal line of the data signal lines are such that the second data signal line is arranged after the first data signal line, the third data signal line is arranged after the second data signal line and the fourth data signal line is arranged after the third data signal line,
the first data signal line and the second data signal line correspond to the first pixel column, the first data signal line being arranged on left side of the first pixel column and the second data signal line being arranged on right side of the first pixel column, the third data signal line and the fourth data signal line correspond to the second pixel column, the third data signal line being arranged on left side of the second pixel column and the fourth data signal line being arranged on right side of the second pixel column,
the first pixel column includes at least one pixel connected to the first data signal line via a first transistor and at least one additional pixel connected to the second data signal line via a second transistor,
the second pixel column includes at least one pixel connected to the third data signal line via a third transistor and at least one additional pixel connected to the fourth data signal line via a fourth transistor,
the at least one pixel connected to the first transistor and the at least one additional pixel connected to the fourth transistor are adjacent in the row direction,
the first transistor and the fourth transistor are directly connected to one of the two of the scanning signal lines selected simultaneously,
the at least one additional pixel connected to the second transistor and the at least one pixel connected to the third transistor are adjacent in the row direction, and
the second transistor and the third transistor are directly connected to the other of the two of the scanning signal lines selected simultaneously.

2. The display apparatus according to claim 1, wherein each one of the first, second, third and fourth scanning signal lines is activated by a rise of a scanning pulse supplied to the corresponding scanning signal line and thereafter is deactivated by a fall of the scanning pulse, or is activated by a fall of a scanning pulse supplied to the corresponding scanning signal line and thereafter is deactivated by a rise of the scanning pulse.

3. The display apparatus according to claim 2, wherein a scanning pulse of a current stage is activated simultaneously with a start of a horizontal scanning period corresponding to the current stage, and the scanning pulse of the current stage is deactivated simultaneously with termination of the horizontal scanning period corresponding to the current stage.

4. The display apparatus according to claim 2, wherein a scanning pulse of a current stage is activated simultaneously with a start of a horizontal scanning period corresponding to a preceding stage, and the scanning pulse of the current stage is deactivated simultaneously with termination of the horizontal scanning period corresponding to the current stage.

5. The display apparatus according to claim 1, further comprising:
a spare wire for use in repairing a disconnection of the data signal lines, a repaired data signal line of the data signal lines receiving the data signals from one of its ends as well as receiving the data signals from the other one of its ends via the spare wire.

6. The display apparatus according to claim 1, wherein at least one pixel electrode included in the first pixel column is disposed so that the at least one pixel electrode included in the first pixel column overlaps the first data signal line and the second data signal line, and
at least another pixel electrode included in the second pixel column is disposed so that the at least one other pixel electrode included in the second pixel column overlaps the third data signal line and the fourth data signal line.

7. The display apparatus according to claim 1, wherein in the first pixel column, a first pixel electrode of a first one of two consecutive pixels is connected, via a transistor, to the first data signal line and a second pixel electrode of the other one of the two consecutive pixels is connected, via another transistor, to the second data signal line, and the transistor to which the first pixel electrode is connected, is connected to one of the two scanning signal lines selected simultaneously, and the transistor to which the second pixel electrode is connected, is connected to the other one of the two scanning signal lines selected simultaneously.

8. The display apparatus according to claim 1, wherein in a same horizontal scanning period, the first data signal line and the second data signal line are supplied with data signals of different polarities.

9. The display apparatus according to claim 8, wherein in the same horizontal scanning period, the second data signal line and third data signal line are supplied with data signals of different polarities.

10. The display apparatus according to claim 1, wherein each pixel of the first pixel column and the second pixel column includes a plurality of pixel electrodes.

11. The display apparatus according to claim 10, wherein a plurality of storage capacitor wires are arranged, and
two pixel electrodes provided in a pixel of the first pixel column are connected to one of the first data signal line and the second data signal line via different transistors that are connected to a same scanning signal line, one of the two pixel electrodes forming a capacitor with a corresponding one of the storage capacitor wires, and the other one of the two pixel electrodes forming a capacitor with another one of the storage capacitor wires.

12. The display apparatus according to claim 10, wherein two pixel electrodes provided in a pixel of the first pixel column are connected to each other via a capacitor, and just one of the two pixel electrodes is connected to a corresponding one of the first data signal line and the second data signal line via a transistor that is connected to a corresponding one of the scanning signal lines.

13. The display apparatus according to claim 10, wherein a plurality of storage capacitor wires are arranged, and
two pixel electrodes provided in a pixel of the first pixel column are connected to one of the first data signal line and the second data signal line via different transistors that are connected to a same scanning signal line, one of the two pixel electrodes being connected to a capacitor electrode via a transistor that is connected to another one of the scanning signal lines, the capacitor electrode forming a capacitor with the storage capacitor wire.

14. The display apparatus according to claim 10, wherein one of two pixel electrodes provided in a pixel of the first pixel column is connected to the first data signal line via one of two transistors that are connected to a same scanning signal line, and the other one of the two pixel electrodes is connected to the second data signal line that is connected to the other one of the two transistors.

15. The display apparatus according to claim 1, wherein the scanning signal lines and the data signal lines are formed on a substrate, the substrate further having a comb-shaped pixel electrode and a common electrode being formed thereon.

16. A liquid crystal display apparatus comprising a display apparatus as set forth in claim 1.

17. A television receiver comprising:
a liquid crystal display apparatus as set forth in claim 16; and
a tuner section receiving television broadcast.

* * * * *